United States Patent [19]

Ishii et al.

[11] Patent Number: 5,642,214

[45] Date of Patent: Jun. 24, 1997

[54] OPTICAL MODULATING ELEMENT AND ELECTRONIC APPARATUS USING IT

[75] Inventors: Yutaka Ishii, Nara; Yoshitaka Yamamoto, Yamatokoriyama, both of Japan

[73] Assignee: Sharp Kabushiki Kaisha, Osaka, Japan

[21] Appl. No.: 270,801

[22] Filed: Jul. 5, 1994

Related U.S. Application Data

[63] Continuation of Ser. No. 916,483, Jul. 17, 1992, abandoned.

[30] Foreign Application Priority Data

| Jul. 19, 1991 | [JP] | Japan | 3-179896 |
| Jul. 19, 1991 | [JP] | Japan | 3-179897 |
| Jul. 19, 1991 | [JP] | Japan | 3-179898 |

[51] Int. Cl.⁶ ............................................. G02F 1/1385
[52] U.S. Cl. ................................................. 349/96; 349/117
[58] Field of Search ............................... 359/53, 63, 64, 359/103

[56] References Cited

U.S. PATENT DOCUMENTS

| 4,127,322 | 11/1978 | Jacobson et al. | 353/31 |
| 4,231,035 | 10/1980 | van Doorn | 345/101 |
| 4,394,069 | 7/1983 | Kaye | 359/93 |
| 4,416,514 | 11/1983 | Plummer | 359/53 |
| 4,443,065 | 4/1984 | Funada et al. | |
| 4,582,396 | 4/1986 | Bos et al. | 359/73 |
| 4,595,259 | 6/1986 | Perregaux | 359/84 |
| 4,759,612 | 7/1988 | Nakatsuka et al. | 359/63 |
| 4,783,280 | 11/1988 | Petrzilka et al. | 252/299.01 |
| 4,786,146 | 11/1988 | Ledebuhr | 353/20 |
| 4,848,877 | 7/1989 | Miller | 359/73 |
| 4,867,536 | 9/1989 | Pidsosny et al. | 359/53 |
| 4,917,464 | 4/1990 | Conner | 359/64 |
| 4,917,465 | 4/1990 | Conner et al. | |
| 4,991,941 | 2/1991 | Kalmanash | 359/64 |
| 5,005,952 | 4/1991 | Clark et al. | 359/63 |
| 5,050,965 | 9/1991 | Conner et al. | 359/53 |
| 5,115,270 | 5/1992 | Kraft et al. | 355/38 |
| 5,122,887 | 6/1992 | Mathewson | 359/53 |
| 5,231,521 | 7/1993 | Johnson et al. | 359/53 |
| 5,247,378 | 9/1993 | Miller | 359/73 |
| 5,387,920 | 2/1995 | Bos et al. | 345/88 |

FOREIGN PATENT DOCUMENTS

| 0 138 456 | 9/1983 | European Pat. Off. . |
| WO8404402 | 11/1984 | European Pat. Off. . |
| 0 052 000 | 9/1989 | European Pat. Off. . |
| 59-38565 | 9/1984 | Japan . |

OTHER PUBLICATIONS

K. Sato et al., Novel Multicolor LCD Without A Color Filter, Proceedings of the SID, vol. 32/3, 1991, pp. 183–186.

T. Harry, Electrically Tunable Narrowband Optical Filter, Sep. 18, 1975, pp. 471–472.

*Primary Examiner*—William L. Sikes
*Assistant Examiner*—James A. Dudek
*Attorney, Agent, or Firm*—David G. Conlin; William J. Daley, Jr.; Kevin J. Fournier

[57] ABSTRACT

A photomodulation element which uses a color variable filter to obtain the light of a desired wavelength and a liquid crystal element. Light entering the photomodulation element from one side passes through the liquid crystal panel and a second polarizer. The distribution of the transmission light intensity about the wavelength is nearly close to the normal distribution centered on a specific wavelength determined on the basis of the retardation of the liquid crystal panel. Based on the half-value width W necessary in this distribution, the retardation of the panel is determined and the number of the liquid crystal elements is determined so as to obtain a bandwidth which corresponds to the color of the light desired. The retardation of the light crystal is changed by a voltage regulating circuit so that the transmission light intensity distribution at the wavelength of the transmission light of the liquid crystal element is maximized at the desired wavelength $\lambda_0$ so that the wavelength of the light leaving the photomodulation element may be selected to provide the desired light.

4 Claims, 34 Drawing Sheets

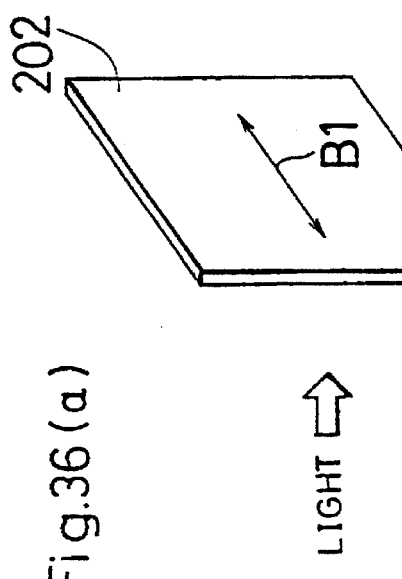
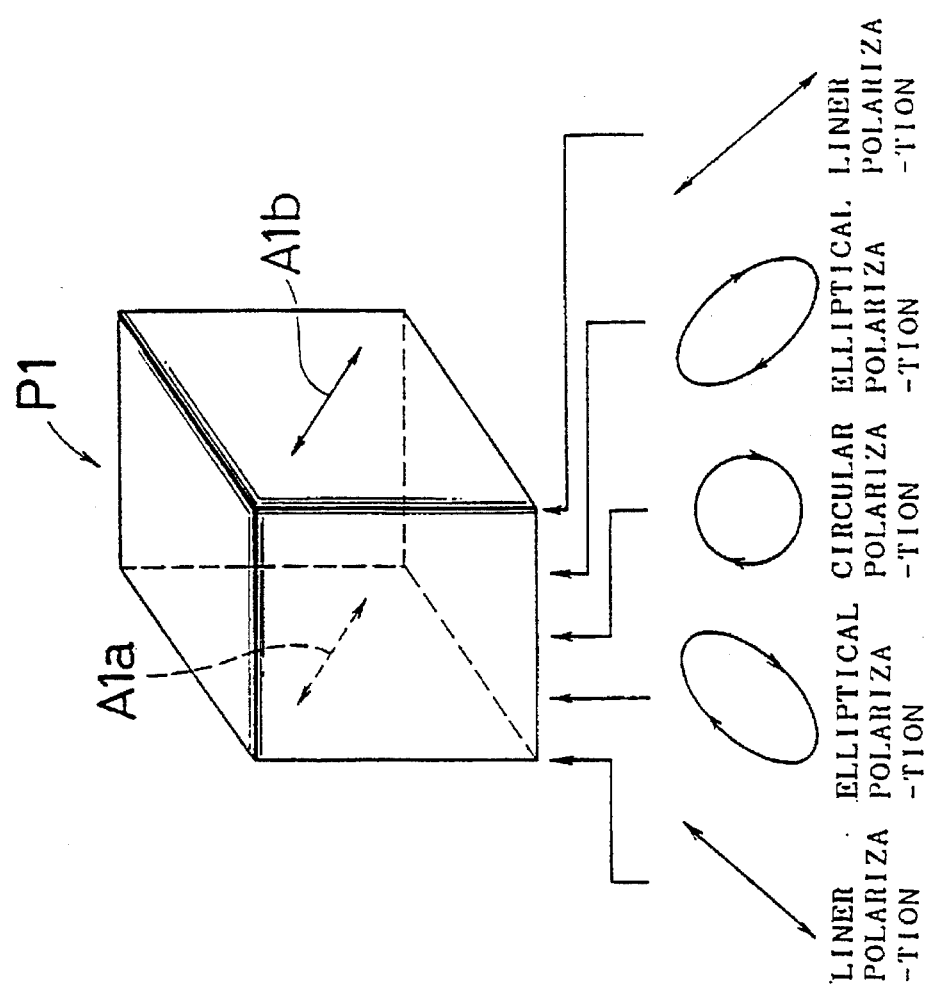

Fig. 37 (a)
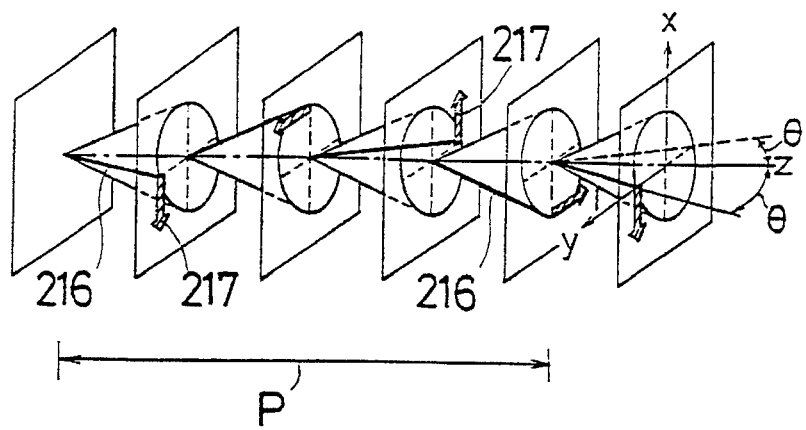
Fig. 37 (b)
Fig. 38
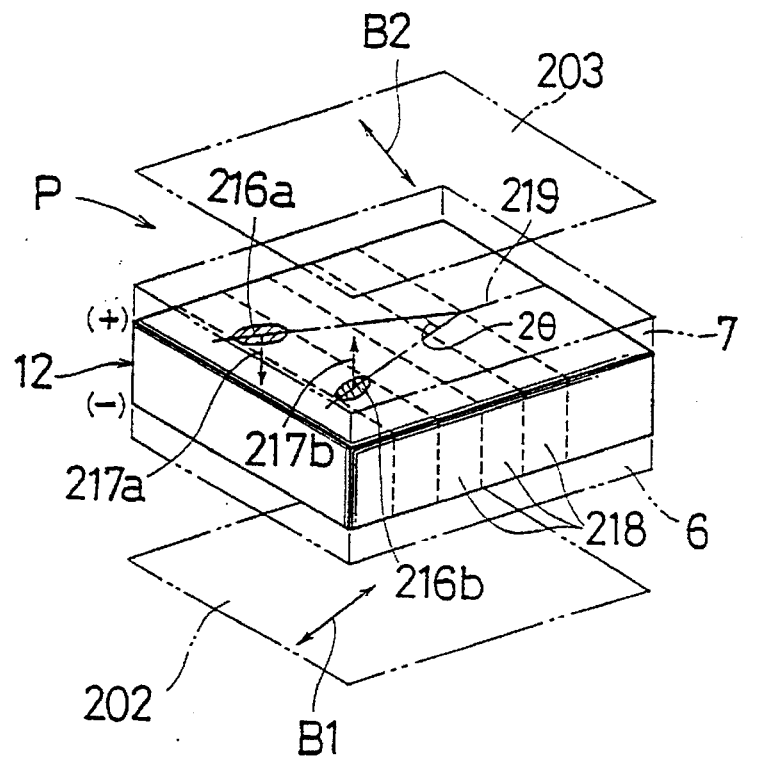

OPTICAL MODULATING ELEMENT AND ELECTRONIC APPARATUS USING IT

This is a continuation of application Ser. No. 07/916,483 filed Jul. 17, 1992, now abandoned.

BACKGROUND OF THE INVENTION

1. Field of the Invention

The present invention relates to an optical modulating element which is capable of changing, continuously or in stages, the wavelength of a transmitted light or a reflected light easily and at a high speed by controlling physical quantities such as voltage, temperature, etc. and electronic apparatuses such as direct viewing display apparatus, transmission display apparatus, image pickup apparatus, copying machine, printing & platemaking apparatus, facsimile communication apparatus, light communication apparatus or image processing apparatus, etc. constituted by using such optical modulating element.

2. Description of the Related Art

Liquid crystal display is utilized in a wide variety of fields such as watch, desk calculator, computer terminal, word processor, TV receiver, etc. As a typical display mode used for those purposes, there is the so-called TN (Twisted Nematic) mode in which the liquid crystal molecules in the liquid crystal cell are twisted by approximately 90° as initial orientation. TN mode is designed to make a monochromic indication by disposing a liquid crystal cell between a pair of polarizers and by utilizing the optical characteristics of this cell i.e. the optically activating characteristics in the absence of application of display voltage and the racemizing characteristics in the presence of application of display voltage.

As for color display, the indication is made in multiple colors (indicated in prescribed plural number of colors) or in full colors (indicated in stepless colors) by providing a micro color filter of extremely small dimensions in red, blue and green for example and mixing colors by utilizing the light switching characteristics of TN mode. This principle is currently adopted for the display apparatus of a small liquid crystal TV receiver realized by application of active matrix drive or simple matrix drive.

As a display system widely used in the display apparatus for word processor, we may cite STN (Super Twisted Nematic) mode having a cell structure similar to that of TN mode and in which the twisting angle of the liquid crystal is set at 180°–270°. This mode is characterized in that the twisting angle of the liquid crystal is increased to no less than 90° and the set angle in the direction of polarization of the polarizer is optimized to reflect the sudden deformation in the molecular orientation due to increase of applied voltage in the change of birefringence of the liquid crystal so as to realize electro-optical characteristics having a sharp threshold value. It is therefore suitable to simple matrix drive.

On the other hand, this mode has the drawback of presenting a yellow-green or dark blue tint as the background color for indication because of birefringence of the liquid crystal. As a method to improve this, there is a technique which consists in correcting the color by placing an optical compensation panel or a phase difference plate formed by high polymer molecules such as polycarbonate, etc. on the STN panel for indication to enable monochromic indication, and a liquid crystal display apparatus (LCD) of such structure is currently on the market under the name of "Paper White LCD". For color indication of this apparatus, an indication in multiple colors and in full colors is possible based on an operating principle similar to that of the TN mode.

For services requiring a wide visual angle, the so-called GH (Guest Host) mode is used in which a pigment with different absorbencies in the direction of major axis and the direction of minor axis (dichromatic pigment) is added to the liquid crystal. This system can be classified into Heilmeyer type which uses a polarizer, White/Tiller type (phase transfer type) which does not use any polarizer and 2-layer type, etc. In any case, the operating principle of the system consists in controlling the orientation of pigments through the orientation of liquid crystal molecules by voltage to use the difference of absorbency in the direction of pigment molecules for the indication. Color indication becomes possible by either using pigments which absorb a part of the visible light or combining a colored filter with a GH cell using a pigment which turns into black.

Another method of color indication consists in installing an element capable of controlling the wavelength of the transmitting light on the front face or the rear face of a monochromic display and switching the wavelength of that transmitting light sequentially to obtain a color indication. As an example of application of this method to a projection display, there is a technique of sealing a high polymer molecule distributed liquid crystal in a CdSe-TFT panel (TFT=thin film transistor), installing a disc provided with red, green and blue filters in front of a light source and making an indication on the TFT-LCD in synchronization with the change in color of the illuminated light by the rotation of the disc to obtain a full-color indication. On the other hand, a color indication is also progressing in electronic apparatus other than display apparatus such as image pickup apparatus (camera), color sensor, copying machine, etc.

Image pickup apparatus is currently forming a large market as the performances of CCD (=charge coupled device) improve with the progress of semi-conductor manufacturing techniques. Especially, loading of CCD in video cameras is greatly contributing to the expansion of the home use market.

The demand is increasing rapidly also for color sensors as they came to be loaded on video camera for adjustment of white balance although they were used only for industrial purposes in the past.

Those electronic apparatuses are provided with a color filter consisting of a synthetic resin material, etc. on the front face of the photoelectric transfer face and constructed in a way to calculate the characteristics of the entire light of incidence by detecting the characteristics of specific wavelength components of the light incident on the photoelectric transfer element.

What is important about the structure of an electronic apparatus having such photoelectric transfer element is the structure of the color filter in which filters corresponding to the wavelength components of light or red (R), green (G) and blue (B) are placed in parallel on the photoelectric transfer face in the same way as in the display apparatus. Namely, the three filters of red, green and blue constitute one picture element on the display.

In addition to the method of thus decomposing the light of incidence into 3 primary color components, there is also a proposal of a construction in which filters of auxiliary colors only (cyan, magenta and yellow) or 3 primary colors mixed with those auxiliary colors are placed in parallel.

In a copying machine, a full color indication is reproduced by irradiating a white color on the document to be copied, writing optical images of 3 primary colors on a photosensitive drum by switching the red, green and blue filters of reflected light sequentially by using a mechanical construction, and then transferring those optical images on the recording paper a plural number of times through the intermediary of a color developer. In this principle, full color copying is also possible by irradiating in advance the source lights of 3 primary colors on the document to be reproduced by using color filters of red, green and blue, decomposing the copy image into 3 primary colors and then treating them on the photosensitive drum in the same way as above. The sequential switching control of color filters in this case is performed mechanically in normal cases.

In a digital copying machine, the image of the copy to be reproduced is submitted to photoelectric transfer by means of a solid state imaging element (CCD) and then to treatment of digital image signal to reproduce the original picture in color. The solid state imaging element used in this case is the same as the CCD and its operating principle also follows the explanation given earlier.

As mentioned above, color indication constitutes one of the development trends of today in various display apparatuses or image input/output apparatuses such as imaging element, color sensor, copying machine, etc. However, the current technology of color indication still leaves a lot of problems to be solved.

Namely, regarding display apparatuses, we know a structure in which micro color filters of red, green and blue, for example, are provided for each picture element to be displayed on the front face of a liquid crystal display apparatus making a monochromic indication for the purpose of realizing a multicolor or full-color indication. In such a panel structure, a drop of resolution is produced because micro color filters of a plural number of lights are combined into one picture element to be displayed. In the case where you reduce the size of picture element to be displayed of the liquid crystal display apparatus making the indication to prevent that problem, an increase of resistance is produced because of the reduction in size of the electrode through which the indication signal flows and this leads to the production of unevenness in the density of image displayed between the position where the signal is fed and a position apart from the position of signal feed in the liquid crystal display apparatus. Moreover, it is also necessary to set the manufacturing environments at an extremely high degree of purity and this produces problems such as drop of yield ratio in manufacture under the influence of dust, etc.

On the other hand, in a display apparatus using the GH (guest host) mode, we know a technology of using pigments which absorb a part of the visible light to realize a multicolor or full-color indication. In such a case, it is necessary to place guest host liquid crystals supplemented with different kinds of pigment, but this technology has a problem that the picture elements to be displayed of each layer do not agree with one another because of parallax error when they are seen from a diagonal direction. A solution to this problem may be given by a technology of reducing the thickness of the glass substrate of each block stacked panel. In this case, however, the glass substrate is extremely liable to be broken in the manufacturing process of the liquid crystal display apparatus, presenting a problem of difficulty of handling. Moreover, in a guest host liquid crystal using pigments capable of displaying the black color, it is necessary to use micro color filters as mentioned before and this leads to the basic problem of drop in resolution.

On the other hand, in the technology of applying the red, green and blue lights to display apparatus by switching them sequentially, the resolution improves compared with the case of use of micro color filters because one picture element of the display apparatus directly turns into the picture element to be displayed. In the past, however, there was a problem with the miniaturization or the durability of the apparatus because the switching of colors is realized with a mechanical construction by providing color filters of 3 colors in one same direction on a disc for example and driving the disc for turning, etc. It also has a problem of noise.

On the other hands, in image pickup apparatus or the color sensors, there is a problem of drop in resolution as in display apparatuses because of the structure of providing micro color filters. Another problem is that the structure of the apparatus gets complicated because of use of micro color filters of fine structure.

In the color copying machine, the switching operation of filters for decomposing the light irradiated on the document or the reflected light from the document into 3 colors is performed either mechanically or by providing separate light sources for the respective colors as mentioned before, and this leads to problems such as increase in size, drop in resolution or noise as mentioned before. When providing separate light sources for the respective colors, there are such problems as increase in the size of structure, service life of light source, purity of color and (increase of) power consumption.

SUMMARY OF THE INVENTION

The purpose of the invention is to provide, in view of various problems of the technology of color indication at the present stage, an optical modulating element enabling miniaturization of construction and improvement of indication quality by realizing with liquid crystal color changing filters which can switch a transmitted light or a reflected light of desired wavelength band electronically and in a short time and to also provide a new electronic apparatus having those characteristics using such optical modulating element.

The invention is an optical modulating element having a plurality of liquid crystal element consisting of the first polarizer, a liquid crystal panel in which a liquid crystal having birefringence is sealed and the second polarizer, which are disposed in order on one same optical axis. characterized in that the direction of polarization of the first and second polarizers having the liquid crystal panel between them is determined to be either parallel or perpendicular to each other for each liquid crystal element, the orientation of each liquid crystal panel is determined in the direction intersecting diagonally with the plane of polarization of the adjoining first and second polarizers at an angle determined in advance, the retardation of each liquid crystal panel is determined in such a way that the distribution of intensity of transmitted light relating to the wavelength of the transmitted light of the respective liquid crystal elements may vary with each liquid crystal element, and provided with means for changing the retardation of each liquid crystal panel.

The invention is also characterized in that each liquid crystal panel is constituted by a pair of transparent electrodes between which a liquid crystal is sealed, and the retardation changing means are voltage application means for applying either an AC voltage or a DC voltage to the liquid crystal after adjustment.

The invention is also characterized in that the retardation changing means are temperature adjustment means for adjusting the temperature of the respective liquid crystal panels.

The invention is also characterized in that, when passing the light of a wavelength of λ0 only, the retardation Δnd of the liquid crystal panel concerned is selected in such a way that the transmittance T of the light which passes through at least one liquid crystal panel $$T = \cos^2 \frac{\delta}{2} \quad \text{[formula 1]}$$

but, $$\delta = \frac{2\Pi}{\lambda 0} \cdot \Delta nd \quad \text{[formula 2]}$$

may become largest.

The invention is also characterized in that, when passing the light of a wavelength of λ0 only by using N pieces of the liquid crystal element, the retardation Δnd of the respective liquid crystal panels is determined at values different from one another by gradually changing the layer thickness d of the liquid crystal.

Moreover, the invention is a display apparatus characterized in that it makes an indication by irradiating the light of one light source containing the wavelength of a plural number of colors on transmission or reflection type means of displaying and an optical modulating element, it displays the images corresponding to the plural number of colors with displaying means within the period of after-image effect, the optical modulating element switching the color of the light that passes within the period of display of the image for each color, the optical modulating element having a plurality of liquid crystal element consisting of the first polarizer, a liquid crystal panel in which a liquid crystal having birefringence is sealed and the second polarizer, which are disposed in order on one same optical axis, the direction of polarization of the first and second polarizers having the liquid crystal panel between them being determined to be either parallel or perpendicular to each other for each liquid crystal element, the orientation of each liquid crystal panel being determined in the direction intersecting diagonally with the plane of polarization of the adjoining first and second polarizers at an angle determined in advance, the retardation of each liquid crystal panel being determined in such a way that the distribution of intensity of transmitted light relating to the wavelength of the transmitted light of the respective liquid crystal elements may vary with each liquid crystal element, and the optical modulating element provided with means for changing the retardation of each liquid crystal panel.

Furthermore, the invention is a light detecting apparatus characterized in that an optical modulating element is disposed on the incidence side of means for detecting light which output detecting signal corresponding to the intensity of the light of incidence, the optical modulating element having a plurality of liquid crystal element consisting of the first polarizer, a liquid crystal panel in which a liquid crystal having birefringence is sealed and the second polarizer, which are disposed in order on one same optical axis, the direction of polarization of the first and second polarizers having the liquid crystal panel between them being determined to be either parallel or perpendicular to each other for each liquid crystal element, the orientation of each liquid crystal panel being determined in the direction intersecting diagonally with the plane of polarization of the adjoining first and second polarizers at an angle determined in advance, the retardation of each liquid crystal panel being determined in such a way that the distribution of intensity of transmitted light relating to the wavelength of the transmitted light of the respective liquid crystal elements may vary with each liquid crystal element, and the optical modulating element provided with means for changing the retardation of each liquid crystal panel.

Also, the invention is a color copying machine characterized in that an optical modulating element is disposed in either one light source generating light containing the wavelength of a plural number of colors, a document or photoelectric transfer means on which optical images of the document is formed and which convert optical images into electric signals.

provided with means for forming color images on a recording medium by using the developers for the plural number of colors based on the electric signals obtained by the photoelectric transfer means.

the optical modulating element having a plurality of liquid crystal element consisting of the first polarizer, a liquid crystal panel in which a liquid crystal having birefringence is sealed and the second polarizer, which are disposed in order on one same optical axis, the direction of polarization of the first and second polarizers having the liquid crystal panel between them being determined to be either parallel or perpendicular to each other for each liquid crystal element, the orientation of each liquid crystal panel being determined in the direction intersecting diagonally with the plane of polarization of the adjoining first and second polarizers at an angle determined in advance, the retardation of each liquid crystal panel being determined in such a way that the distribution of intensity of transmitted light relating to the wavelength of the transmitted light of the respective liquid crystal elements may vary with each liquid crystal element, and the optical modulating element provided with means for changing the retardation of each liquid crystal panel.

Still more, the invention is a printing & platemaking apparatus characterized in that an optical modulating element is disposed in either one light source generating light containing the wavelength of a plural number of colors, a document or photoelectric transfer means on which optical images of the document is formed and which convert optical images into electric signals, provided with processing plate materials means for forming the image of document for each color on the plate materials for a plural number of different colors which become printing plates, based on the electric signals obtained by the photoelectric transfer means, the optical modulating element having a plurality of liquid crystal element consisting of the first polarizer, a liquid crystal panel in which a liquid crystal having birefringence is sealed and the second polarizer, which are disposed in order on one same optical axis, the direction of polarization of the first and second polarizers having the liquid crystal panel between them being determined to be either parallel or perpendicular to each other for each liquid crystal element, the orientation of each liquid crystal panel being determined in the direction intersecting diagonally with the plane of polarization of the adjoining first and second polarizers at an angle determined in advance, the retardation of each liquid crystal panel being determined in such a way that the distribution of intensity of transmitted light relating to the wavelength of the transmitted light of the respective liquid crystal elements may vary with each liquid crystal element, and the optical modulating element provided with means for changing the retardation of each liquid crystal panel.

Moreover, the invention is an image input/output apparatus characterized in that it photographs object materials for each of a plural number of colors with means for photographing through an optical modulating element, it inputs color images by storing image data from means for photographing in an image memory for each color, it either indicates images with means for displaying or outputs color images by switching the color of transmitted light with the optical modulating element, based on the image data of a plural number of colors stored in the image memory, the optical modulating element having plurality of liquid crystal element consisting of the first polarizer, a liquid crystal panel in which a liquid crystal having birefringence is sealed and the second polarizer, which are disposed in order one one same optical axis, the direction of polarization of the first and second polarizers having the liquid crystal panel between them being determined to be either parallel or perpendicular to each other for each liquid crystal element, the orientation of each liquid crystal panel being determined in the direction intersecting diagonally with the plane of polarization of the adjoining first and second polarizer at an angle determined in advance, the retardation of each liquid crystal panel being determined in such a way that the distribution of intensity of transmitted light relating to the wavelength of the transmitted light of the respective liquid crystal elements may vary with each liquid crystal element, and the optical modulating element provided with means for changing the retardation of each liquid crystal panel.

Furthermore, the invention is a lighting apparatus characterized in that it irradiates the light of a light source which produces lights containing the wavelength of a plural number of colors as one of the lights of the plural number of colors, the optical modulating element having a plurality of liquid crystal element consisting of the first polarizer, a liquid crystal panel in which a liquid crystal having birefringence is sealed and the second polarizer, which are disposed in order on one same optical axis, the direction of polarization of the first and second polarizers having the liquid crystal panel between them being determined to be either parallel or perpendicular to each other for each liquid crystal element.

the orientation of each liquid crystal panel being determined in the direction intersecting diagonally with the plane of polarization of the adjoining first and second polarizers at an angle determined in advance, the retardation of each liquid crystal panel being determined in such a way that the distribution of intensity of transmitted light relating to the wavelength of the transmitted light of the respective liquid crystal elements may vary with each liquid crystal element, and the optical modulating element provided with means for changing the retardation of each liquid crystal panel.

According to the invention, in the case where a light incident on the optical modulating element from one side transmits through a liquid crystal element consisting of first polarizer, a liquid crystal panel and the second polarizer, the distribution of wavelengths of the intensity of transmitted light becomes about close to the normal distribution centering on the specific wavelength determined based on the retardation of the liquid crystal panel in the liquid crystal element. The retardation of the liquid crystal is determined based on the width at half maximum necessary in this distribution and the number of the liquid crystal elements is determined in such a way that the band width of required wavelengths corresponding to the kinds of color of the light which you wish to obtain with the optical modulating element may be obtained. The retardation of the liquid crystal is changed by means for changing retardation in such a way that the Intensity of transmitted light of the desired wavelength in the distribution of intensity of transmitted lights relating to the wavelengths of the transmitted light of the liquid crystal element may be largest. Therefore, you can select the desired wavelength of light irradiated from the optical modulating element. This makes It possible to obtain the light of the desired color with the optical modulating element.

In case of using such optical modulating element as color filter, the construction of the filter can be much miniaturized and simplified compared with a micro color filter in which fine color filters of red, green and blue colors, for example, are integrated or an apparatus which switches the colors of light obtained by loading the 3-color filter in the circumferential direction of a disc which is driven for turning. Moreover, when such optical modulating element is combined with means for displaying of transmitted type or reflection type, the optical modulating element selectively passes the light of a plural number of wavelength and displays the images corresponding to the plural number of colors within the period of afterimage effect of human beings by the displaying means respectively. This enables construction of a color display apparatus. In addition, it is also possible to realize a compact and lightweight electronic apparatus with much improved indication quality by using the optical modulating element for a component producing the light of a plural number of color in not only a display apparatus but also any electronic apparatus which uses the light of colors of a plural number of wavelengths.

As mentioned above, in the case where a light incident on the optical modulating element from one side transmits through a liquid crystal element consisting of first polarizer, a liquid crystal panel and the second polarizer, the distribution of wavelenghts of the intensity of transmitted light becomes about close to the normal distribution centering on the specific wavelength determined based on the retardation of the liquid crystal panel in the liquid crystal element. The retardation of the liquid crystal is determined based on the width at half maximum necessary in this distribution and the number of the liquid crystal elements is determined in such a way that the band width of required wavelenghts corresponding to the kinds of color of the light which you wish to obtain with the optical modulating element may be obtained. The retardation of the liquid crystal is changed by means for changing retardation in such a way that the intensity of transmitted light of the desired wavelength in the distribution of intensity of transmitted lights relating to the wavelengths of the transmitted light of the liquid crystal element may be largest. Therefore, we can select the desired wavelength of light irradiated from the optical modulating element. This makes it possible to obtain the light of the desired color with the optical modulating element.

When such optical modulating element is combined with means for displaying of transmission type or reflection type, the optical modulating element selectively passes the light of a plural number of wavelength and displays the images corresponding to the plural number of colors within the period of afterimage effect of human beings by the displaying means respectively. This enables construction of a color display apparatus. In addition, it is also possible to realize a compact and lightweight electronic apparatus with much improved indication quality by using the optical modulating element for a component producing the light of a plural number of color in not only a display apparatus but also any electronic apparatus which uses the light of colors of a plural number of wavelengths.

The invention is an optical modulating element characterized in that it is constituted by disposing a plural number of liquid crystal panels, in which a liquid crystal having birefringence is sealed, between at least one pair of polarizers, the axis of polarization of the polarizer on the outlet side is selected to be parallel to the direction of polarization of the straight polarizing component or to the direction of major axis of the elliptical polarizing component of the output light of the liquid crystal panel in the last stage, and provided with means for changing the retardation of each liquid crystal panel.

Moreover, the invention is characterized in that each liquid crystal panel is constituted by sealing liquid crystal in at least one pair of transparent electrodes, and the retardation changing means are voltage application means for applying either an AC voltage or a DC voltage to the liquid crystal after adjustment.

The invention is also characterized in that the retardation changing means are temperature adjustment means for adjusting the temperature of the respective liquid crystal panels.

The invention is also characterized in that, when passing the light of a wavelength of $\lambda 0$ only, the retardation $\Delta nd$ of each liquid crystal panel is selected in a way to satisfy $$\frac{\Delta nd}{\lambda 0} = \frac{(2m-1)}{2} \quad m \geq 1 \qquad \text{[formula 3]}$$

for the anisotropy of refraction index of liquid crystal $\Delta n$, layer thickness of liquid crystal d and integer m.

The invention is also characterized in that, when passing the light of a wavelength of $\lambda 0$ only, the retardation and the number of layers of the respective liquid crystal panels is selected in such a way that the width at half maximum in the distribution of intensity of transmitted light centering on the wavelength $\lambda 0$ of the transmitted light and the intensity of the lights other than that of a wavelength $\lambda 0$ may become equal to the predetermined values.

Moreover, the invention is a display apparatus characterized in that it makes an indication by irradiating the light of one light source containing the wavelength of a plural number of colors on transmission or reflection type means for displaying and an optical modulating element, it displays the images corresponding to the plural number of colors on displaying means within the period of afterimage effect, the optical modulating element switching the color of the light that passes within the period of display of the image for each color, the optical modulating element being constituted by disposing a plural number of liquid crystal panels, in which a liquid crystal having birefringence is sealed, between at least one pair of polarizers, the axis of polarization of the polarizer on the outlet side is selected to be parallel to the direction of polarization of the straight polarizing component or to the direction of major axis of the elliptical polarizing component of the output light of the liquid crystal panel in the last stage, and the optical modulating element provided with means for changing the retardation of each liquid crystal panel.

Furthermore, the invention is a light detecting apparatus characterized in that an optical modulating element is disposed on the incidence side of the light detecting means which outputs detecting signal corresponding to the intensity of the light of incidence, the optical modulating element being constituted by disposing a plural number of liquid crystal panels, in which a liquid crystal having birefringence is sealed, between at least one pair of polarizers, the axis of polarization of the plarizer on the outlet side is selected to be parallel to the direction of polarization of the straight polarizing component or to the direction of major axis of the elliptical polarizing component of the output light of the liquid crystal panel in the last stage, and the optical modulating element provided with means for changing the retardation of each liquid crystal panel.

Also, the invention is a color copying machine characterized in that an optical modulating element is disposed in either one light source producing lights containing the wavelength of a plural number of colors, a document or photoelectric transfer means on which the optical image of the document is formed and which convert optical images into electric signals, provided with means for forming color images on a recording medium by using the developers for the plural number of colors based on the electric signals obtained by the photoelectric transfer means, the optical modulating element being constituted by disposing a plural number of liquid crystal panels, in which a liquid crystal having birefringence is sealed, between at least one pair of polarizers, the axis of polarization of the polarizer on the outlet side is selected to be parallel to the direction of polarization of the straight polarizing component or to the direction of major axis of the elliptical polarizing component of the output light of the liquid crystal panel in the last stage, and the optical modulating element provided with means for changing the retardation of each liquid crystal panel.

Moreover, the invention is a printing & platemaking apparatus characterized in that an optical modulating element is disposed in either one light source producing lights containing the wavelength of a plural number of colors, a document or photoelectric transfer means on which the optical image of the document is formed and which converts optical images into electric signals, provided with processing plate materials means for forming the image of document for each color on the plate materials for a plural number of different colors which become printing plates, based on the electric signals obtained by the photoelectric transfer means, the optical modulating element being constituted by disposing a plural number of liquid crystal panels, in which a liquid crystal having birefringence is sealed, between at least one pair of polarizers, the axis of polarization of the polarizer on the outlet side is selected to be parallel to the direction of polarization of the straight polarizing component or to the direction of major axis of the elliptical polarizing component of the output light of the liquid crystal panel in the last stage, and the optical modulating element provided with means for changing the retardation of each liquid crystal panel.

Moreover, the invention is an image input/output apparatus characterized in that it photograph object materials for a plural number of colors with means for photographing through an optical modulating element, it inputs color images by storing image data from photographing means in an image memory for each color, it either indicates images with means for displaying or outputs color images by switching the color of transmitted light with the optical modulating element, based on the image data of a plural number of colors stored in the image memory, the optical modulating element being constituted by disposing a plural number of liquid crystal panels in which a liquid crystal having birefringence is sealed between at least one pair of polarizers, the axis of polarization of the polarizer on the outlet side is selected to be parallel to the direction of polarization of the straight polarizing component or to the direction of major axis of the elliptical polarizing component of the output light of the liquid crystal panel in the last stage, and the optical modulating element provided with means for changing the retardation of each liquid crystal panel.

Moreover, the invention is an image operating apparatus characterized in that it is provided with a light source which produces a light of a plural number of wavelengths, an optical modulating element which passes only specific wavelength components of the light from the light source, and a plural number of transmission or reflection type displaying elements which either transmit or reflect the light of the remaining wavelength components, the optical modulating element being constituted by disposing a plural number of liquid crystal panels in which a liquid crystal having birefringence is sealed, between at least one pair of polarizers, the axis of polarization of the plarizer on the outlet side is selected to be parallel to the direction of polarization of the straight polarizing component or to the direction of major axis of the elliptical polarizing component of the output light of the liquid crystal panel in the last stage, and the optical modulating element provided with means for changing the retardation of each liquid crystal panel.

Moreover, the invention is a lighting apparatus characterized in that it irradiates the light from a light source which produces a light of a plural number of wavelength through an optical modulating element as some of the lights of the plural number of colors, the optical modulating element being constituted by disposing a plural number of liquid crystal panels, in which a liquid crystal having birefringence is sealed, between at least one pair of polarizers, the axis of polarization of the plarizer on the outlet side is selected to be parallel to the direction of polarization of the straight polarizing component or to the direction of major axis of the elliptical polarizing component of the output light of the liquid crystal panel in the last stake, and the optical modulating element provided with means for changing the retardation of each liquid crystal panel.

According to the invention, the light incident on the optical modulating element from the side of one polarizer and passing through the polarizer is converted into a linearly polarized light. When this linearly polarized light passes through a plural number of liquid crystal panels, the light of the linearly polarized light turns successively at an angle dependent on the wavelength and the degree of birefringence because of the birefringence of each liquid crystal panel. Because the birefringence of the liquid crystal panel is dependent on wavelength, the angle at which the light of the linearly polarized light which passed the polarizer turns each time when it passes through the liquid crystal panel varies with each wavelength.

On the other hand, a polarizer is disposed on the exit side of the liquid crystal panel of the last stage. In the case where we change the retardation of the liquid crystal in each liquid crystal panel by means for changing retardation, we can select as required the wavelength of the light either the direction of polarization of linearly polarized component or the direction of major axis of the elliptically polarized component of which is parallel to the axis of polarization of the other polarizers, from among the lights coming out of the liquid crystal panel of the last stage in correspondence to that change. This makes it possible to pass the light of the desired color by means of an optical modulating element.

When such optical modulating element is combined with means for displaying of transmission type or reflection type, the optical modulating element selectively passes the light of a plural number of wavelength and displays the images corresponding to the plural number of colors within the period of afterimage effect of human beings by the displaying means respectively. This enables construction of a color display apparatus. In addition, it is also possible to realize a compact and lightweight electronic apparatus with much improved indication quality by using the optical modulating element for a component producing the light of a plural number of color in not only a display apparatus but also any electronic apparatus which uses the light of colors of a plural number of wavelengths.

As described above, according to the invention, the light incident on the optical modulating element from the side of one polarizer and passing through the polarizer is converted into a linearly polarized light. When this linearly polarized light passes through a plural number of liquid crystal panels the light of the linearly polarized light turns successively at an angle dependent on the wavelength and the degree of birefringence because of the birefringence of each liquid crystal panel. Because the birefringence of the liquid crystal panel is dependent on wavelength, the angle at which the light of the linearly polarized light which passed the polarizer turns each time when it passes through the liquid crystal panel varies with each wavelength.

On the other hand, another polarizer is disposed on the exit side of the liquid crystal panel of the last stage. In the case where we change the retardation of the liquid crystal in each liquid crystal panel by means for changing retardation, We can select as required the wavelength of the light either the direction of polarization of linearly polarized component or the direction of major axis of the elliptically polarized component of which is parallel to the axis of polarization of the other polarizers, from among the lights coming out of the liquid crystal panel of the last stage in correspondence to that change. This makes it possible to pass the light of the desired color by means of an optical modulating element.

When such optical modulating element is combined with means for displaying of transmission type or reflection type the optical modulating element selectively passes the light of a plural number of wavelength and displays the images corresponding to the plural number of colors within the period of afterimage effect of human beings by the displaying means respectively. This enables construction of a color display apparatus. In addition, it is also possible to realize a compact and lightweight electronic apparatus with much improved indication quality by using the optical modulating element for a component producing the light of a plural number of color in not only a display apparatus but also any electronic apparatus which uses the light of colors of a plural number of wavelengths.

The invention is an optical modulating element characterized in that it is realized by disposing alternately a plural number of liquid crystal panels constituted by sealing liquid crystal between a pair of transparent substrates and a plural number of color polarizers, and provided with a plural number of liquid crystal elements constituted by liquid crystal panel and color polarizers disposed on both sides of the liquid crystal panel and means for switching the drive voltage applied to each liquid crystal panel to a plural number of different states so that the respective liquid crystal elements may transmit the lights of different wavelengths or transmit the light of desired wavelength(s).

Moreover, the invention is an optical modulating element characterized in that it is realized by disposing alternately a plural number of liquid crystal panels constituted by sealing liquid crystal between a pair of transparent substrates and a plural number of polarizers including color polarizer, and provided with a plural number of liquid crystal elements constituted by liquid panel and color polarizers disposed on both sides of the liquid crystal panel and means for switching the drive voltage applied to each liquid crystal panel to a plural number of different states so that the respective liquid crystal elements may transmit the lights of different wavelengths or transmit the light of desired wavelength(s).

Moreover, the invention is an optical modulating element characterized in that when passing the light of a wavelength of λ only, each liquid crystal panel is, for the anisotropy of refraction index of liquid crystal Δn, natural spiral pitch p, $$p \cdot \Delta n > \lambda \qquad \text{[formula 4]}$$

p; Natural spiral pitch
Δn; Anisotropy of refraction index of liquid crystal
λ; Wavelength of light of incidence, and in the main wavelength of the light, it is selected in a construction to satisfy $$\mu = \sqrt{(2m)^2 - 1} \qquad \text{[formula 5]}$$

m; Integer

[formula 6]

$$\mu = 2\Delta n d / \lambda$$

d; Thickness of liquid crystal layer

The invention is also characterized in that, when passing the light of a wavelength of λ only, the retardation Δnd of each liquid crystal panel is selected in a way to satisfy $$\frac{\Delta n d}{\lambda} = \frac{(2m' - 1)}{2} \qquad \text{[formula 7]}$$

m'; Integer for the anisotropy of refraction index of liquid crystal Δn, layer thickness of liquid crystal d and integer m'.

Moreover, the invention is a display apparatus characterized in that it makes an indication by irradiating the light of one light source containing the wavelength of a plural number of colors on transmission or reflection type means for displaying and an optical modulating element, it displays the images corresponding to the plural number of colors on the displaying means within the period of afterimage effect, the optical modulating element switching the color of the light that passes within the period of display of the image for each color, the optical modulating element being an optical modulating element constituted by disposing alternately a plural number of liquid crystal panels constituted by sealing liquid crystal between a pair of transparent substrates and a plural number of polarizers including color polarizer, and the optical modulating element constituted with a plural number of liquid crystal elements constituted by liquid panel and color polarizers disposed on both sides of the liquid crystal panel and means for switching the drive voltage applied to each liquid crystal panel to a plural number of different states so that the respective liquid crystal elements may transmit the lights of different wavelengths or transmit the light of desired wavelength(s).

Moreover, the invention is a light detecting apparatus characterized in that it has an optical modulating element which outputs a detecting signal corresponding to the intensity of the light of incidence on the incidence side of the light detecting means, the optical modulating element being an optical modulating element constituted by disposing alternately a plural number of liquid crystal panels constituted by sealing liquid crystal between a pair of transparent substrates and a plural number of polarizers including color polarizer, and the optical modulating element constituted with a plural number of liquid crystal elements constituted by liquid panel and color polarizers disposed on both sides of the liquid crystal panel and means for switching the drive voltage applied to each liquid crystal panel to a plural number of different states so that the respective liquid crystal elements may transmit the lights of different wavelengths or transmit the light of desired wavelength(s).

Moreover, the invention is a color copying machine characterized in that an optical modulating element is disposed in either one light source containing the wavelength of a plural number of colors, a document or photoelectric transfer means on which optical images of the document is formed and which convert optical images into electric signals, provided with means for forming color images on a recording medium by using the developers for the plural number of colors based on the electric signals obtained by the photoelectric transfer means, the optical modulating element being an optical modulating element constituted by disposing alternately a plural number of liquid crystal panels constituted by sealing liquid crystal between a pair of transparent substrates and a plural number of polarizers including color polarizer, and the optical modulating element constituted with a plural number of liquid crystal elements constituted by liquid panel and color polarizers disposed on both sides of the liquid crystal panel and means for switching the drive voltage applied to each liquid crystal panel to a plural number of different states so that the respective liquid crystal elements may transmit the lights of different wavelength or transmit the light of desired wavelength(s).

Moreover, the invention is a printing a platemaking apparatus characterized in that an optical modulating element is disposed in either one light source containing the wavelength of a plural number of colors, a document or photoelectric transfer means on which optical image of the document is formed and which convert optical images into electric signals, provided with processing plate materials means for forming the image of document for each color on the plate materials for a plural number of different colors which become printing plates, based on the electric signals obtained by the means of photoelectric transfer, the optical modulating element being an optical modulating element constituted by disposing alternately a plural number of liquid crystal panels constituted by sealing liquid crystal between a pair of transparent substrates and a plural number of polarizers including color polarizer, and the optical modulating element constituted with a plural number of liquid crystal elements constituted by liquid panel and color polarizers disposed on both sides of the liquid crystal panel and means for switching the drive voltage applied to each liquid crystal panel to a plural number of different states so that the respective liquid crystal elements may transmit the lights of different wavelengths or transmit the light of desired wavelength(s).

Moreover, the invention is an image input/output apparatus characterized in that it photographs object materials for a plural number of colors with means for photographing through an optical modulating element, it either inputs color images by storing image data from means for photographing in an image memory for each color or indicates images with means for displaying and outputs color images by switching the color of transmitted light with the optical modulating element, based on the image data of a plural number of colors stored in the image memory, the optical modulating element being an optical modulating element constituted by disposing alternately a plural number of liquid crystal panels constituted by sealing liquid crystal between a pair of transparent substrates and a plural number of polarizers including color polarizer, and the optical modulating element constituted with a plural number of liquid crystal elements constituted by liquid panel and color polarizers disposed on both sides of the liquid crystal panel and means for switching the drive voltage applied to each liquid crystal panel to a plural number of different states so that the respective liquid crystal elements may transmit the lights of different wavelengths or transmit the light of desired wavelength(s).

Moreover, the invention is an image operating apparatus characterized in that it is provided with a light source which produces a light of a plural number of wavelengths, an optical modulating element which passes only specific wavelength components of the light from the light source, and a plural number of transmission or reflection type displaying elements which either transmit or reflect the light of the remaining wavelength components, the optical modulating element being constituted by disposing alternately a plural number of liquid crystal panels constituted by sealing liquid crystal between a pair of transparent substrates and a plural number of polarizers including color polarizer, and the optical modulating element constituted with a plural number of liquid crystal element constituted by liquid panel and color polarizers disposed on both sides of the liquid crystal panel and means for switching the drive voltage applied to each liquid crystal panel to a plural number of different states so that the respective liquid crystal elements may transmit the lights of different wavelength or transmit the light of desired wavelength(s).

Moreover, the invention is a lighting apparatus characterized in that it irradiates the light from a light source which produces a light of a plural number of wavelengths through an optical modulating element as some of the lights of the plural number of colors, the optical modulating element being constituted by disposing alternately a plural number of liquid crystal panels constituted by sealing liquid crystal between a pair of transparent substrates and a plural number of polarizers including color polarizer, and the optical modulating element constituted with a plural number of liquid crystal elements constituted by liquid panel and color polarizers disposed on both sides of the liquid crystal panel and means for switching the drive voltage applied to each liquid crystal panel to a plural number of different states so that the respective liquid crystal elements may transmit the lights of different wavelengths or transmit the light of desired wavelength(s).

According to the invention, of the light incident on the optical modulating element from one side, the light of specific wavelengths is polarized into a linearly polarized light when passing through the color polarizer while the light of wavelengths other than the specific wavelengths concerned is not converted into a linearly polarized light but is delivered retaining the state of the light of incidence about as it is.

In the case where the drive voltage applied to the liquid crystal panel is mutually switched among a plural number of different states by using means for switching, it is possible for the liquid crystal elements consisting of the liquid crystal panel and the color polarizers on both sides to transmit the lights of wavelengths different from one another or transmit the light of desired wavelength. Thus it becomes possible to switch for passing or not the light of a wavelength corresponding to the color of the color polarizer on the upstream side in the direction of passage of light of the respective liquid crystal elements. By performing this switching operation for each of the plural number of liquid crystal elements, we can obtain colors and non color produced with the mixing of the color of each color polarized plate and those colors. Such action can also be achieved when each of the plural number of liquid crystal elements is constructed in a way to have a liquid crystal panel and a plural number of polarizers including a plural number of color polarizers.

Such a simplified and compact construction can achieve an indicating action with improved indication quality.

When such optical modulating element is combined with means for displaying type or reflection type, the optical modulating element selectively passes the light of a plural number of wavelengths and displays the images corresponding to the plural number of colors within the period of afterimage effect of human beings by displaying means respectively. This enables construction of a color display apparatus. In addition, it is also possible to realize a compact and lightweight electronic apparatus with much improved indication quality by using the optical modulating element for a component producing the light of a plural number of color in not only a display apparatus but also any electronic apparatus which uses the light of colors of a plural number of wavelengths.

As mentioned above, according to the invention, of the light incident on the optical modulating element from one side, the light of specific wavelengths are polarized into a linearly polarized light when passing through the color polarizer while the light of wavelengths other than the specific wavelengths concerned is converted into a linearly polarized light of a direction different from that of the linearly polarized light of specific wavelengths and is delivered in the wavelength band of the light of incidence.

In the case where the drive voltage applied to the liquid crystal panel is mutually switches among a plural number of different states by using means for switching, it is possible for the liquid crystal elements consisting of the liquid crystal panel and the color polarizers on both sides to transmit the lights of wavelength different from one another or transmit the light of desired wavelength. Thus it becomes possible to switch for passing or not the light of a wavelength corresponding to the color of the color polarizer on the upstream side in the direction of passage of light of the respective liquid crystal elements. By performing this switching operation for each of the plural number of liquid crystal elements, we can obtain colors and non color produced with the mixing of the color of each color polarized plate and those colors. Such action can also be achieved when each of the plural number of liquid crystal elements is constructed in a way to have a liquid crystal panel and a plural number of polarizers including a plural number of color polarizers.

Such a simplified and compact construction can achieve an indicating action with improved indication quality.

When such optical modulating element is combined with means for displaying of transmission type or reflection type, the optical modulating element selectively passes the light of a plural number of wavelengths and displays the images corresponding to the plural number of colors within the period of afterimage effect of human beings by displaying means respectively. This enables construction of a color display apparatus. In addition, it is also possible to realize a compact and lightweight electronic apparatus with much improved indication quality by using the optical modulating element in not only a display apparatus but also any electronic apparatus which uses the light of colors of a plural number of wavelengths.

BRIEF DESCRIPTION OF THE DRAWINGS

Other and further objects, features, and advantages of the invention will be more explicit from the following detailed description taken with reference to the drawings wherein:

FIG. 38 is a perspective view explaining the behavior of the ferroelectric liquid crystal at the time of application of voltage, FIG. 39(1)–39(4) is a plan view explaining the state of alignment of the ferroelectric liquid crystal at the time of application of voltage.

DETAILED DESCRIPTION OF THE PREFERRED EMBODIMENTS

Figure 1:
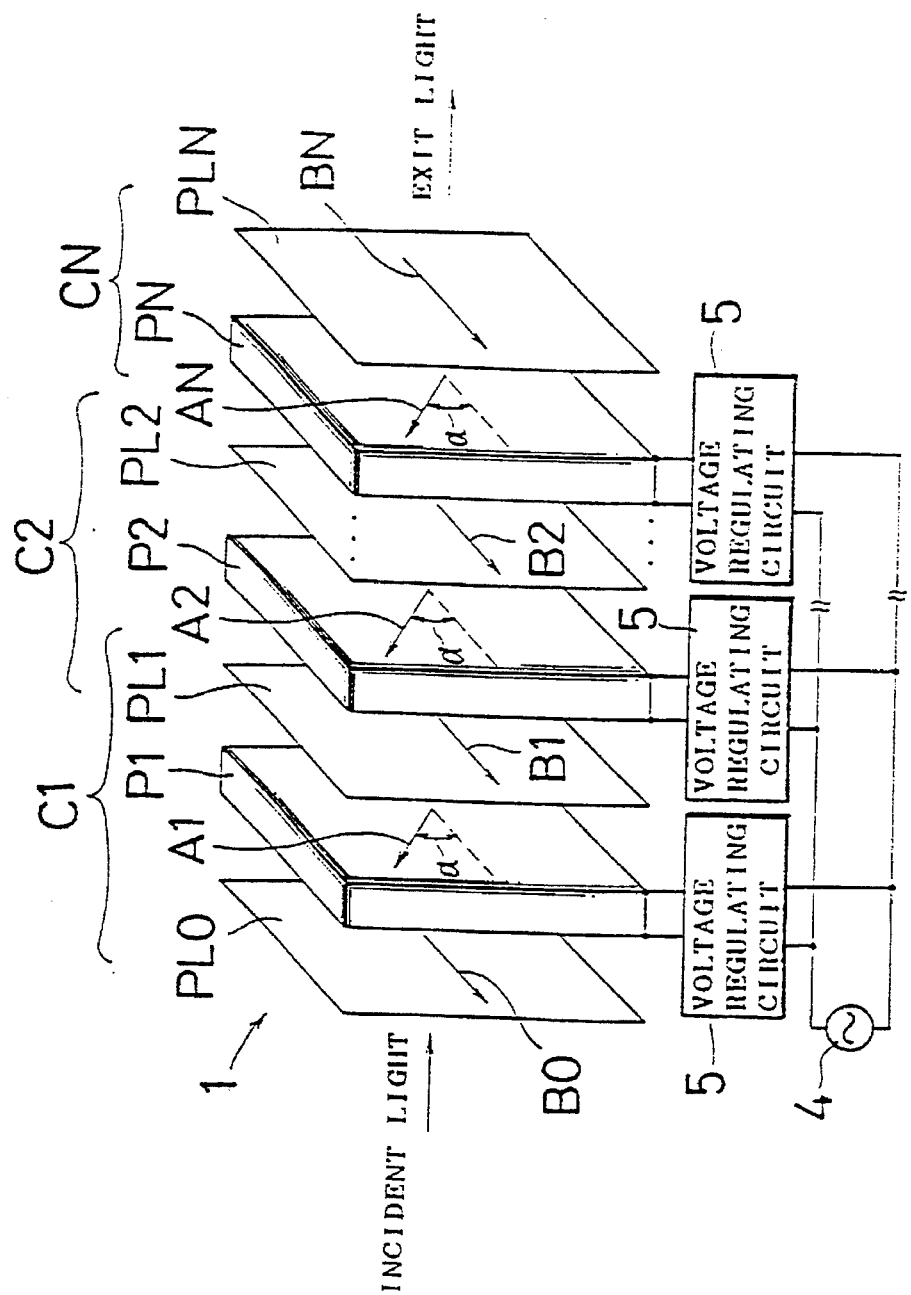
FIG. 1 is a systematic diagram of the optical modulating element 1 of an example of the invention.

Now referring to the drawing, preferred embodiments of the invention are described below.

[Embodiment 1]

Figure 2A:
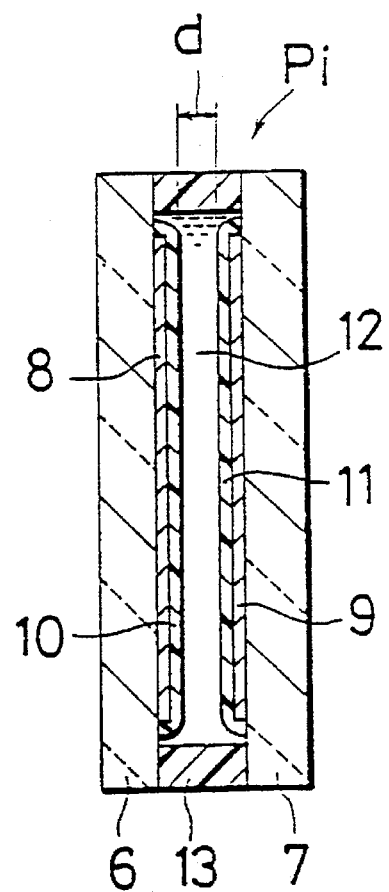
FIG. 2(1)–2(2) shows the construction of the liquid crystal panel Pi.
Figure 2B:
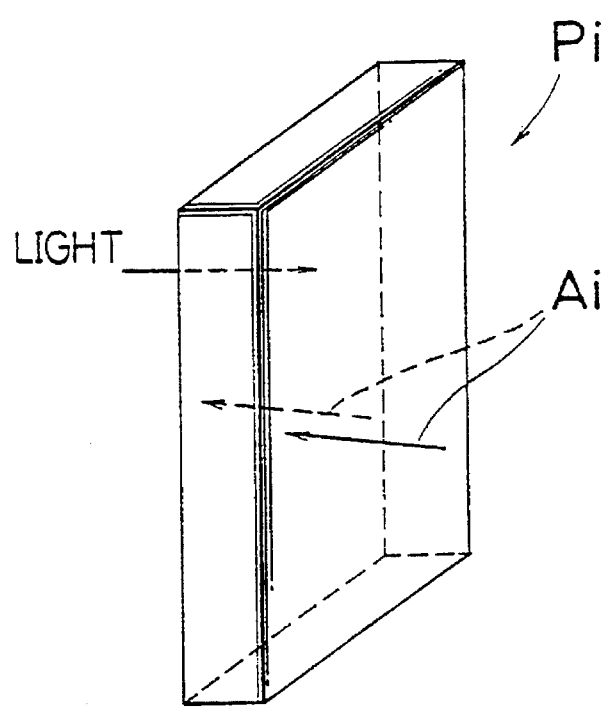
Figure 3:
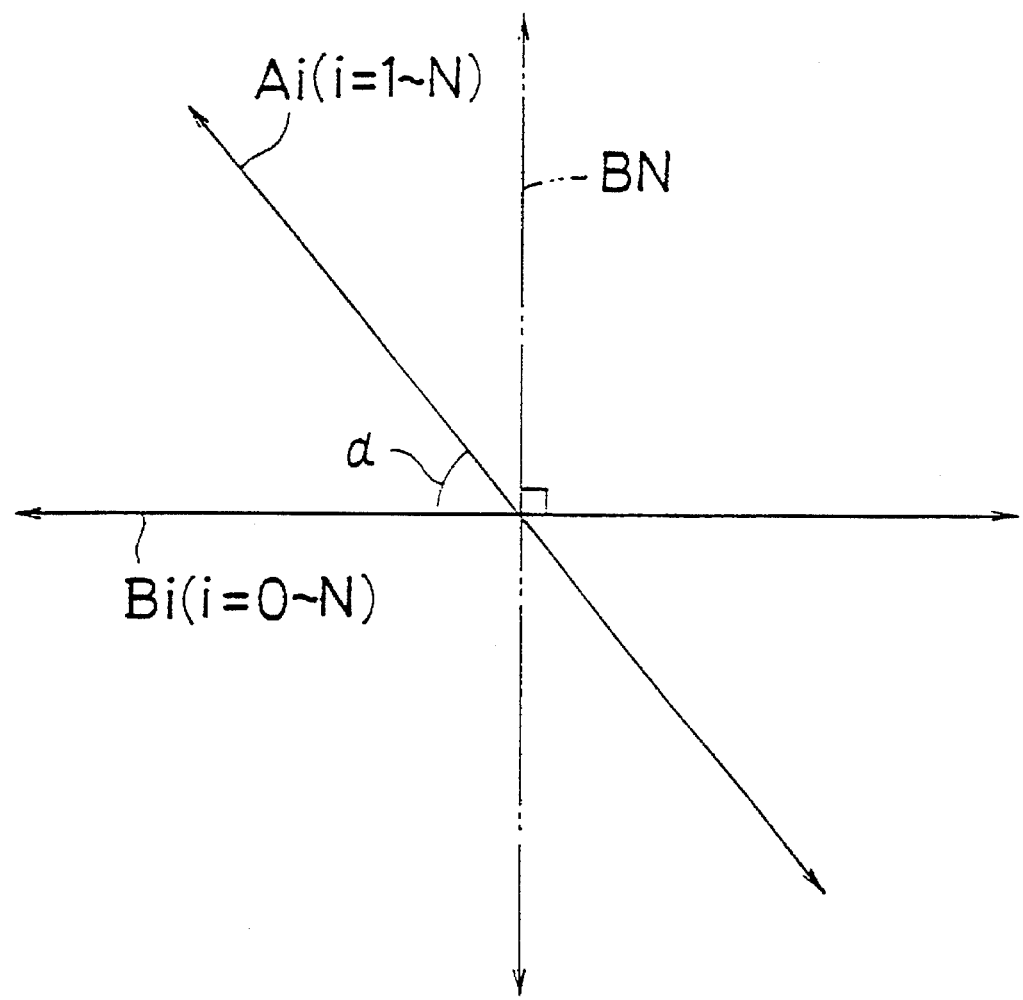
FIG. 3 is a diagram illustrating the optical construction of the optical modulating element 1, FIG. 4(1)–4(4) is a diagram showing the distribution of intensity of transmitted light in each liquid crystal panel Pi.
Figure 4A:
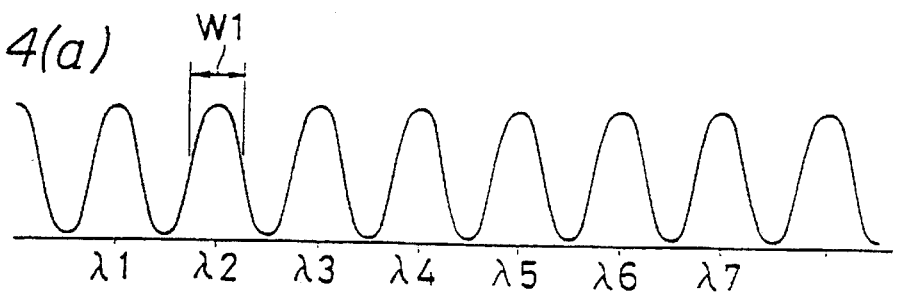
Figure 4B:
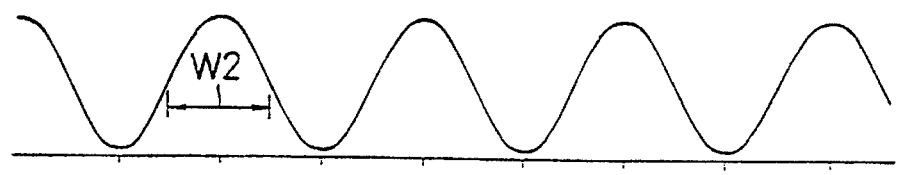
Figure 4C:
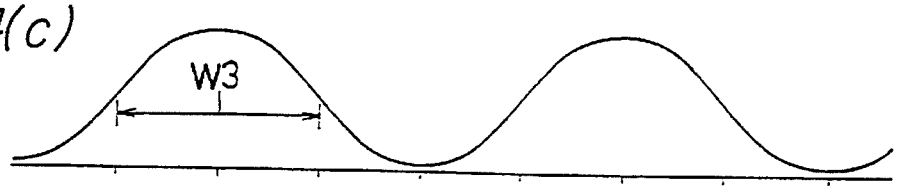
Figure 4D:
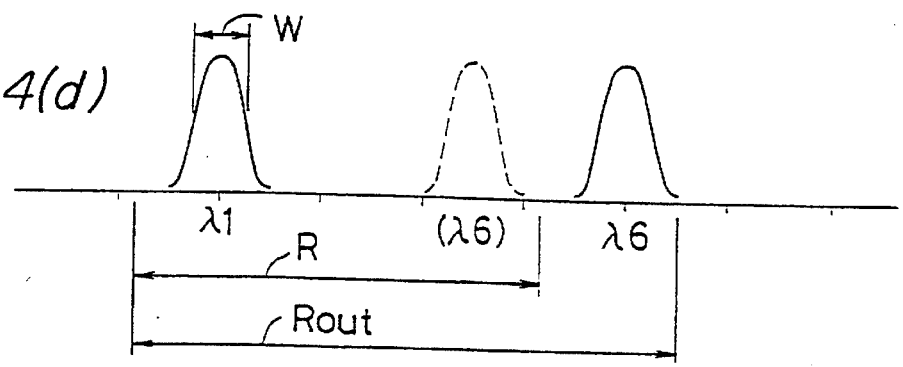

FIG. 1 is an exploded perspective view showing a constitutional example of a photomodulation element 1 in an embodiment of the invention, FIG. 2 is a diagram showing the structure of the photomodulation element 1, and FIG. 3 is a diagram showing an optical composition of the photomodulation element 1. The photomodulation element 1 comprising a polarizer PL0, a liquid crystal panel P1 having a structure as described below, a polarizer PL1, a liquid crystal panel P2, a polarizer PL2, - - -, a liquid crystal panel PN, and a polarizer PLN, which are sequentially arranged on a same optical axis. Herein, the polarizer PO1, liquid crystal panel P1, and polarizer PL1 compose a liquid crystal element C1 which is a constitutional unit, while the polarizer PL1, liquid crystal panel P2, and polarizer PL2 compose a liquid crystal element C2. Thereafter, similarly, the photomodulation element 1 possesses liquid crystal elements C1 to CN. In each liquid crystal panel P1, the applied voltage is individually controlled by plural voltage regulating circuits 5 connected commonly to a power source 4. As a modified example, a common applied voltage may be applied to each liquid crystal panel P1 from a common voltage regulating circuit 5.

The liquid crystal panels P1 possess an identical composition, and on a pair of glass substrates 6, 7, for example, transparent electrodes 8, 9 composed of ITO (indium tin oxide) are formed. Covering the transparent electrodes 8, 9, for example, orientation films 10, 10 made of polyvinyl alcohol or the like are formed, and a liquid crystal 12 possessing double refractive characteristic is placed between them as being sealed in a layer thickness d, and the peripheral edge is sealed with a sealing material 13. The orientation films 10, 11 on each liquid crystal panel Pi are oriented by rubbing treatment or the like. In each liquid crystal panel Pi, as shown in FIG. 2 (2), the orientation directions of the light incident side and exit side are parallel to each other, as indicated by arrow Ai (i=1 to N).

Refer to FIG. 1 and FIG. 3. In the embodiment, the polarizers PL0 to PLN shown in FIG. 1 all possess polarization planes BL to BN in a same direction, while the orientation direction Ai of the liquid crystal panels P1 to PN is selected in a state of crossing at an angle α (for example, 45 degrees). In other embodiments of the invention, as described later, the polarization direction Bi' (1≦i≦N) of at least one polarizer PLI' at the light exit side may be selected, as shown in FIG. 3, in a cross Nicol's state orthogonal to the polarization direction Bi of the remaining polarizer PLi.

In the structural example in FIG. 1, the transmissivity T of the light passing through the liquid crystal element C1 disposed between parallel Nicol's lenses is expressed as follows.

$$T = \cos^2 \frac{\delta}{2} \quad (\alpha = 45°) \qquad \text{[formula 8]}$$

where $$\delta = \frac{2}{\lambda} \cdot \Delta nd \qquad \text{[formula 9]}$$

Supposing the retardation $(\Delta nd)i$ of the i-th liquid crystal element ci to be $$(\Delta nd)i = k^{i-1}(\Delta nd) \qquad \text{[formula 10]}$$

where i=1 to N, $(\Delta nd)1 = \Delta nd$ is retardation of liquid crystal element C1, k: 1<k<3, preferably k=2, then the transmission light intensity T of transmitting through the liquid crystal element CN of the final stage is $$T = \left( \frac{\sin 2^N (\delta/2)}{2^N \sin (\delta/2)} \right)^2 \qquad \text{[formula 11]}$$

FIG. 4 explains the action of each liquid crystal element Ci. In formula (8), the transmissivity T becomes the maximum when $$_2\delta = 2m\Pi \qquad \text{[formula 12]}$$

m; integer

From formulas (9) and (12), the wavelength λ(m)1 when the transmission light intensity reaches the maximum in the liquid crystal element C1 is $$\lambda(m)1 = \Delta nd/2m \qquad \text{[formula 13]}$$

The state of distribution of such transmission light intensity is shown in FIG. 4 (1). In FIG. 4 (1), λ(1), λ(2), - - - are expressed as λ1, λ2, - - -.

On the other hand, at the i-th liquid crystal element Ci, the wavelength λ(m)i where the transmission light intensity is the maximum is, in the case of k=2, $$\begin{aligned}\lambda mi &= 2^{i-1} \Delta nd/2m \\ &= 2^{i-1} \lambda(m)1\end{aligned} \qquad \text{[formula 14]}$$

i: 1, 2 - - -, N

That is, the light of the wavelength of $2^{i-1}$ times the wavelength λ(m)1 given in formula (13) at the liquid crystal element C1 passes at the maximum transmissivity. FIG. 4 (2) and FIG. 4 (3) show the distribution of transmission light intensity of liquid crystal elements C2, C2. In this way, when the incident light sequentially passes the liquid crystal elements C1, C2 - - -, in the distribution curves shown in FIGS. 4 (1) through 4 (3), only the wavelength corresponding to the peak portion pass, while the light of the remaining wavelengths is cut off, or the transmission light intensity is suppressed. Thus, from the photomodulation element 1 in the composition shown in FIG. 1, for example, the light of the wavelengths λ1, λ6 shown in FIG. 4 (4) is obtained.

Conforming to such principle, if desired to obtain the light of desired wavelength λ0 from the photomodulation element 1 shown in FIG. 1, the integer m in formula (12) is obtained from the condition where the transmission light intensity of each liquid crystal element Ci may reach the maximum at this wavelength λ0, that is, the condition of Equation 13 obtained from Equations 12 and 9 where the transmissivity T of Equation 8 is the maximum, and the condition of determining the desired degree of the width at half maximum W shown in FIG. 4 (4) of the transmission light obtained finally from the photomodulation element 1, and the retardation Δnd of the liquid crystal element C1 is determined from Equation 13.

Here, what defines the half-value width W of the transmission light obtained finally is the widths at half maximum W1, W2, W3, - - - shown in FIG. 4 (1) to FIG. 4 (3) of each liquid crystal element Ci, and these half-value widths wi (i=1 to N) are determined by the pitch of the transmission light intensity distribution curve, and this pitch is determined by the integer m as shown in Equation 13.

Figure 7:
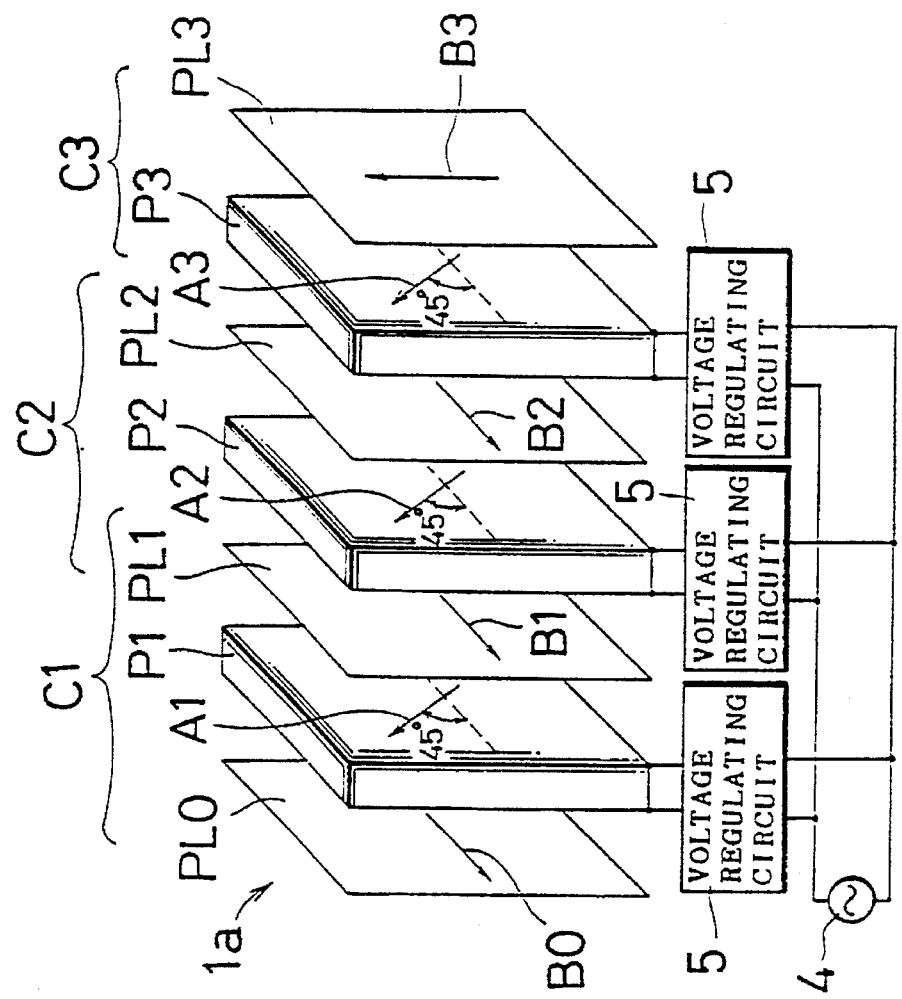
FIG. 7 is a systematic diagram of another example of the invention.

Besides, the number of layers N of the liquid crystal element Ci is determined so that the bandwidth Rout of the transmission light of the photomodulation element 1 shown in FIG. 4 (4) may be a specified width. That is, the number of layers N is selected so that the bandwidth Rout may be determined in order that the wavelength λ6 may be outside of the visible light band R. On the other hand, if the wavelength λ6 is within the visible light band R, the polarization direction of at least one polarizer at the exit side of the light should be set in a state of orthogonally crossing the remaining polarizers, and as shown in FIG. 7, for example, the polarization plane BN of the final polarizer PLN (in this example, N=3) is select in a cross Nicol's state with the remaining polarizers PL0, PL1, PL2, so as to use the photomodulation element 1a for cutting off the light of the wavelength λ6 with the polarizer PLN.

Figure 5:
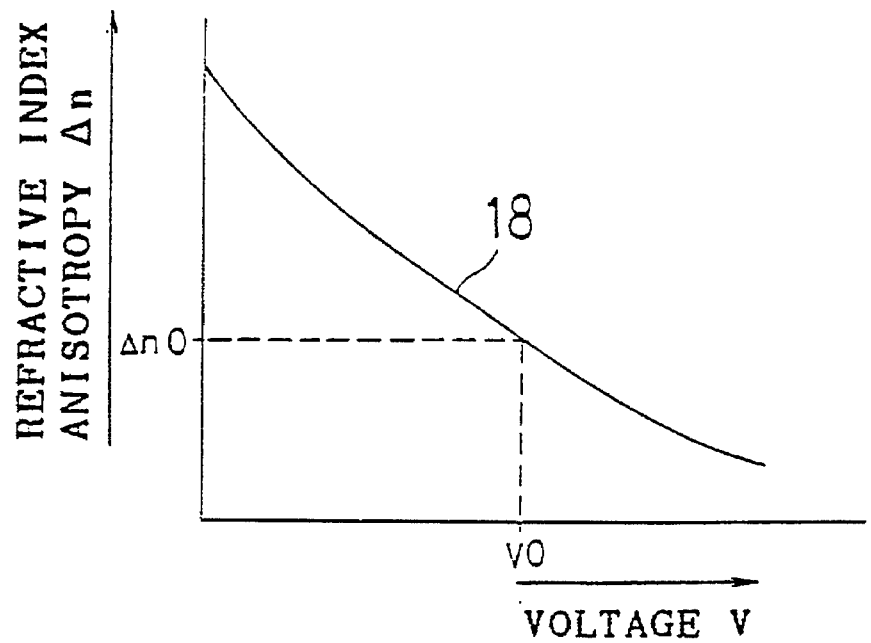
FIG. 5 is a graph explaining the voltage dependence of the anisotropy of refraction index $\Delta n$.
Figure 6:
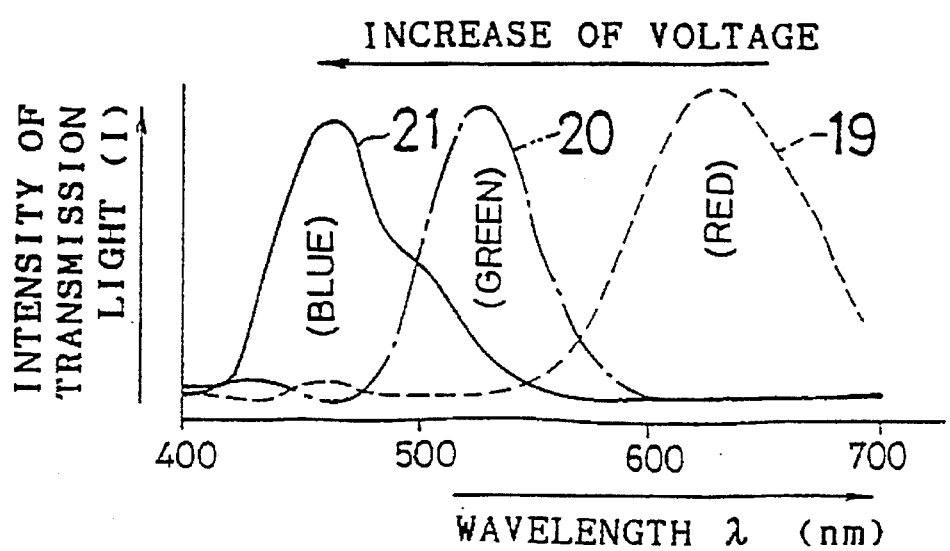
FIG. 6 is a graph explaining the optical characteristics of the optical modulating element 1.

As shown in FIG. 5, the refractive index anisotropy Δn of the liquid crystal 12 of each liquid crystal panel Pi is known to vary with the applied voltage V, and when the refractive index anisotropy Δn varies, the wavelength λ(m)i of the transmission light as the maximum transmissivity is changed from formula (13). In other words, when the voltage applied to each liquid crystal panel Pi is properly adjusted by using the voltage adjusting circuit 5 shown in FIG. 1, the lights of wavelengths of red, green and blue are obtained from the photomodulation element 1 as shown in FIG. 6, and therefore the light of any desired wavelength may be obtained. In this way, the photomodulation element 1 may be used as a color filter for full color display.

Here, to satisfy formula (10), the refractive index anisotropy Δn is varied in each liquid crystal panel Ci, or the layer thickness d of the liquid crystal 12 is varied. In this embodiment, the layer thickness d of each liquid crystal panel Pi is changed. That is, the layer thickness di of the i-th liquid crystal panel Pi is determined as $$d_i = 2^{i-1} d \quad \text{[formula 15]}$$

where i=1 to N.

If d1=d, it is the layer thickness of the liquid crystal 12 of the liquid crystal panel P1.

Figure 8:
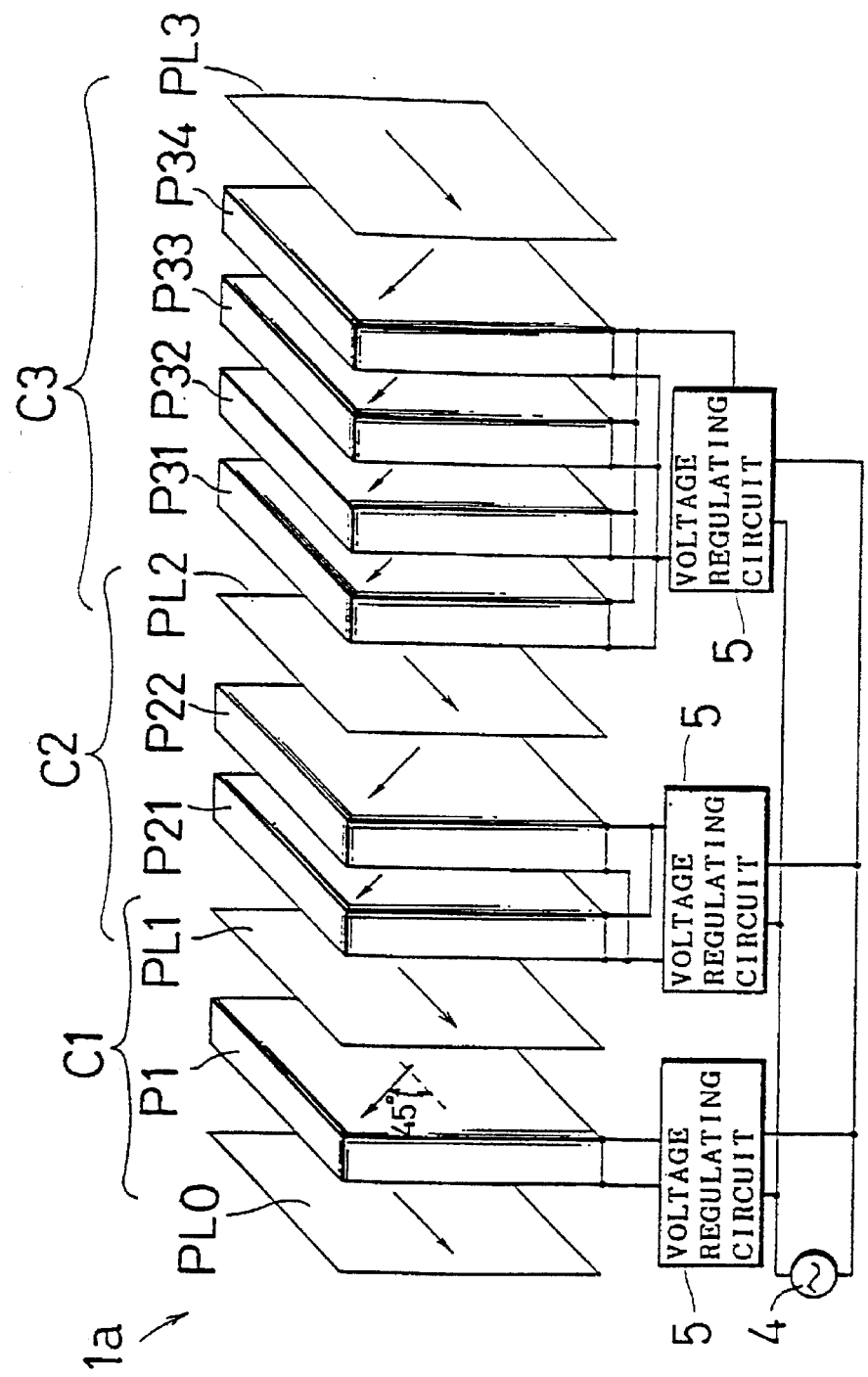
FIG. 8 is a systematic diagram of still another example of the invention.
Figure 9:
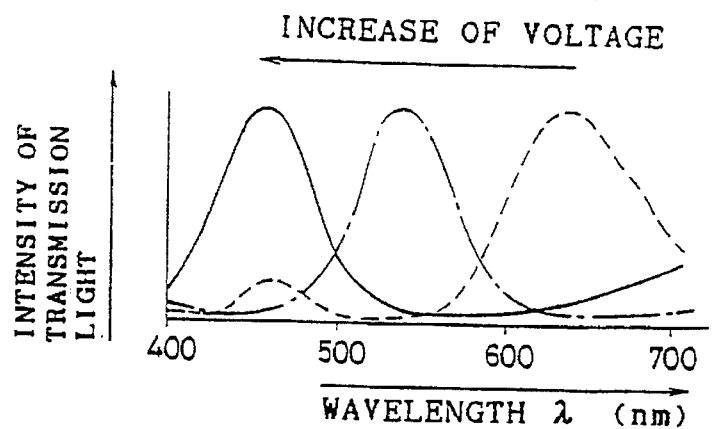
FIG. 9 is a graph explaining the optical characteristics of the optical modulating element 1a, FIG. 10 is a block diagram indicating an example of construction of the light modulating element 1b of another example.

In its application, such as the use of the photomodulation element 1 in combination with active matrix liquid crystal display device for monochromatic display for multicolor or full-color display, a high speed is required in the color change. To operate the photomodulation element 1 at high speed, it is necessary that the dislocation of the liquid crystal molecules in the array direction corresponding to specified change of applied voltage be done at high speed. Accordingly, the layer thickness d of each liquid crystal panel Pi should be as small as possible, but in this embodiment since the cell thickness d of each liquid crystal panel Pi is selected to be different individually as mentioned above, as shown in FIG. 8, a modified example is possible, in which each liquid crystal panel Pi is formed in multiple layers, the cell thickness d is suppressed in individual liquid crystal panels Pi, and the response of each liquid crystal panel Pi is improved. That is, the liquid crystal element C2 comprises polarizer PL1, liquid crystal panels P21, P22, and polarizer PL2, and the liquid crystal element C3 comprises polarizer PL2, liquid crystal panels P31, P32, P33, P34, and polarizer PL3. The sum of the layer thicknesses of the liquid crystals of the liquid crystal panels P21, P22 is controlled to be the value specified in Equation 15. The intensity distribution of the transmission light in this modified example was measured, and the distribution as shown in FIG. 9 was obtained.

On the other hand, to obtain a high response speed, it is necessary to consider also the viscosity of the liquid crystal material. The viscosity of the liquid crystal is desired to be as low as possible, and generally at 35 centipoise (cp) or less, the effect for realizing the invention is shown, but more preferably it is desired to be 25 centipoise or less, as clarified by the experience of the present inventors. The liquid crystal materials showing such characteristics include biphenyl compound, phenylester compound, cyclohexane compound, phenylpyrimidine compound, dioxane compound, tolan compound, alkenyl compound, and fluorine compound, or their mixtures.

Using the liquid crystal composition made of such materials, a photomodulation element as shown in FIG. 1 was composed, and the applied voltages were changed over to obtain three wavelengths λ1, λ2, λ3 as shown in FIG. 6, and the response speed was measured, and a high speed response of several milliseconds was obtained. Incidentally, the one field period of 1/60 sec of the television video signal of the NTSC system is about 17 msec. Hence, for example, it is possible to realize a composition in which a red image, a green image and a blue image are displayed for 5 msec each in one field period, and the photomodulation element 1 changes over in synchronism to transmit the lights of red, green and blue color. It is thus possible to display in multiple colors or full colors by using the photomodulation element 1. That is, a color filter of small size, light weight, and simple structure is realized.

Figure 10:
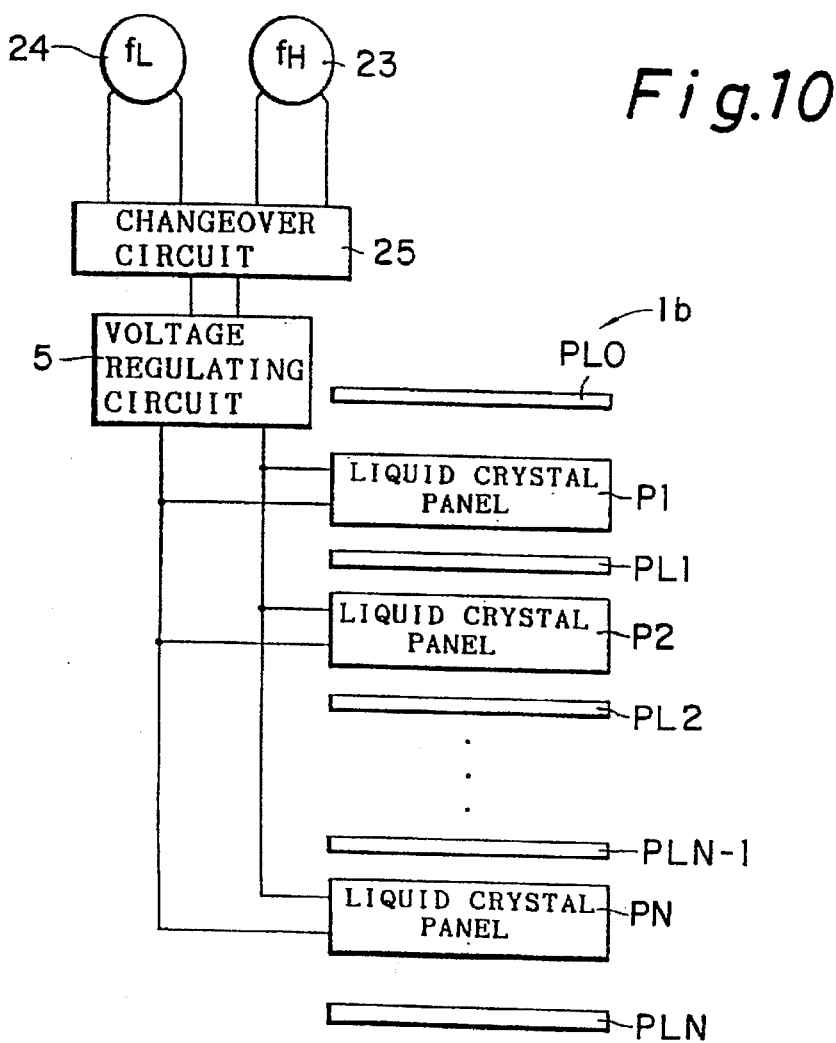

FIG. 10 is a block diagram showing the constitution of a photomodulation element 1b as a modified example of the invention. In this embodiment, the driving voltage applied to the plural liquid crystal panels P1 to Pn is selected properly in a changeover circuit 25 for changing over the outputs of a high frequency power source 23 for generating a relatively high frequency fH (e.g. 10 kHz), and a low frequency power source 24 for generating a relatively low frequency fL (e.g. 100 Hz), and the selected output is adjusted in a voltage adjusting circuit 5 as in the preceding embodiment, and is supplied to each liquid crystal panel Pi.

That is, the liquid crystal used in each liquid crystal panel Pi is a two-frequency driving liquid crystal, for example, TX2A (manufactured by BDH) in which the dielectric constant anisotropy Δε is positive at relatively low frequency voltage, and the dielectric constant anisotropy Δε is negative at high frequency voltage, and it is used, for example, at a layer thickness of d=5 μm by using a 5 μm spacer. That is, when the driving voltage from the low frequency power source 24 is adjusted in the voltage regulating circuit 5, and is supplied to the liquid crystal panel Pi, the liquid crystal of each liquid crystal panel Pi changes from the homogeneous array gradually to a homeotropic array as the applied voltage increases, and corresponding to this change, the refractive index anisotropy Δn decreases. To return to the initial homogeneous array from this state, the driving voltage from the high frequency power source 23 is used, and is adjusted to a low voltage in the voltage regulating circuit 5. Hence, a high speed restoration is realized, and the operation of the photomodulation element 1b may be done at high speed, for example, 5 to 10 ms.

The two-frequency driving liquid crystal is, in order to widely define the effective operating temperature range of the liquid crystal and to realize low viscosity, composed of a mixed liquid crystal by using a material of relatively weak polarity as the base material, such as alkoxyphenyl cyclohexycarboxylate, alkylphenyl cycloxycarboxylate, and alkoxyphenyl cyclohexane, and further adding a material of low dielectric dispersion frequency, for example,

[chemical formula 1]

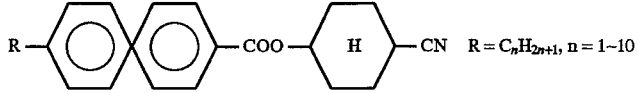

[chemical formula 2]

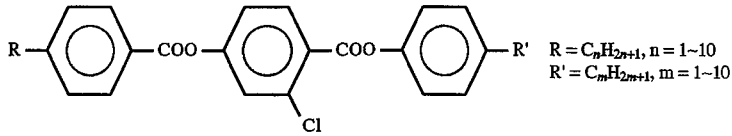

[chemical formula 3]

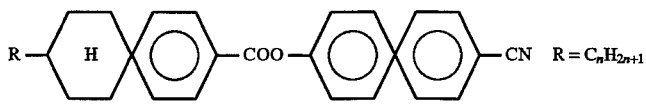

[chemical formula 4]

Moreover, using a material having a large negative value of dielectric constant anisotropy $\Delta\epsilon$ such as 2,3-dicy ano-1,4-hydroquinone derivatives given below, the overall dielectric constant anisotropy and cutoff frequency (that is, the frequency for changing over positive and negative polarity of the dielectric constant anisotropy $\Delta\epsilon$) are adjusted.

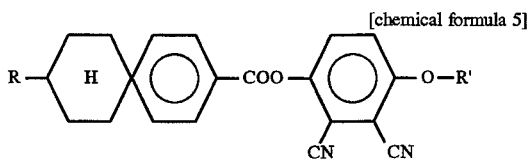

[chemical formula 5]

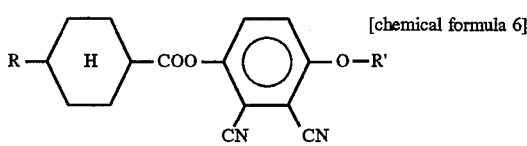

[chemical formula 6]

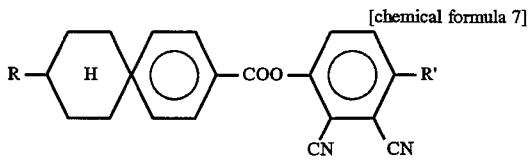

[chemical formula 7]

In the preceding embodiments, the number N of the liquid crystal panels Pi for composing the photomodulation elements 1, 1a, 1b is not particularly limited numerically, but are properly selected in consideration of the color purity of the light of specified wavelengths obtained by using the photomodulation elements 1, 1a, 1b. Besides, the types of the polarizers 2, 3 and liquid crystal material, the conditions of the layer thickness d of the liquid crystal 12, and the installation conditions of the liquid crystal panels Pi and polarizers 2, 3 are properly selected.

In these embodiments, all polarizers PL0 to PLN are explained as parallel Nicol's arrangement, but in order to obtain the desired bandwidth or transmission wavelength, setting of vertical Nicol is possible at least in one liquid crystal element Ci. According to the experiment by the present inventors, at the number of layers of N=3, the composition of vertical Nicol for the liquid crystal element C3 at the exit side has been confirm to present a favorable filter action as a color filter of 400 to 700 nm.

Similar effects may be achieved by using other liquid crystal materials, such as the liquid crystal material with negative dielectric constant anisotropy $\Delta\epsilon$ including nemtatic liquid crystal, the liquid crystal panel composed of surface treatment agent in the vertical orientation system, and smectic liquid crystal. In the foregoing embodiments, a glass substrate is used as the substrate for the photomodulation elements 1, 1a, 1b, but as a modified example, by replacing with a plastic substrate such as synthetic resin material, the weight may be reduced. Furthermore, for the purpose of correcting the wavelength characteristic of the transmission light, a phase different plate composed of high molecular film such as polycarbonate and polyvinyl alcohol is inserted between the polarizers 2, 3, or a specified dichroic pigment may be added to the liquid crystal material. Or, instead of the voltage regulating circuit 5 used in the photomodulation element 1, it may be composed to control the temperature of the liquid crystal 12 of each liquid crystal panel Pi.

Explained below is an application example of the photomodulation elements 1, 1a, 1b into electronic appliances.

Figure 11:
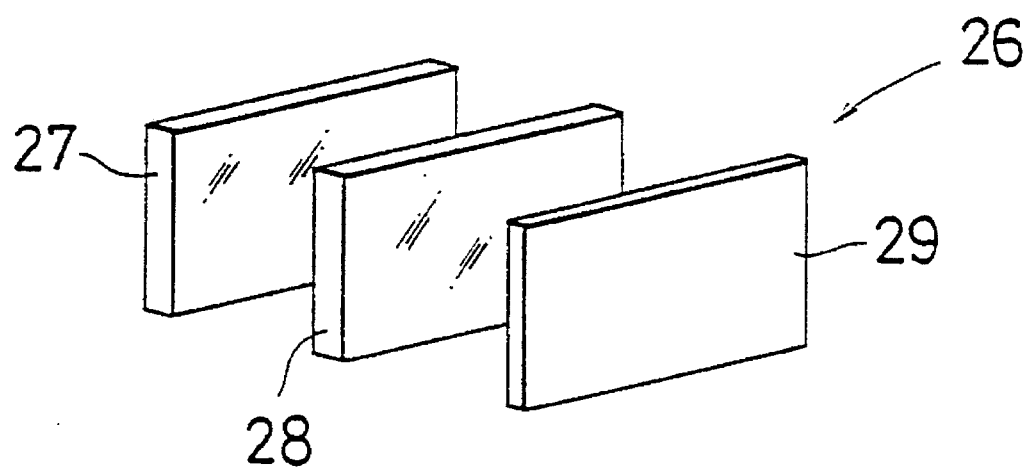
FIG. 11 is a decomposed perspective view of the liquid crystal display apparatus 26 of another example of the invention.
Figure 12:
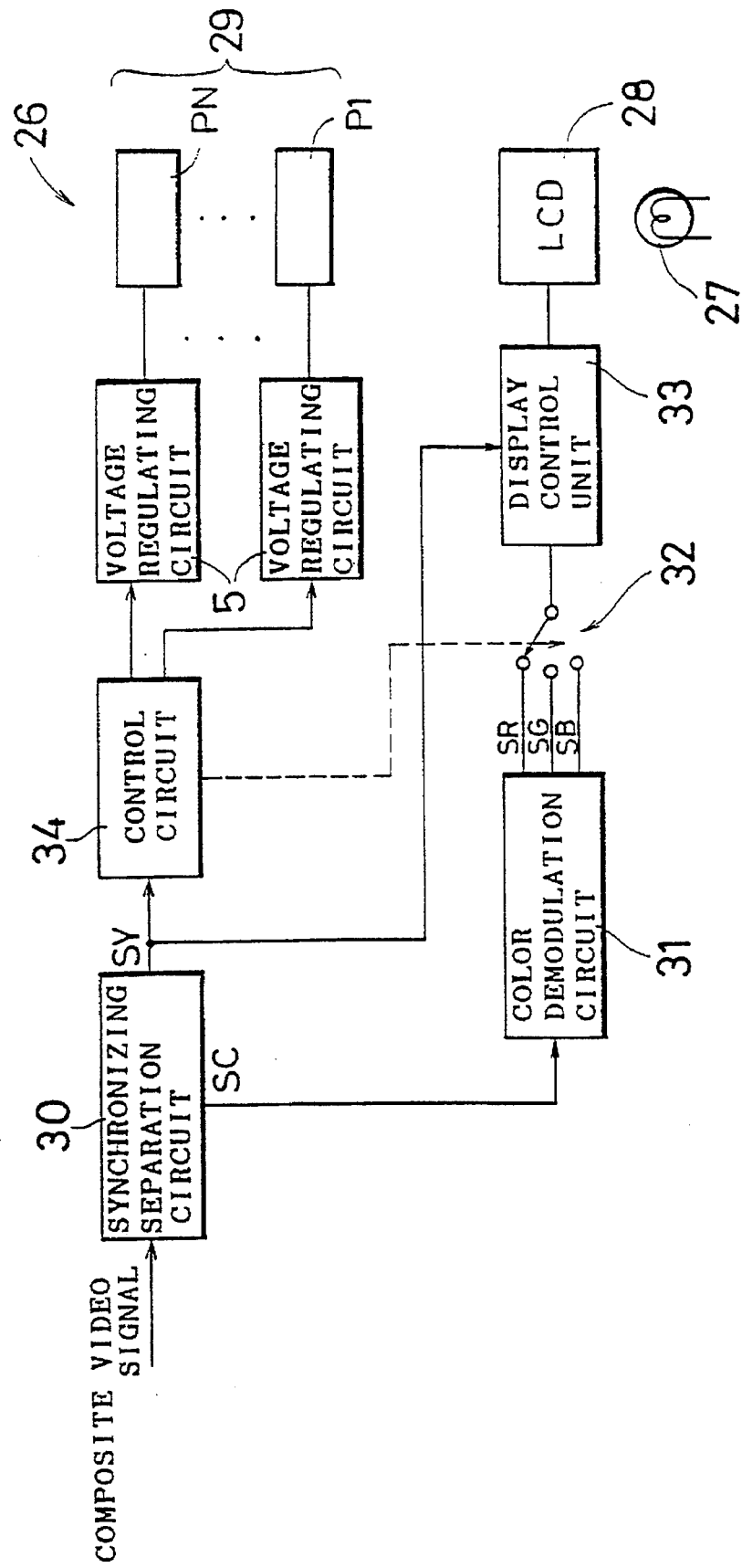
FIG. 12 is a block diagram of the liquid crystal display apparatus 26.

FIG. 11 is an exploded perspective view of a liquid crystal display device 26 as an embodiment of an electronic appliance, and FIG. 12 is a block diagram showing an electric composition of the liquid crystal display device 26. In the drawings, for the sake of simplicity, the diffusion plate, polarizer and other peripheral materials are omitted. The liquid crystal display device 26 comprises a back light source 27 for generating white light as surface light source, a liquid crystal display element 28 of active matrix type applying a nonlinear switching element for high speed monochromatic display (thin film transistor, metal-insulation film-metal structure switching element, etc.), and a liquid crystal color filter 29 as application example of photomodulation elements 1, 1a, 1b explained in the preceding embodiments.

The composite video signal supplied in the liquid crystal display device 27 is fed into a synchronous separation circuit 30, and a synchronous signal SY is separated, and the remaining color signal SC is fed into a color demodulation circuit 31, which produces image signals SR, SG, SB corresponding to the red, green and blue color. The video signals of each color SR, SG, SB are sequentially selected in a changeover circuit 32, and are fed into a display control unit 33. The display control unit 33 scans the liquid crystal display element 28, and monochromatically displays the color image signals SR to SB.

On the other hand, the synchronous signal SY is fed into a control circuit 34, and the control circuit 34 operates the changeover circuit 32 is synchronism with the synchronous signal SY, and also controls the voltage regulating circuit 5 connected to the liquid crystal panels P1 to PN, and synchronously changes over the liquid crystal color filter 29 as to sequentially transmit the lights of red, green and blue, corresponding to the monochromatic display of each color displayed by the liquid crystal display element 28. Here, one field period of the composite video signal of NTSC system is 1/60 sec, that is, about 17 msec, and when monochromatic images corresponding to red, green and blue images are sequentially displayed within this one field period, the liquid crystal color filter 29 changes over the colors at high speed in synchronism as mentioned above. Thus, using the liquid crystal color filter 29 of the invention, the liquid crystal display device 26 for multicolor display or full color display is realized.

Therefore, in the liquid crystal display device 26 of the invention, as compared with the constitution employing the conventional microcolor filter, the resolution is three times or more higher substantially, and the display quality is outstandingly improved, while the manufacturing process is simplified, the yield is improved, and the constitution is simplified because the microcolor filter of microstructure is not formed on the liquid crystal display element 28.

Figure 13:
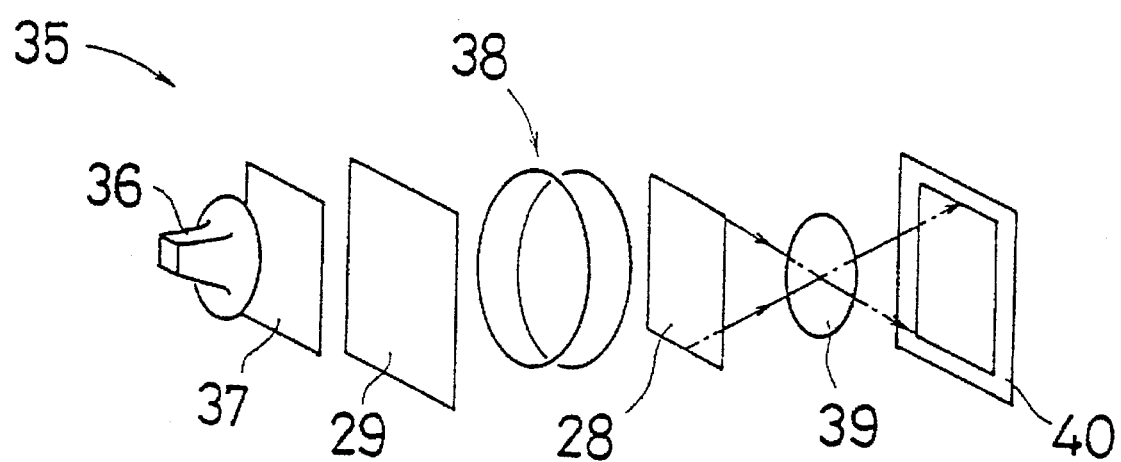
FIG. 13 is a systematic diagram of the projection type display apparatus 35.

FIG. 13 is a schematic diagram of a projection type display device 35 as other embodiment of the electronic appliance of-the invention. In the projection type display device 35, for example, a light source 36 for generating a white light, an ultraviolet ray cut-off filter 37, the liquid crystal color filter 29, and a lens 38 are arranged on a same optical axis, and the liquid crystal display element 28 and lens 38 are disposed on the same optical axis, and the optical image is projected and displayed on a screen 40. In such projection type display device 35, hitherto, for example, a disc mechanically rotated and driven is disposed between the ultraviolet ray cut-off filter 37 and lens 38, and this disc is a mechanical color filter forming color filters of red, green and blue in the circumferential direction. As compared with such constitution, in this embodiment, mechanical driving parts are not needed, and the durability is enhanced, noise is reduced, the life is extended, and the structure is downsized.

Figure 14:
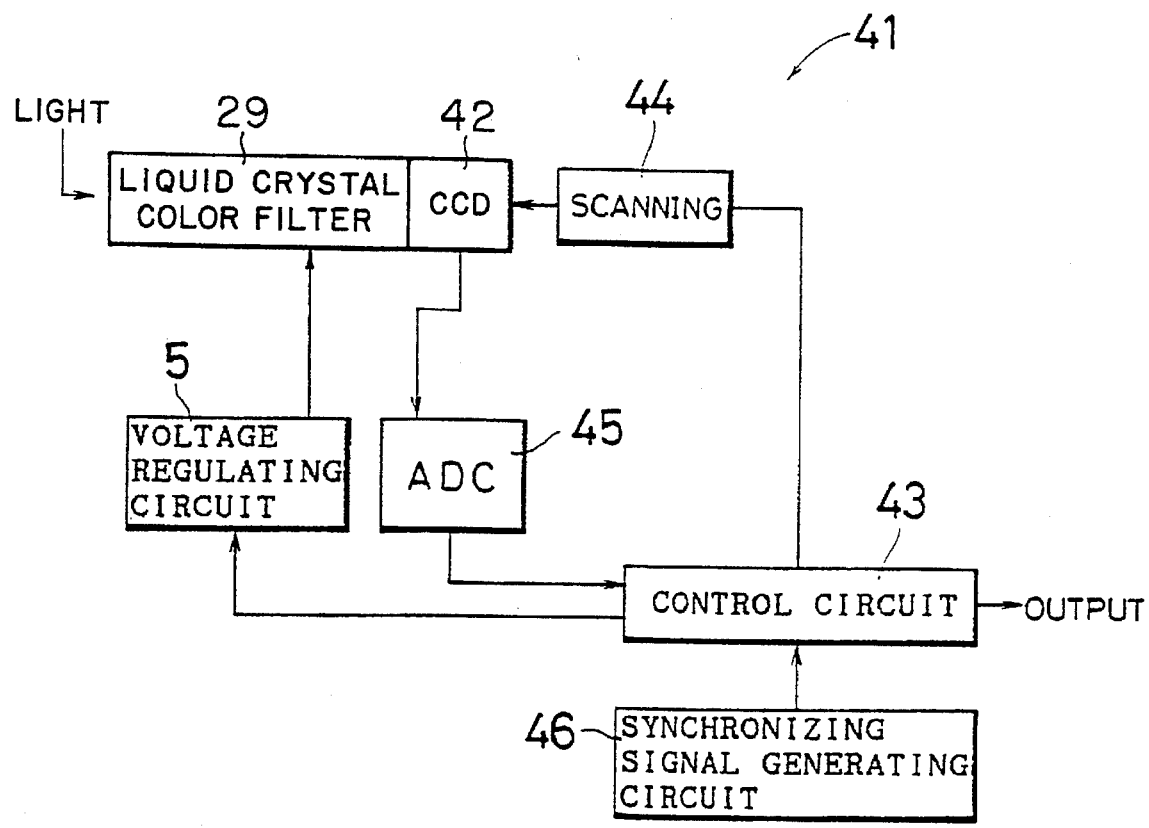
FIG. 14 is a block diagram of the color camera apparatus 41.

FIG. 14 is a block diagram of a color image pickup device 41 as another embodiment of electronic appliance of the invention. The color image pickup device 41 of the embodiment comprises a solid-state image pickup element 42 composed of CCD element or the like, and the liquid crystal color filter 29 is installed at the light incident side to the solid-state image pickup element 42. A control circuit 43 controls a scanning circuit 44 to scan the rasters of the solid-state image pickup element 42. By every scanning of one screen of the solid-state image pickup device 42, the voltage regulating circuit 5 is controlled so that the liquid crystal color filter 29 may sequentially transmit the lights of, for example, red, green and blue color. Therefore, the image signals corresponding to the red image, green image and blue image of the object of taking are sequentially read out from the solid-state image pickup element 42, and each image signal is converted into a digital signal in an analog/digital converter 45, and is read into the control circuit 43. The control circuit 43 is combined with a synchronous signal generating circuit 46 for generating a synchronous signal for synchronously controlling the scanning circuit 44 and voltage regulating circuit 6.

In this way, the color image pickup device 41 of the embodiment is free of the necessity of using microcolor filter at the light incident side of the solid-state image pickup element 42 as explained in the prior art, and the resolution is substantially improved by three times or more, and the image quality is enhanced. Besides, as compared with the ease of mounting microcolor filter, the manufacturing procedure and construction are simplified, and the yield is improved.

Figure 15:
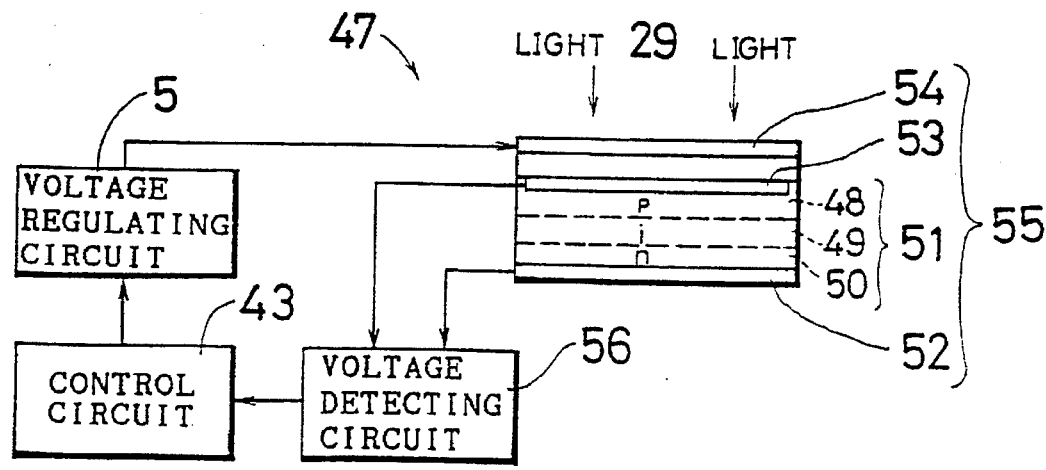
FIG. 15 is a block diagram of the color sensor 47.

FIG. 15 is a block diagram of a color sensor 47 as a different embodiment of the electronic appliance of the invention. The color sensor 47 is used as the means of reading the reference white copy when adjusting the white balance in, for example, facsimile communication equipment. The color sensor 47 comprises a photoelectric converting part 51 composed of p-layer 48, i-layer 49 and n-layer 50 of amorphous silicon, a back electrode 52 formed on the n-layer 50, a transparent electrode 53 composed of ITO (indium tin oxide) or the like formed on the p-layer 48, and a sensor main body 55 including a glass substrate 54.

At the light incident side of the sensor main body 55, the liquid crystal color filter 29 is installed. The control circuit 43 controls the voltage regulating circuit 5 so that the liquid crystal color filter 29 may sequentially transmit the lights of, for example, red, green and blue. Upon every changeover of colors, the voltage detecting circuit 56 detects the voltage between the back electrode 52 and transparent electrode 53. That is, the transmission light intensity of every color can be detected.

In such color sensor 47, conventionally, three color filters of red, green and blue are mounted on the sensor main body 55, and the back electrode 52 and transparent electrode 53 are separated into individual color filters. As compared with such prior art, the structure is simplified and downsized in this embodiment.

Figure 16:
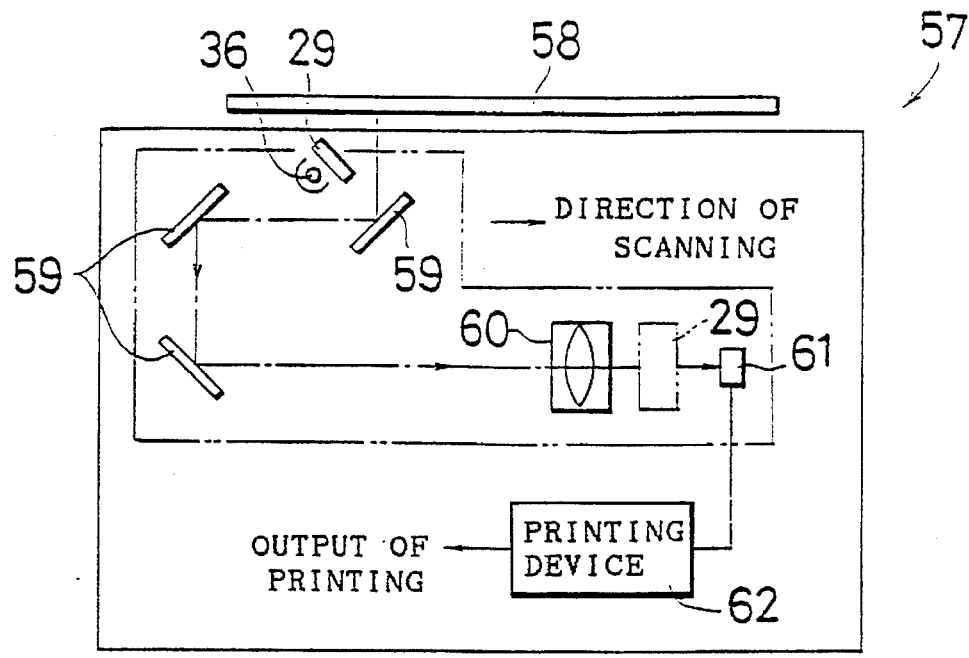
FIG. 16 is a systematic diagram of the color copying machine 57.

FIG. 16 is a block diagram of a color copier 57 as a further different embodiment of the electronic appliance of the invention. In the color copier 57, the light source 36 is a white light source which is used when reading the document image by emitting light to the document 58, and the liquid crystal color filter 29 is placed between the light source 36 and the document 58. The reflected light from the document 58 enters an image sensor 61 such as CCD element, through plural reflectors 59 and an optical device 60. That is, the document 58 is scanned every time the liquid crystal color filter 29 is changed over, for example, to red, green and blue, and the image sensor 61 reads the document image corresponding to each color.

The output of the image sensor 61 is fed into a printing device 62, and the printing device 62 produces a color copy by printing plural times on a single recording paper, by using color developers of plural colors corresponding to the three colors. The printing device 62 is composed of, for example, laser generating device, photosensitive drum on which laser beam is emitted, and developing device containing the color developers.

In such color copier 57, therefore, the mechanical structure for changing over the colors of the light source light emitted to the document 58 is not needed, and the structure is simplified and the durability is enhanced. As other modified example of the embodiment, instead of the liquid crystal color filter 29 installed near the light source 36, it may be disposed on the optical path before the image sensor 61 as indicated by double dot chain line in FIG. 12. In such constitution, too, the same effects as mentioned above may be brought about.

Figure 17:
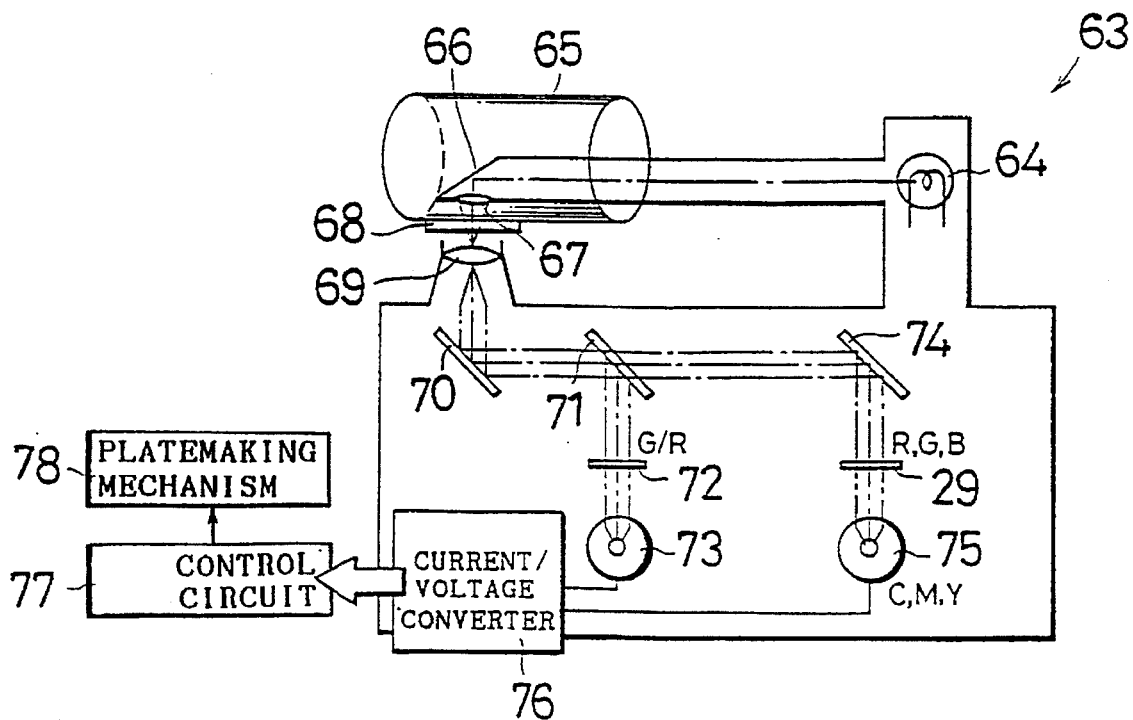
FIG. 17 is a systematic diagram of the color printing & platemaking apparatus 63.

FIG. 17 is a schematic diagram of a color print platemaking device 63. The platemaking device 63 has a halogen lamp 64 as the light source, and the light source light is led into a document cylinder 65 composed of a right cylindrical glass or the like, and is focused on a color document film 68 installed in the document cylinder 65 through reflector 66 and converging lens 67. The light transmitting through the color document film 68 is led into a half-mirror 71 through pickup lens 69 and reflector 70. The light reflected by the half-mirror 71 enters a photo tube 73 through green or red filter 72.

On the other hand, the light transmitting through the half-mirror 71 is reflected by a reflector 74, and enters a photo tube 75 by passing through the liquid crystal color filter 29. The current corresponding to the quantity of incident light from the photo tubes 73, 75 is converted into a voltage in a current/voltage converter 76, and is given to a control circuit 77, and the control circuit 77 controls a platemaking mechanism 78, and makes a plate material for lithography, letterpress, intaglio or screen print.

In such color print platemaking device 63, too, it is free from the need of installing filters of red, green and blue, and plural photo tubes corresponding to them, and the structure may be downsized and simplified.

Figure 18:
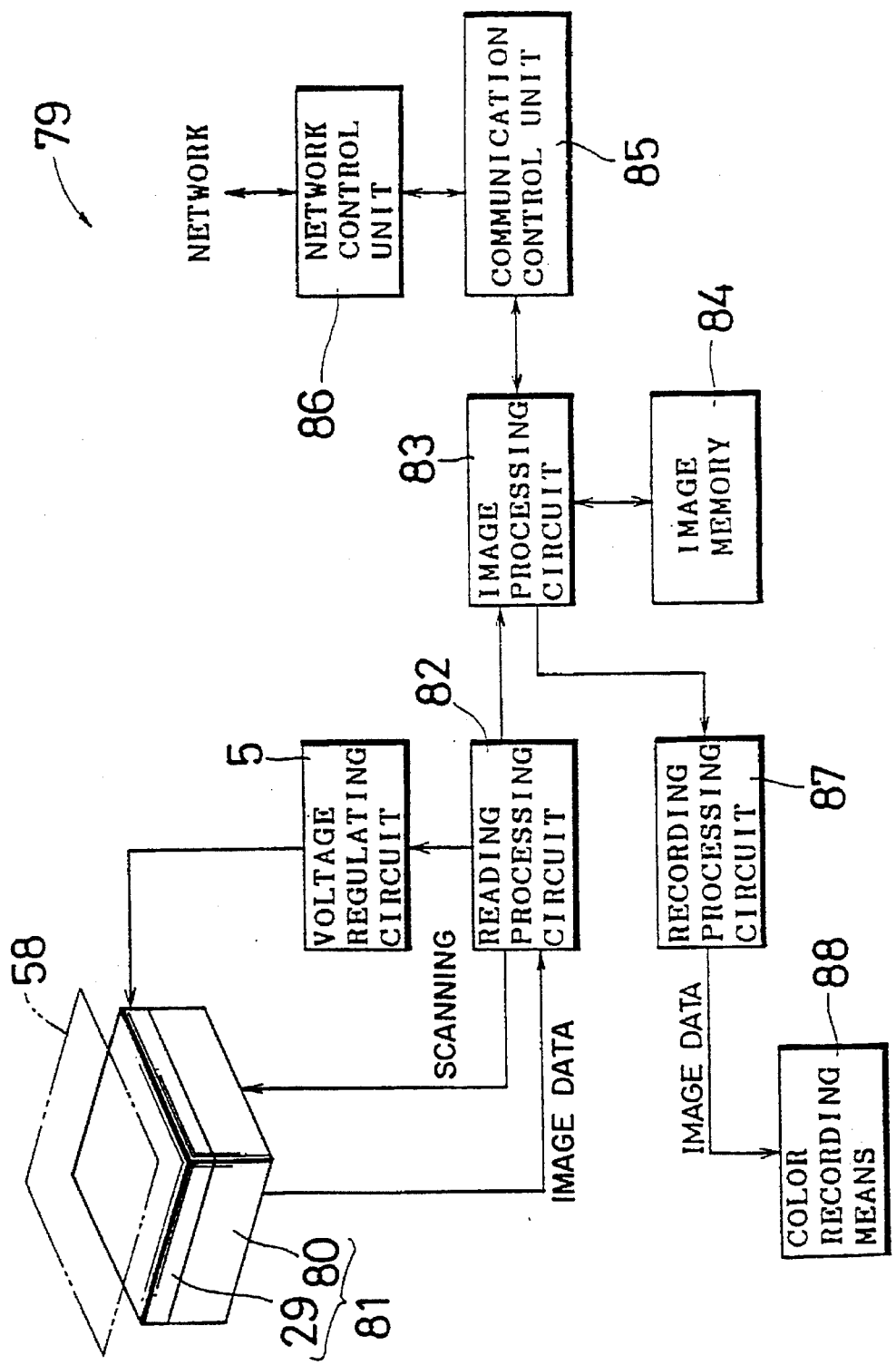
FIG. 18 is a block diagram of the color facsimile apparatus 79.

FIG. 18 is a block diagram of a color facsimile apparatus 79 for transmitting color images. The color document 58 to be read is read by a reading element 81 laminating the liquid crystal color filter 29 and line image sensor 80, every time the liquid crystal color filter 29 is change over in three colors. That is, the reading processing circuit 82 controls the voltage regulating circuit 5, changes over the color of the light passing through the liquid crystal color filter 29 sequentially in the three colors, while the line image sensor 80 is scanned in synchronism. The obtained image data of each color is read by the reading processing circuit 82, and the data is compacted or extracted in the image processing circuit 83, or stored in the image memory 84. The image data obtained by reading the color document 58 is sent out in the telephone circuit network through a network control unit 86 by making a call to the destination of communication through a communication control unit 85.

On the other hand, the image data sent out from the telephone circuit network is extracted or processed in the image processing circuit 83, through the network control unit 86 and communication control unit 85, and a color image is recorded on a recording paper by color recording means 88 composed of, for example, thermal transfer ribbons of three colors or ink jet nozzles of three colors, through a recording processing circuit 87. The structure of such color facsimile apparatus 79 is the so-called on-chip type having the liquid crystal color filter 29 mounted directly on the line image sensor 80.

In such color facsimile apparatus 79, hitherto, for example, microcolor filters of three colors are installed on the line image sensor 80. Therefor, in this embodiment, as compared with such prior art, the structure is smaller and simpler.

Figure 19:
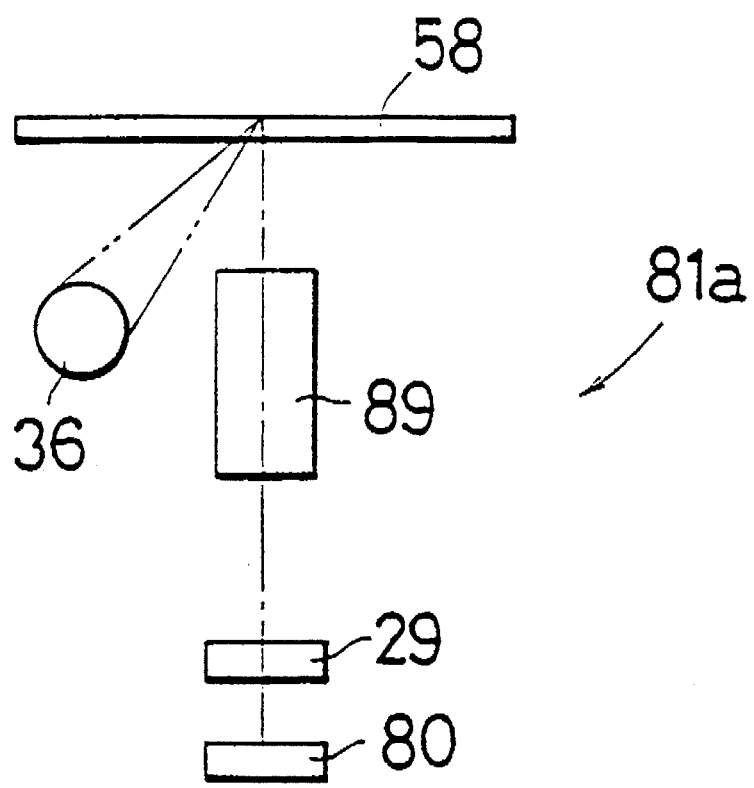
FIG. 19 is a systematic diagram of the reading element 81a, FIG. 20 is a systematic diagram of the reading element 81b.

FIG. 19 is a schematic diagram showing a reading element 81a in other structural example of the color facsimile apparatus 79. In this embodiment, for example, the light is emitted to the color document 58 from the white light source 36, and its reflected light enters the line image sensor 80 through rod lens 89 and liquid crystal color filter 29. In such embodiment, conventionally, instead of the liquid crystal color filter 29, the reflected light from the color document 58 was separated into three colors by moving three color filters parallel, for example, by mechanical system. In this embodiment, as compared with such prior art, the structure is simplified and reduced in size.

Figure 20:
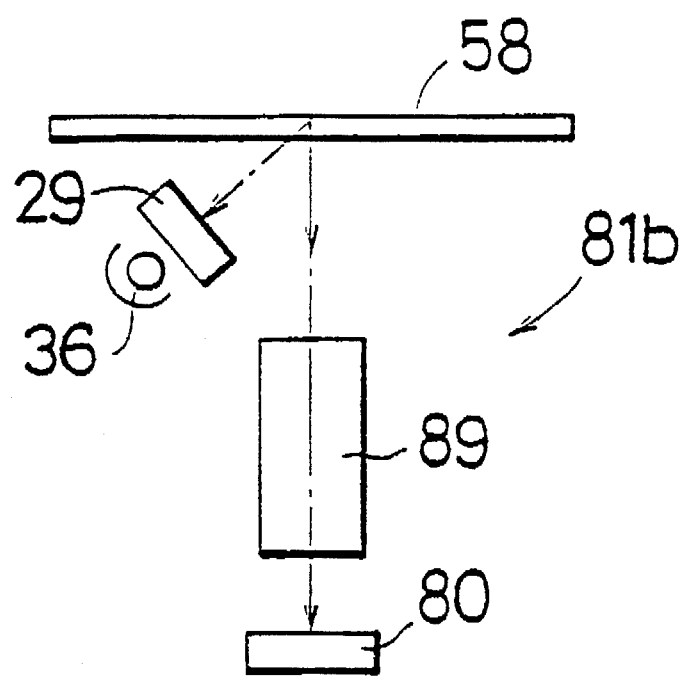

FIG. 20 is a schematic diagram showing a reading element 81b n a different structural example of the color facsimile apparatus 79. In this embodiment, the light from the white light source 36 is separated into three colors sequentially in time series through the liquid crystal color filter 29, and the reflected light from the color document 58 of the light source light enters the line image sensor 80 through the rod lens 89. In this embodiment, too, the same effects as mentioned in the preceding embodiment are brought about.

Besides, moreover, the photomodulation element of the invention may be used as the photo selector for picking up a light signal of desired frequency out of the light signals of various frequencies coexisting in the optical communication apparatus.

Furthermore, it is known that the retardation $\Delta nd$ of the liquid crystal 12 varies with the temperature, and therefore instead of the voltage regulating circuit 5 in the foregoing embodiments, it is also possible to modify so as to employ a constitution adjusting the temperature of each liquid crystal panel Pi.

[Embodiment 23]

Figure 21:
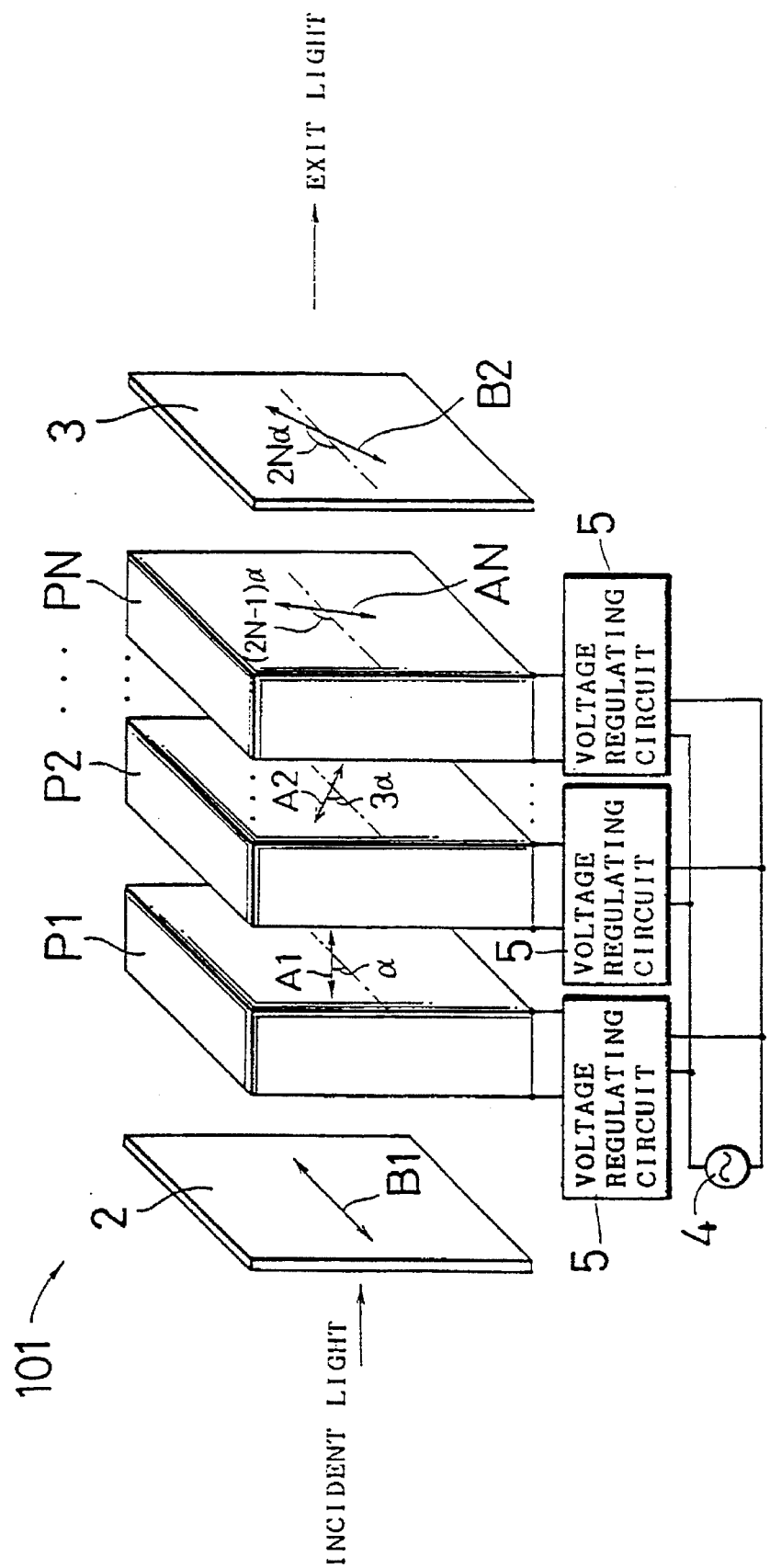
FIG. 21 is a systematic diagram of the optical modulating element 101 of an example of the invention.
Figure 22:
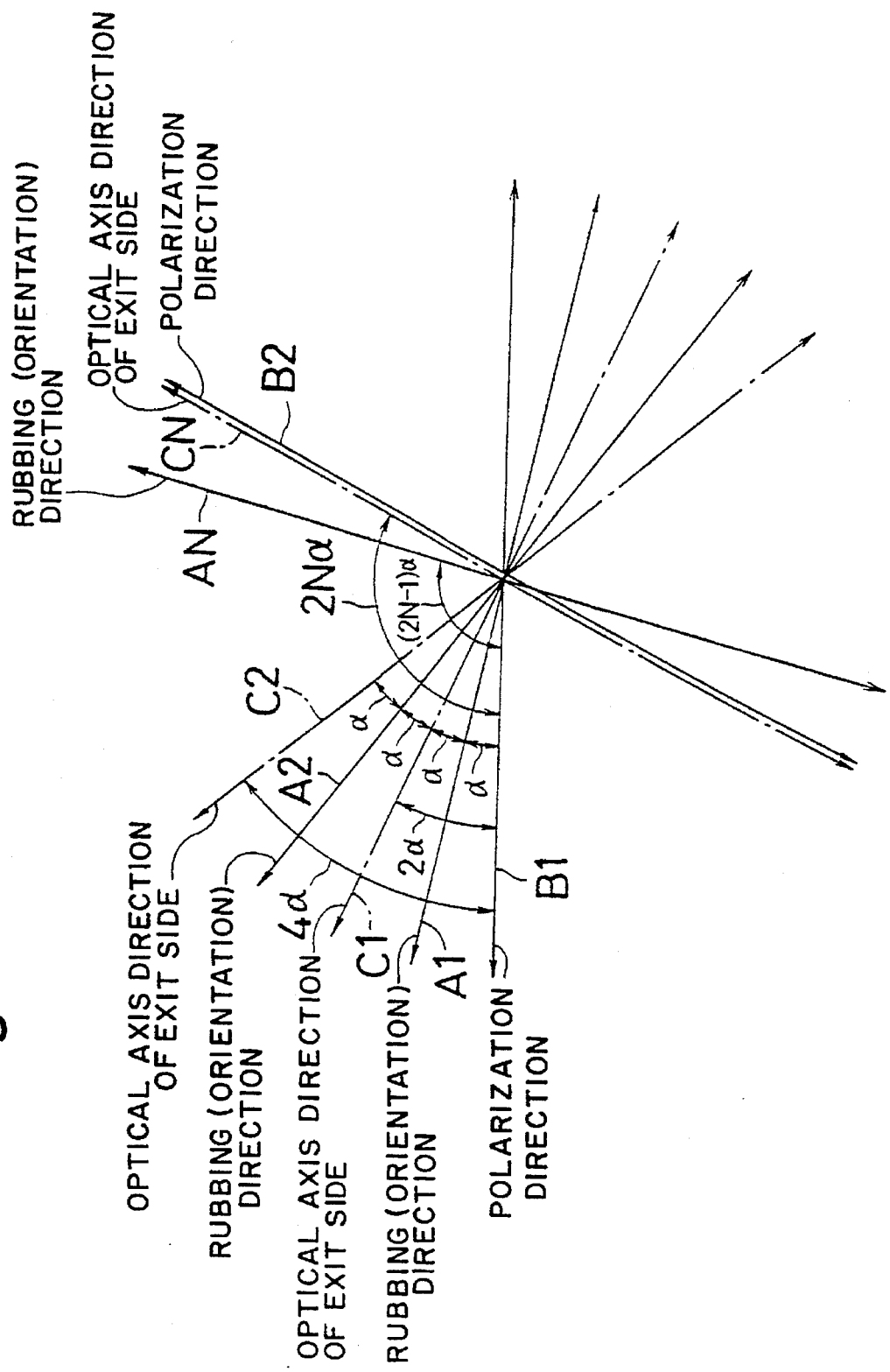
FIG. 22 is a diagram showing the optical construction of the optical modulating element 101, FIG. 23(1)–23(2) is a diagram explaining the behavior of the linearly polarized light in the liquid crystal panel P1.

FIG. 21 is an exploded perspective view showing a structural example of a photomodulation element 101 in an embodiment of the invention, and FIG. 22 is a diagram showing an optical composition of the photomodulation element 101. The photomodulation element 101 is laminated of plural, or N in this embodiment, liquid crystal panels Pi (i=1 to N) having the constitution as described below, and polarizers 2, 3 are arranged at both sides of the direction of array. Each liquid crystal panel Pi is controlled of the applied voltage individually by plural voltage regulating circuits 5 connected commonly to a power source 4. As a modified example, a common applied voltage may be given to each liquid crystal panel Pi from a common voltage regulating circuit 5.

The individual liquid crystal panels Pi are composed alike as shown in FIG. 2, and transparent electrodes 8, 9 made of, for example, ITO (indium tin oxide) are formed on a pair of glass substrates 6, 7. Covering the transparent electrodes 8, 9, for example, orientation films 10, 11 composed of polyvinyl alcohol are formed, and a liquid crystal 12 having double refractive characteristic such as ZL1-1565 (manufactured by Merck) or the like is sealed in between them in a cell thickness d=2.5 μm, and the peripheral edge is sealed with a sealing material 13. The orientation films 10, 11 of the liquid crystal panels Pi are oriented by rubbing or other treatment. In each liquid crystal panel Pi, the orientation directions of the light incident side and exit side are parallel to each other as shown in FIG. 2 (2), as indicated by arrow Ai (i=1 to N).

Refer to FIG. 21 and FIG. 22. The orientation direction A1 of the liquid crystal panel P1 closet to the polarizer 2 in the polarization direction B1 of the polarizer 2 is selected in a state of crossing at an angle α (for example, 15 degrees). The orientation direction A2 of the liquid crystal panel P2 adjacent to the liquid crystal panel P1 is selected in a direction of inclining by an angle 3α to the polarization direction B1. Thereafter, similarly, the orientation direction AN of the N-th liquid crystal panel PN is selected in a direction of inclining by angle (2N−1)α to the polarization direction B1. The polarization direction of the polarizer 3 at the exit side of the final liquid crystal panel PN is selected in a direction of inclining at an angle 2Nα to the polarization direction B1 of the polarizer 2.

That is, the polarization direction B1 of the polarizer 2 and the orientation direction A1 of the liquid crystal panel P1 form an angle of α, and the orientation directions Ai, A+1 of the adjacent liquid crystal panels Pi, Pi+1 (i=1 to N−1) are determined so as to incline sequentially by angle 2α each in the same direction. The polarization direction B2 of the polarizer 3 is selected in a direction of inclining angle α to the same direction as the orientation direction AN of the final liquid crystal panel PN.

Figure 23A:
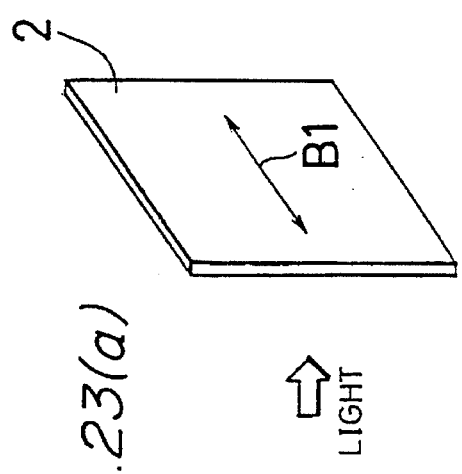
Figure 23B:
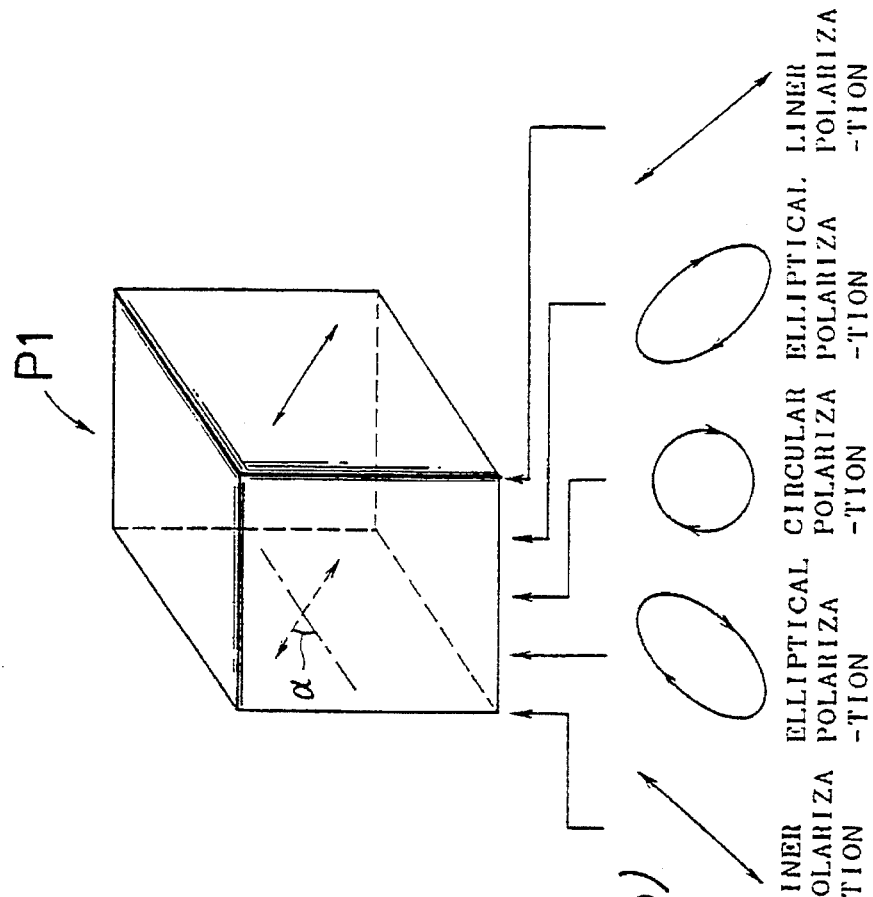

FIG. 23 is a diagram for explaining the behavior when the light becoming a linear polarized light after passing through the polarizer 2 passes through the liquid crystal panel P1. As shown in FIG. 23 (1), the light entering the polarizer 2 is a linear polarized light parallel to the polarization direction B1 regardless of the wavelength of the light, and enters the liquid crystal panel P1. The orientation direction A1 of the liquid crystal panel P1 crosses with the polarization direction B1 by angle α. Here, when the retardation Δnd of the liquid crystal panel P1 (Δn: refractive index anisotropy of liquid crystal, d: layer thickness of liquid crystal) and the wavelength λ0 of the incident light are in the relation of $$\frac{\Delta nd}{\lambda 0} = \frac{(2m-1)}{2} \quad m \geq 1 \qquad \text{[formula 3]}$$

the light of the wavelength λ0 passing through the liquid crystal panel P1 becomes a linear polarized light turning from the polarization direction B1 by angle 2α due to the double refractive characteristic. The optical axis direction of the exit side of the light of the wavelength λ0 satisfying formula (3) in the liquid crystal panel 1 is shown by arrow C1 in FIG. 22. Hereinafter, of the light leaving the liquid crystal panel Pi, the optical axis direction of the light leaving as linear polarized light satisfying Equation 3 is indicated by arrow Ci.

This phenomenon may be explained as follows. As shown in FIG. 23 (1), the light of the linear polarization entering the liquid crystal panel P1 is a linear polarized light near the incident side end of the liquid crystal panel as shown in FIG. 23 (2), but as passing through the liquid crystal panel P1, it is sequentially converted into elliptical polarization, circular polarization, and elliptical polarization, and near the exit side end it becomes linear polarization again. The optical axis direction of the linear polarization at the exit side is deviated from the polarization direction B1 of the polarizer 2 by angle 2α.

Thus, when the light of the wavelength λ0 leaving the liquid crystal panel P1 as linear polarization enters the liquid crystal panel P2, if formula (3) is satisfied about the liquid crystal panel P2, the light of the wavelength λ0 is emitted again from the liquid crystal panel P2 as linear polarization. Its optical axis direction C2 shown in FIG. 22 is turned by angle 2α from C1 which is the optical axis direction of the incident light to the liquid crystal panel P2. That is, it is turned from the polarization direction B1 of the polarizer 2 by 4α. Thereafter, similarly, by selecting so that all liquid crystal panels Pi up to the N-th final liquid crystal panel PN may satisfy formula (3), the light of the wavelength λ0 leaving the liquid crystal panel PL as linear polarization is turned from the polarization direction B1 of the polarizer 2 by the angle 2Nα. Therefore, by selecting the polarization direction of the polarization 3 in the same direction as the optical axis direction of the light of the wavelength λ0 time, the light of the wavelength λ0 will pass through the polarizer 3.

Figure 24:
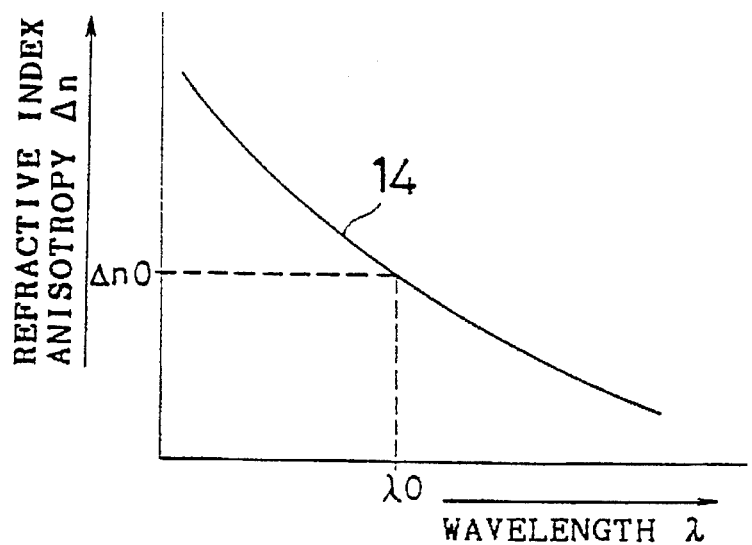
FIG. 24 is a graph explaining the wavelength dependence of the anisotropy of refraction index $\Delta n$.

On the other hand, from the polarizer 2, the light of arbitrary wavelength is emitted as linear polarization, but the refractive index anisotropy Δn of the liquid crystal is dependent on wavelength as shown in line 14 in FIG. 24, and formula (3) is not satisfied.

Figure 25:
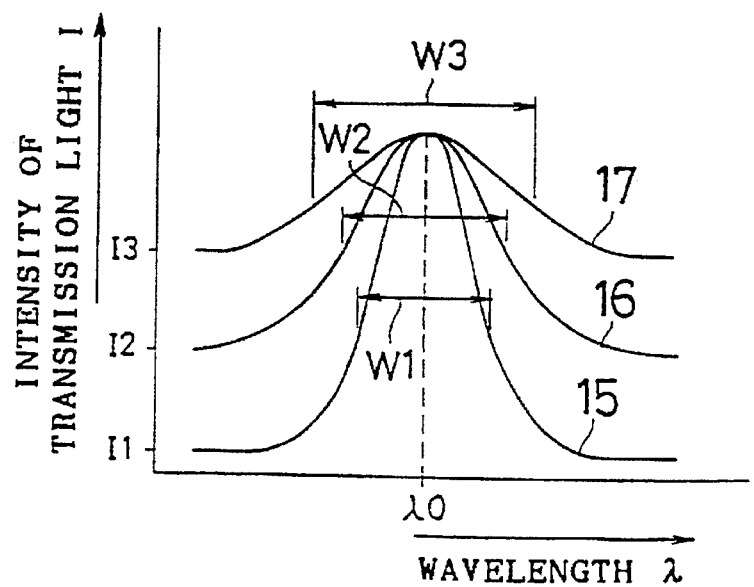
FIG. 25 is a graph explaining the wavelength dependence of the intensity of the transmitted light.

That is, the light of other wavelength than λ0 becomes circular polarization or elliptical polarization when leaving the liquid crystal panel P1, and when passing through the polarizer 3, the rate of being absorbed or dispersed by the polarizer 3 is notably increased as compared with the light of the wavelength λ0. Therefore, the exit light from the polarizer 3 shows the distribution state having the maximum value at wavelength λ as indicated by line 15 in FIG. 25 which is a graph showing the relation between the wavelength λ of the exit light and the transmission light intensity I. On the other hand, lines 15, 16, 17 in FIG. 25 are graphs when the number of liquid crystal panels Pi laminated on the photomodulation element 101 in FIG. 21 is N1, N2 and N3 (N1>N2>N3). That according to the experiment by the present inventors, the noise light intensities I1, I2, I3 which are intensities of the light of other wavelength than the wavelength λ0 in the exit light from the polarizer 3, and the half-value widths W1, W2, W3 of the lines 15 to 17 were decreased as the number of laminates N of the liquid crystal panel Pi increased, and the color purity of the light leaving the polarizer 3 was confirmed to be enhanced.

It is also known that the apparent refractive index anisotropy Δn of the liquid crystal 12 varies depending on the voltage V applied between the transparent electrodes 8, 9 as indicated by line 18 in FIG. 5 above. Therefore, in FIG. 24, when attempted to have light of wavelength λ0, the refractive index anisotropy required from line 14 is Δn0, and to obtain the refractive index anisotropy Δn0, it is known enough to apply voltage V0 from line 18 in FIG. 5. Thus, by properly adjusting the voltage applied to the liquid crystal panels Pi through the voltage regulating circuit 5, the light of arbitrary wavelength is obtained from the photomodulation element 101.

Actually, when desired to obtain a desired wavelength, or a desired color purity for specific light, that is, when desired to properly determine the value of wavelength λ for giving the maximum value of the distribution curve of the transmission light intensity in FIG. 25, or half-value width W and noise light intensity I, it is possible to determine by comprehensively considering the retardation of the liquid crystal panel Pi, number of laminates, the refractive index of the liquid crystal 12, or wavelength characteristics of the polarizers 2, 3.

The present inventor investigated the photomodulation element 101 having the above constitution, and measured the distribution of transmission light intensity by varying the voltage applied to the liquid crystal panels Pi by using the voltage regulating circuit 5. The result is shown by graph in FIG. 26. Lines 119, 120, 121 in FIG. 26 indicate that the applied voltages V1, V2, V3 are in the relation of $$V1<V2<V3 \qquad \text{[formula 16]}$$

That is, in lines 119 to 121, it is shown that the transmission lights of red, green and blue are obtained at a relatively favorable color purity.

As a modified example of the invention, it is possible to realize by installing a polarizer between liquid crystal panels (Pi and Pi+1, 1≤i≤N−1), and setting the polarization direction of the polarizer parallel to the linear polarized light leaving each liquid crystal panel P1 or the wavelength λ0 of notice or the major axis direction (Ci) of the elliptical polarized light close to the linear polarized light. At this time, the light of the wavelength λ0 of notice passes through the photomodulation element 101 according to the principle of operation described above, but the light of other wavelengths is a circular polarized light or elliptical polarized light of which major axis is not parallel to the polarization direction of intermediate polarizer, and hence its passing is blocked. It is hence possible to compose the photomodulation element 101 capable of picking up the desired light efficiently. Besides, in addition to the double refractive characteristic in the foregoing embodiment about the liquid crystal 12 of the liquid crystal panels Pi, by twisting the orientation of the liquid crystal molecules to increase the optical characteristic, it is also possible to compose the photomodulation element capable of picking up the light of arbitrary light in the same principle. That is, by twisting the orientation of the liquid crystal molecules, the light entering the liquid crystal panels Pi in liner polarization state leave as elliptical polarization having a certain eccentricity, but by properly selecting the retardation or twist angle of the liquid crystal as mentioned above, it is possible to form an elliptical polarization close to the linear polarization as far as possible. In this regard, the modified example may be realized.

When such photomodulation element 101 is combined with, for example, active matrix liquid crystal display device of monochromatic display in an attempt to realize multicolor or full-color display, a high speed is required in color changes in its application example. To operate the photomodulation element 101 at high speed, the dislocation of the liquid crystal molecules with respect to specified change of applied voltage must be done at high speed. Accordingly, the layer thickness d of the liquid crystal 12 must be as small as possible. Hence, by modifying by supposing m=1 in formula (3), we obtain $$\Delta nd = \lambda 0/2 \qquad \text{[formula 17]}$$

Figure 27:
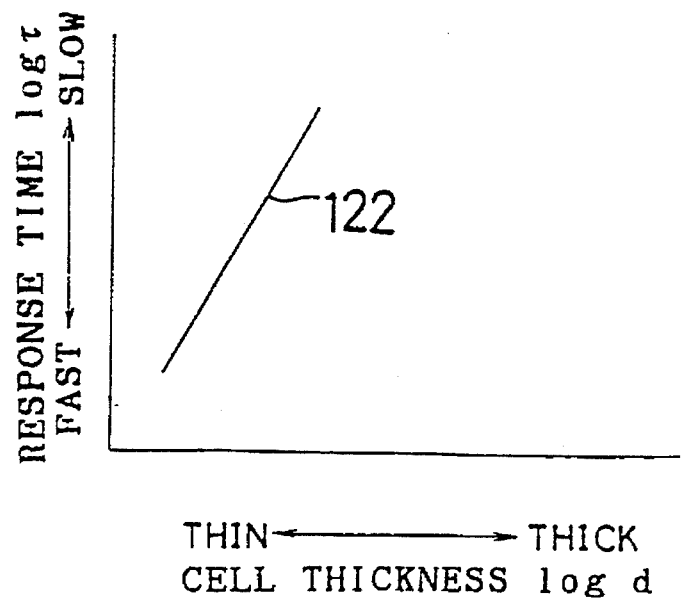
FIG. 27 is a graph showing the relation between the response time $\tau$ and the cell thickness d in the optical modulating element 101.

Accordingly, when λ0=650 nm is determined, from formula (17), it follows that Δnd=0.32 μm. Assuming the refractive index anisotropy Δn=0.13 of ordinary nematic liquid crystal, the layer thickness is d=2.5 μm. Seeing that the layer thickness of the liquid crystal in ordinary TN type liquid crystal display device is 5 to 12 μm, in this case, the layer thickness of the liquid crystal 12 is about ⅕ to ½ smaller as compared with the existing liquid crystal display device. The response speed to the change of the applied voltage of the liquid crystal is known to be inversely proportional to $d^2$, concerning the layer thickness d of the liquid crystal, generally. That is, the relation between the layer thickness d and response time τ is indicated by line 22 in FIG. 27. More specifically, as the cell thickness becomes smaller, the response speed becomes faster. In the actual numerical condition given above, the response speed is about 4 to 25 times faster than the response speed of the conventional liquid crystal display device of TN type or the like.

On the other hand, the minimum value of the layer thickness of the liquid crystal 12 among the presently available liquid crystal display devices is about 5 μm, and to design the layer thickness smaller than this, it is known that the refractive index anisotropy of the liquid crystal material must be Δn=0.07 or more in Equation 13. This numerical value is the value satisfied by the refractive index anisotropy of the ordinary TN type liquid crystal, and hence the photomodulation element 101 of the invention may be composed by using the ordinary TN liquid crystal.

On the other hand, to obtain a high response speed, it is also necessary to consider the viscosity of the liquid crystal material. The viscosity of the liquid crystal should be as low as possible, and generally the effect of the invention is exhibited at 35 centipoise (cp) or less, but preferably it is desired to be 25 centipoise or less, as clarified by the experience of the present inventors. Liquid crystal materials showing such characteristics include biphenyl compound, phenylester compound, cyclohexane compound, phenyl pyrimidine compound, dioxane compound, tolan compound, alkenyl compound, and fluorine compound, or their mixtures.

Figure 26:
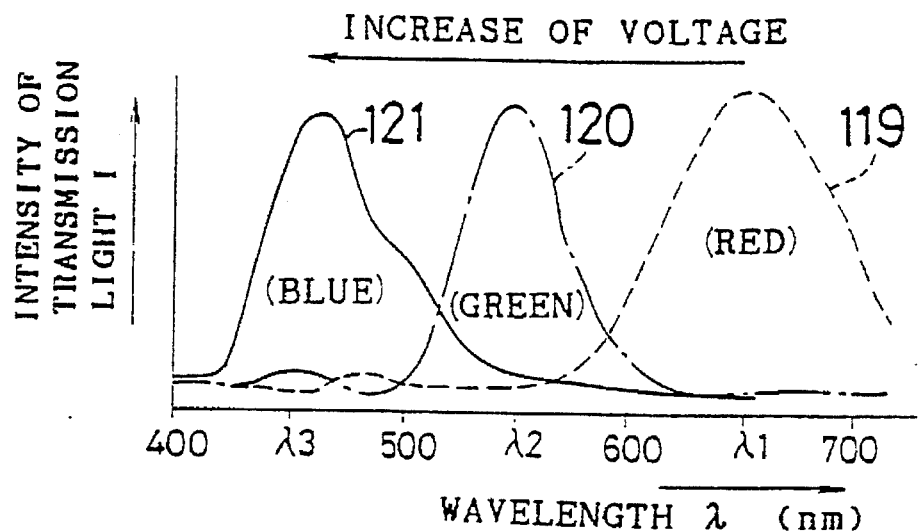
FIG. 26 is a diagram explaining the action of the optical modulating element 101.

Using a liquid crystal composition made of such materials, a photomodulation element as shown in FIG. 21 was composed, and the applied voltage was changed over to obtain three wavelengths λ1, λ2, λ3 as shown in FIG. 26, and the response speed was measured. As a result, a high speed response of several milliseconds was obtained.

Incidentally, the one field period of television video signal of NTSC system is 1/60 second or about 17 msec. For example, it is hence possible to compose a constitution in which the red image, green image, and blue image are displayed for 5 msec each in one field period, and the photomodulation element 101 changes over in synchronism to mass the red, green and blue light. It is thus possible to realize a multicolor display or full-color display by using the photomodulation element 101. That is, a color filter of small size, light weight, and simple structure is realized.

Figure 28:
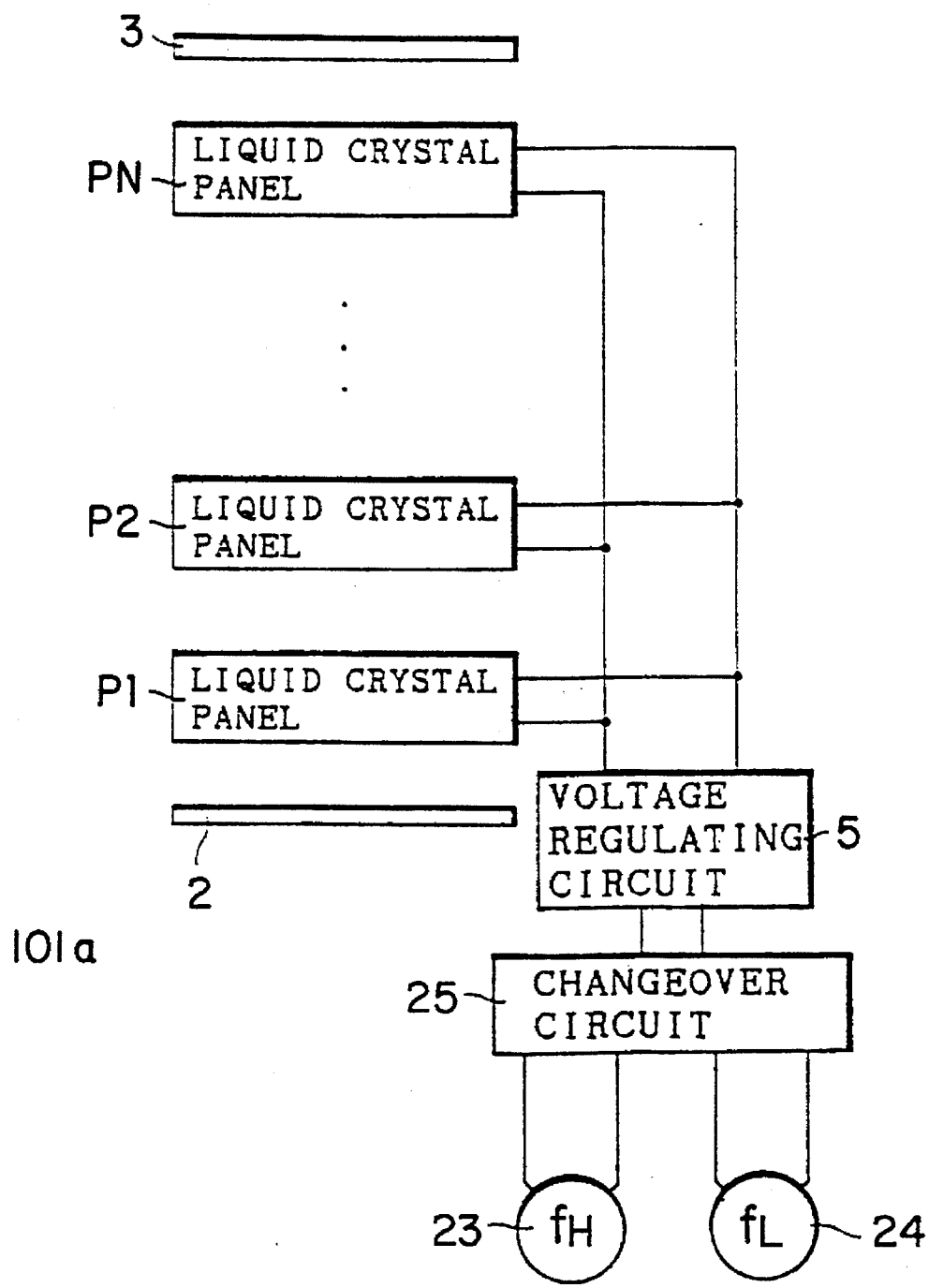
FIG. 28 is a block diagram indicating an example of construction of the light modulating element 101a of another example.

FIG. 28 is a block diagram showing the constitution of a photomodulation element 101a as a modified example of the invention. In this embodiment, the driving voltage applied to plural liquid crystal panels P1 to PN is properly selected between a high frequency power source for generating a relatively high frequency fH and a low frequency power source 24 for generating a relatively low frequency fL by a changeover circuit 25 which changes over their outputs, and the selected output is adjusted in a voltage regulating circuit 5 as in the preceding embodiments, and is supplied to each liquid crystal panel Pi.

In other words, the liquid crystal used in each liquid crystal panel Pi is a two-frequency driving liquid crystal of which dielectric constant anisotropy Δε is positive at a relatively low voltage, and negative at a high frequency voltage. That is, when the driving voltage from the low frequency power source 24 is adjusted in the voltage regulating circuit 5 and supplied to each liquid crystal panel Pi, as the applied increases, the liquid crystal of each liquid crystal panel Pi gradually changes from the homogeneous array to the homeotropic array, and the refractive index anisotropy An varies corresponding to this change. To return to the initial homogeneous array from this state, the driving voltage from the high frequency power source 23 is used and is adjusted to a proper voltage in the voltage regulating circuit 5. As a result, the state is returned at high speed, and the operation of the photomodulation element 101a is also high in speed.

The two-frequency driving liquid crystal is, in order to define widely the effective operating temperature range of the liquid crystal and to realize low viscosity, composed of a mixed liquid crystal as a base material of a relatively weak polarity, such as alkocyphenyl cyclohexyl carboxylate, alkylphenyl cycloxycarboxylate, and alkoxyphenyl cyclohexane, which is blended with a material of low dielectric dispersion frequency, such as chemical formula (1)–(4).

Furthermore, using a material having a large negative value of dielectric constant anisotropy Δε, such as 2,3-dicyano-1,4-hydroquinone derivaties as shown chemical formula (5)–(7), the overall dielectric constant antsotropy and cut-off frequency (the frequency for changing over the dielectric constant anisotropy Δε between positive and negative polarity) are adjusted.

In the foregoing embodiments, the number N of liquid crystal panels Pi for composing the photomodulation elements 101, 101a is not particularly defined, but is properly selected in consideration of the color purity of the light of the desired wavelength obtained by using the photomodulation elements 101, 101a and the like. Besides, the type and number of polarizers (2, 3), the type of liquid crystal material, the condition of layer thickness d of liquid crystal 12, and installation conditions of liquid crystal panels Pi and polarizers 2, 3 are properly selected.

Besides, similar effects are obtained by using other liquid crystal materials, such as the liquid crystal panel composed of liquid crystal material with negative dielectric constant anisotropy Δε as represented by nematic liquid crystal and a surface treatment agent of vertical orientation type, and ferrodielectric liquid crystal. In the embodiments, the glass substrate was used as the substrate for photomodulation elements 101, 101a, but it may be replaced by a synthetic resin plastic substrate in a modified example, so that the weight may be reduced. Furthermore, for the purpose of correcting the wavelength characteristic of the transmission light, a phase difference plate made of high molecular film such as polycarbonate and polyvinyl alcohol may be placed between the polarizers 2, 3, or a material adding a specific dichoic pigment may be used as the liquid crystal material.

Hereinafter are explained application examples of photomodulation elements 101, 101a into electronic appliances.

Meanwhile, the photomodulation elements 101, 101a in these embodiments may be used as liquid crystal color filter 29 in various electronic appliances shown in FIGS. 11 to 20. In such cases, too, same effects are obtained.

As a example to show that the invention may be applied also in an image processing device, the image processing system disclosed in the Journal of Electronic Information Communication Society C-II, J73, pp. 703–712 (1990), is cited and described below.

Figure 29:
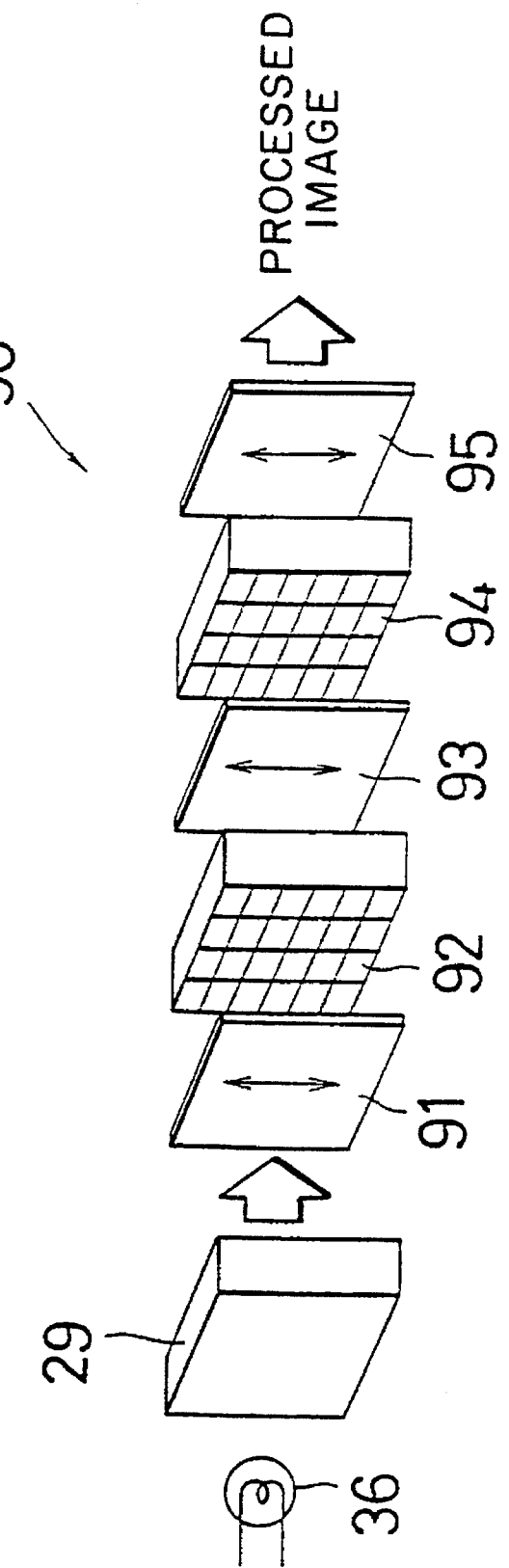
FIG. 29 is a systematic diagram of the image operating apparatus, FIG. 30(1)–30(3) is a diagram explaining the action of the image operating apparatuses 90a–90c.

FIG. 29 is a schematic diagram showing the constitution of an image processing device 90 as a different embodiment of the invention. The image processing device 90 comprises a white light source 36 and a liquid crystal color filter 29 composed of the photomodulation elements 101, 101a, and the light from the liquid crystal color filter 29 enters a color polarizer 91, for example, a composition composed of liquid crystal display element 90 of active matrix type for monochromatic-display, color polarizer 93, similar liquid crystal display element 94 and color polarizer 95, and the light leaving the color polarizer 94 is the processed image. Here, the color polarizers 91, 93, 95 convert the light of predetermined specific wavelength into linear polarized light, but do not convert the light of other wavelengths.

Figure 30A:
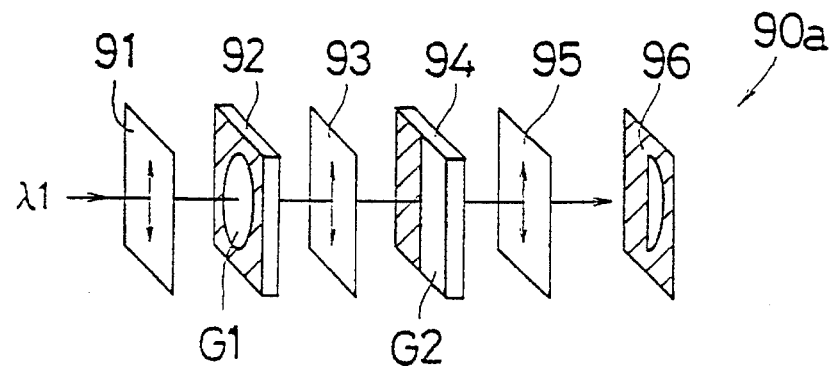
Figure 30B:
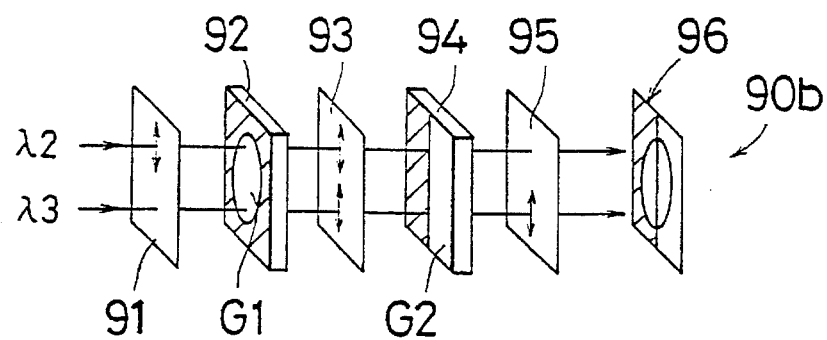
Figure 30C:
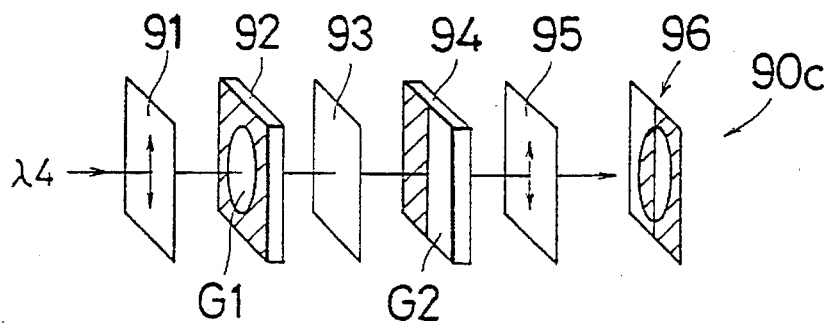

FIG. 30 is a diagram to explain the operation of the image processing device 90. FIG. 30(a) shows the image processing device 90a for calculating the logic products (G1, G2) of display images G1, G2 of the liquid crystal display elements 92, 94. In this example, the color polarizers 91, 93, 95 convert the light of wavelength λ1 into linear polarized light all in one direction. Therefore, the light of linear polarization passing through the color polarizer 91 is turned only by a specific angle in the non-passing region indicated by shaded area of the liquid crystal display element 92, for example, and the linear polarized light directly passes through in the transmission region without shaded area. Therefore, the light in the passing region directly passes through the color polarizer 93, and then the portion corresponding to the non-passing region indicated by shaded area of the liquid crystal display element 94 is turned, and the light directly passes through the portion corresponding to the passing region without shaded area. When this transmitted light passes through the color polarizer 95, the light turned by the liquid crystal element 94 is cut off, and the light not turned is passed. The light turned by the liquid crystal display element 92 is cut off by the color polarizer 93. Therefore, a semicircular display portion is obtained as processed image 96.

FIG. 30 (2) shows the structure of the image processing device 90b for realizing the logic sum (G1+G2) of the display images G1, G2 similar to FIG. 30 (1). In this case, the lights of two wavelengths λ2, λ3 are used. The color polarizer 91 converts only the light of wavelength λ2 into linear polarized light, and the color polarizer 93 converts the lights of both wavelengths λ2, λ3 into linear polarized light, and the color polarizer 95 converts only the light of wavelength λ3 into linear polarized light. Therefore, the light of the wavelength λ2 is converted into linear polarized light through the color polarizer 91, and the light of wavelength λ3 is directly passed through the color polarizer 91 without being converted into linear polarized light. The light of the wavelength λ2 passes through the liquid crystal display element 92 and color polarizer 93, and then passes only through the disc region without shaded area in the liquid crystal display element 92. When such light of wavelength λ2 gets into the liquid crystal display element 94, it passes without being turned in the portion without shading, and is turned and passes through the shaded area, but when the color polarizer 95 passes all the light of wavelength λ2, the transmission light in the shape of the disk region is obtained.

On the other hand, the light of wavelength λ3 is first converted into linear polarized light when passing through the color polarizer 93, and therefore by passing through the liquid crystal display element 94 and color polarizer 95, the light of the rectangular range without shading passes through the liquid crystal display element 94. Therefore, as the processed image 96, a superposed image of the circular image G1 and rectangular image G2, that is, the image of the logic sum is obtained.

FIG. 30 (3) shows the structure of the image processing device 90 for obtaining an inverted image of inverted image (G1EXORG2) of exclusive logic sum of the images G1, G2 similar to the above example. At this time, using monochromatic light of wavelength λ4, the color polarizers 91, 95 convert the light of this wavelength λ4 into linear polarized light, but the color polarizer 93 directly passes the light of the wavelength λ4. That is, the color polarizer 93 may not be necessary, or a transparent glass may be used. The light of the wavelength λ4 passes through the color polarizer 91 to be converted into linear polarized light, and this light directly passes through the circular region without shading in the liquid crystal display element 92, and is turned by the specified angle in the shaded region.

When the light of such state enters the liquid crystal display element 94, the light entering the shaded area of the liquid crystal display element 94 is turned by a specific angle. That is, when passing through the liquid crystal display element 92, the revolved light is further revolved to be a linear polarized light parallel to the direction of polarization of the color polarizer 95. The range not revolved in the liquid crystal display element 92 is revolved in the shaded area in the liquid crystal display element 94, and is cut off in the color polarizer. A similar phenomenon occurs in the transmissing part without shading in the liquid crystal display element 94, and therefore, the inverted image of the exclusive OR image of the images G1, G2 as shown in FIG. 30 (3) is obtained as the processed image.

Such image processing devices 90, 90a to 90c easily generate and select arbitrary wavelength necessary for operation by using the liquid crystal color filter 29 as shown in FIG. 29, and may be preferably executed in image processing for overlapping plural images or excluding a portion from a certain image.

Besides, in the optical communication appliance, the photomodulation element of the invention may be used as the optical selector for picking up an optical signal of desired frequency, from various mixed various frequency optical signals.

Furthermore, the retardation Δnd of the liquid crystal 12 is known to vary depending on temperature, and instead of the voltage regulating circuit 5 in the preceding embodiment, a modified example is possible to adjust the temperature of the liquid crystal panels Pi.

[Embodiment 33]

Figure 31:
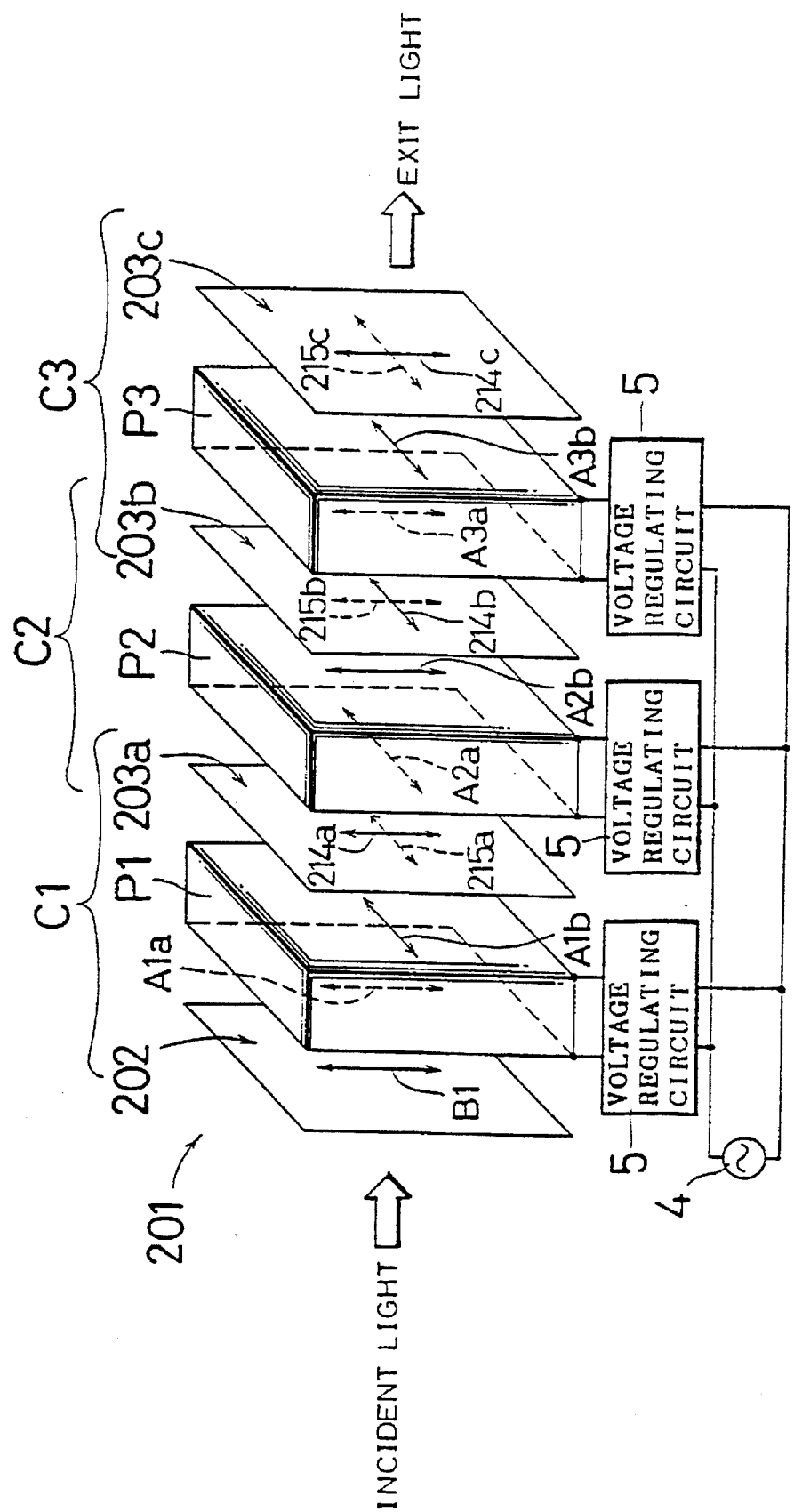
FIG. 31 is a systematic diagram of the optical modulating element 201 of an example of the invention, FIG. 32(1)–32(2) shows the construction of the liquid crystal panel Pi.
Figure 32A:
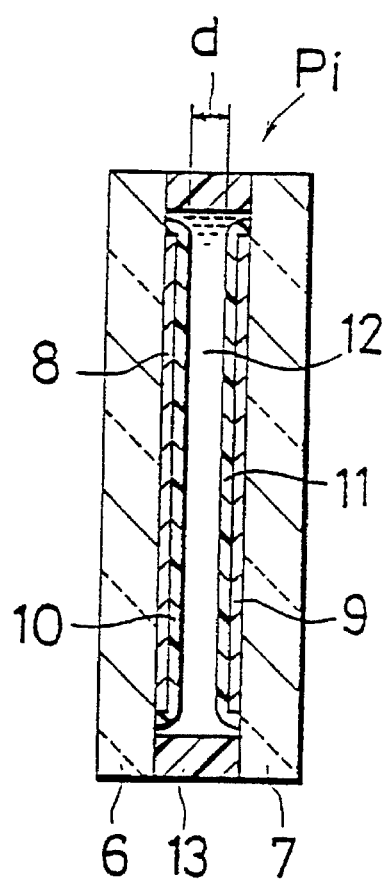
Figure 32B:
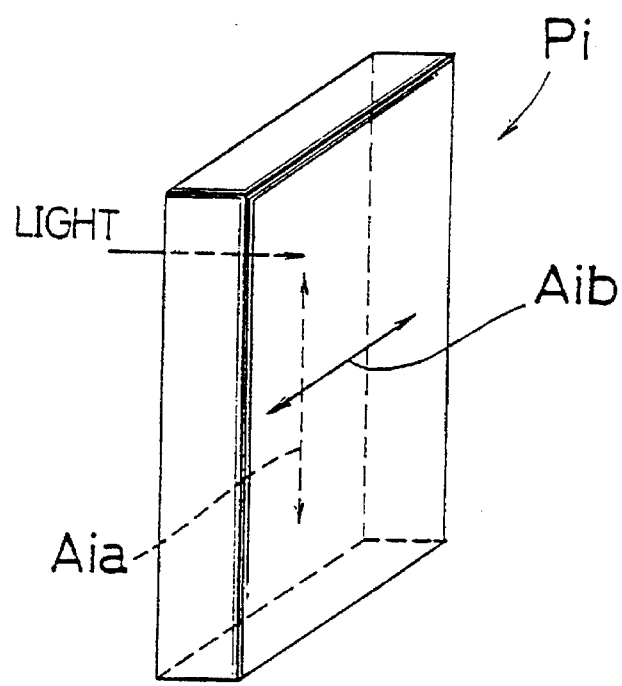

FIG. 31 is a schematic diagram showing the composition of a photomodulation element 201 in an embodiment of the invention, and FIG. 32 is a diagram showing the structure of the photomodulation element 201. The photomodulation element 201 is a laminate structure of an ordinary neutral gray polarizer 202, not a color polarizer, liquid crystal panel P1, color polarizer 203a, liquid crystal panel P2, color polarizer 203b, liquid crystal panel P3, and color polarizer 203c. The liquid crystal panels Pi (i=1 to 3) are controlled of the applied voltage individually, by plural voltage regulating circuits 5 connected commonly to the power source 4. In a modified example, a common applied voltage may be given to each liquid crystal panel Pi from a common voltage regulating circuit 5.

The liquid crystal panels Pi are identical in construction, and transparent electrodes 8, 9 made of, for example, ITO (indium in oxide) are formed on a pair of glass electrodes 6, 7. Covering these transparent electrodes 8, 9, for example, orientation films 10, 10 composed of polyvinyl alcohol are formed, and an optical liquid crystal material, such as TN type liquid crystal 12 is sealed between them in a layer thickness d determined as specified below, and the peripheral edge is sealed with a sealing material 13. The orientation films 10, 11 of each liquid crystal panel Pi are oriented by rubbing or other treatment. In the liquid crystal panels Pi, as shown in FIG. 32 (2), the orientation directions of the light incident side and exit side are determined to be orthogonal to each other, as indicated by arrows Aia, Aib (i=1 to 3).

To the polarization direction B1 of the polarizer 202, the orientation direction A1a of the incident side of the liquid crystal panel P1 is selected parallel, and the orientation direction A1b of the exit side is selected in an orthogonal direction 90 degrees deflected from the orientation direction A1a. The light absorption direction 214a which is the polarization plane for passing only the light of specific wavelength, out of the lights entering the color polarizer 3a, for example, only the light of the wavelength of cyan color, and absorbing the lights of the remaining wavelengths is selected in a direction orthogonal to the orientation direction A1b, and the light transmission direction 215a which is the polarization plane for passing all incident lights, without absorbing, regardless of the wavelength is selected parallel to the orientation direction A1b.

The incident side orientation direction A2a of the liquid crystal panel P2 is selected parallel to the light transmission direction 215a, and the exit side orientation direction A2b is selected orthogonal to the orientation direction A2a. The light absorption direction 214b of the color polarizer 203b is selected orthogonal to the orientation direction A2b, and the light transmission direction 215b is selected parallel to the orientation direction A2b. The incident side orientation direction A3a of the liquid crystal panel P3 is selected parallel to the light transmission direction 215b, and the exit side orientation direction A3b is selected orthogonal to the orientation direction A3a. The light absorption direction 214c of the color polarizer 203c is selected orthogonal to the orientation direction A3b, and the light transmission direction 215c is selected orthogonal to the light absorption direction 214c.

Employing the constitution shown in FIG. 31 and FIG. 32, the principle of realizing multicolor display is explained below. As mentioned later, the material of the liquid crystal 12 sealed in each liquid crystal panel Pi may be modified in many examples, including the TN type liquid crystal and ferrodielectric liquid crystal, but anyway it is designed to change over the operating state for twisting the incident light, for example, by 90 degrees by receiving the linear polarized light in each liquid crystal panel P1, and the operating state for passing in the linear polarized light in the same direction as incident light without turning.

The liquid crystal panel Pi is supposed in the operating state of not polarizing, for example, in the state of applying an operating voltage (hereinafter called ON state) by turning 90 degrees the linear polarized light entering in the state of not applying operating voltage (hereinafter called OFF state). Needless to say, reverse setting is also possible. The color polarizers 203a, 203b, 203c pass only the lights in wavelength bands W1, W2, W3 as linear polarized light, out of the white light entering as linear polarized light parallel to the light absorption directions 214a, 214b, 214c.

When all liquid crystal panels P1 to P3 are in OFF state, the white light passing through the polarizer 202 and leaving as the linear polarized light parallel to the polarization direction B1 is revolved 90 degrees in the liquid crystal panel P1, and passes through the color filter 203a in a state parallel to its light transmission direction 215a, and is further rotated 90 degrees in the liquid crystal panel P2, and passes through the color filter 203b in the linear polarized light parallel to its light transmission direction 215b. This light is rotated 90 degrees in the liquid crystal panel P3, and passes through the color filter 203c in the linear polarized light parallel to its light transmission direction 215c. As a result, the light from the photomodulation element 201 is recognized as white light.

When only the liquid crystal panel P1 is in ON state, the linear polarized light passing through the polarizer 202 passes through the liquid crystal panel P1 directly as the linear polarized light parallel to the polarization direction B1, and enters the color filter 203a parallel to its light absorption direction 214a, and only the light of the wavelength band W1 passes. This light is rotated 90 degrees in the liquid crystal panel P2, and enters the color filter 203b as linear polarized light parallel to its light absorption direction 214b, and the light of the wavelength band W2 is selected from the light of the wavelength band W1, and passes through. This light is rotated 90 degrees in the liquid crystal panel P3, and enters the color filter 203c as the linear polarized light parallel to its light absorption direction 214c. That is, from the light of the wavelength band W2, the light of the wavelength band W3 is further selected, and passes through.

More specifically, concerning the lights of the wavelength bands Wh, Wi, Wj, supposing the duplicating wavelength band to be $$Wh \cdot Wi \cdot Wj \ (h, i, j=1 \text{ to } 3) \quad \text{[formula 18]}$$

the wavelength band of the light passing through the photomodulation element 201 in this case is W1, W2, W3. As far as these wavelength bands W1 to W3 extend over the entire visible light range and do not mutually possess duplicating range, in this case, the photomodulation element 201 is recognized as dark state. In the above formula (18), meanwhile, needless to say, the two wavelength bands Wi, Wj may be similarly described. Next, when only the liquid crystal panel P2 is in ON state, the above explanation about the selection of the wavelength band of the transmission light concerning presence or absence of optical rotation of the liquid crystal panels P1 to P3 is established, and in this case, the wavelength band of the light passing through the photomodulation element 201 is W2, W3. When only the liquid crystal panel P3 is in ON state, according to the explanation above, the light of the wavelength band W3 can be taken out. When the liquid crystal panels P1, P3 are in ON state, the light of wavelength bands W1, W2 may be obtained, and when all of liquid crystal panels P1 to P3 are in ON state, the light of wavelength bands W1, W3 may be taken out.

In this way, by setting the liquid crystal panels P1 to P3 in ON or OFF state, supposing, for example, the wavelength bands W1, W2, W3 of the color polarizers 203a, 203b, 203c to be corresponding to the cyan color, magenta color, and yellow color, respectively, eight colors, including white, can be displayed as shown in Table 1.

TABLE 1

| P1 | P2 | P3 | Color | Display example |
|---|---|---|---|---|
| OFF | OFF | OFF | White | White |
| OFF | OFF | ON | W3 | Y |
| OFF | ON | OFF | W2 · W3 | R |
| OFF | ON | ON | W2 | M |
| ON | OFF | OFF | W1 · W2 · W3 | BL |
| ON | OFF | ON | W1 · W2 | B |
| ON | ON | OFF | W1 | C |
| ON | ON | ON | W1 · W3 | G |

C = cyan, M = magenta, Y = yellow, R = red, G = green, B = blue, BL = black

In this embodiment, three liquid crystal panels Pi are used, but the number is not limited to three, and more liquid crystal panels and color polarizers may be used, and the setting position of the color polarizers and setting position of neutral polarizers are not limited to the structural example in FIG. 31. Besides, the wavelength bands W1 to W3 in Table 1 are not limited to the wavelength bands of cyan, magenta and yellow.

Figure 33:
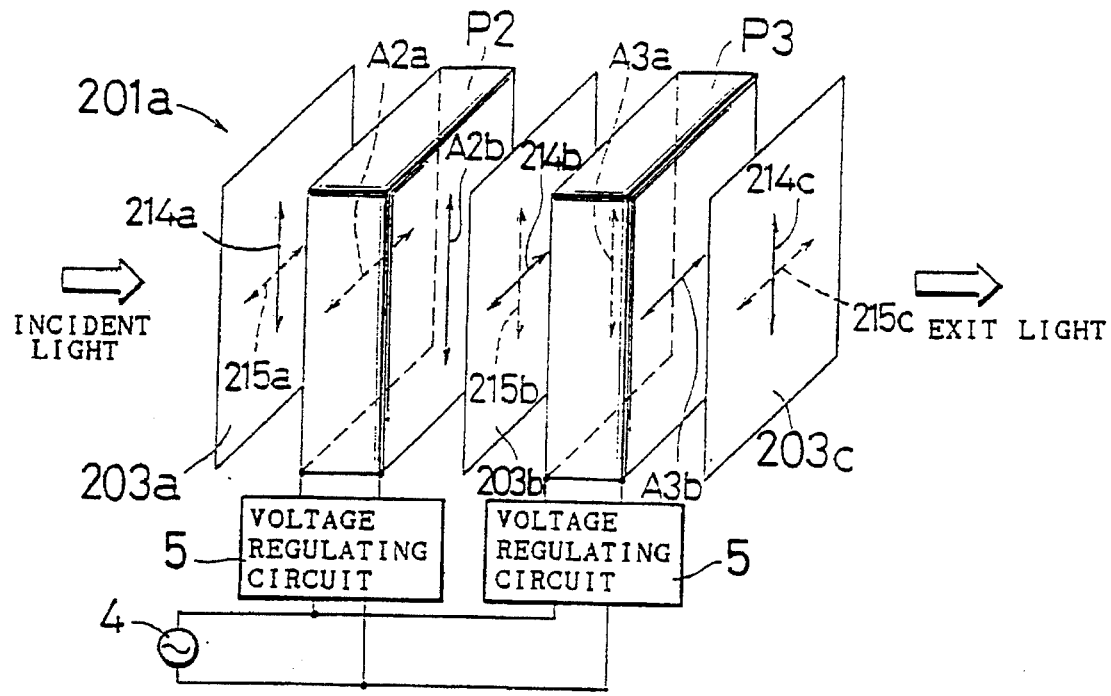
FIG. 33 is a systematic diagram of the optical modulating element 201a of another example of the invention.

FIG. 33 is a schematic diagram showing the structure of the photomodulation element 201a in the second embodiment, excluding the neutral tray polarizer 2 and liquid crystal panel P1 from the structural example in FIG. 31, employing the liquid crystal panel twisting the TN liquid crystal by 90 degrees in orientation same as in the first embodiment. The operating principle of this embodiment is same as in the first embodiment, in which the wavelength bands W1, W2, W3 of the color polarizers 203a, 203b, 203c are supposed to be red, green and blue, respectively.

In this example, when both of the liquid crystal panels P2, P3 shown in FIG. 33 are in OFF state, the light of the wavelength band W1 parallel to the light absorption direction 214a, out of the light passing through the color polarizer 203a is rotated 90 degrees in the liquid crystal panel P2, and enters the color polarizer 203b as the light parallel to its light absorption direction 214b.

In this embodiment, there is no duplicating range in the wavelength bands W1, W2, W3 of the color polarizers 203a to 203c, and therefore the light entering the color polarizer 203b is cut off. Or if the light passes through the color polarizer 203b as the linear polarized light parallel to the light absorption direction 214b, this light is rotated 90 degrees in the liquid crystal panel P3, and enters the color polarizer 203c in the linear polarized light parallel to its light absorption direction 214c. This light is therefore cut off by the color polarizer 203c.

On the other hand, the light passing through the color polarizer 203a as the linear polarized light parallel to the light transmission direction 215a is a white light, as an example including an arbitrary wavelength band, and this light is rotated 90 degrees in the liquid crystal panel P2, and enters the color polarizer 203b in the linear polarized light parallel to the light transmission direction 215b, and after it is further rotated 90 degrees in the liquid crystal panel, it enters the color polarizer 203c in the linear polarized light parallel to the light transmission direction 215c. Thus, this light passes without being absorbed or diffused in the color polarizers 203a to 203c and a white light is obtained from the photomodulation element 201a.

When only the liquid crystal panel P2 is in ON state, according to the same operating principle as mentioned above, the light of the wavelength band W1 (red) of the color polarizer 203a is obtained, and when only the liquid crystal panel P3 is in ON state, similarly, the light of the wavelength band W3 (blue) of the color polarizer 203c is obtained. When the liquid crystal panels P2, P3 are simultaneously in ON state, the light of the wavelength band W2 (green) of the color polarizer 203b is obtained. Such selection operation of the light of specific wavelength, and display examples of setting the wavelength band W1 to W3 in red, green and blue are shown in Table 2 below.

TABLE 2

| P2 | P3 | Color | Display example |
|---|---|---|---|
| OFF | OFF | White | White |
| OFF | ON | W3 | B |
| ON | OFF | W1 | R |
| ON | ON | W2 | G |

Thus, in this embodiment, multiple colors including white are displayed.

These first and second embodiments may be properly selected depending on the number of required colors obtained by using the photomodulation elements 201, 201a. The second embodiment is effective for reducing the constitution in size.

According to this principle, practical examples of photomodulation elements 201, 201a for multicolor display are explained below. The practical examples are based on the type of the liquid crystal 12 used in each liquid crystal panel Pi and the composition of the liquid crystal panel Pi, and it is intended to achieve the function of high speed light switching action in each liquid crystal panel Pi.

(1) Using nematic liquid crystal

In this case, the liquid crystal panel Pi composed of nematic liquid crystal is twisted, for example, by 90 degrees in orientation between the light incident side orientation direction Aia and the exit side orientation direction Aib, or is oriented to be parallel to each other. The former twisted orientation corresponds to the first and second embodiment. In this structure, making use of the optical rotation characteristic of the TN liquid crystal, when composing the liquid crystal panel Pi, it is necessary to satisfy the condition of $$p \cdot \Delta n > \lambda \qquad \text{[Formula 4]}$$

where
  p: intrinsic spiral pitch
  $\Delta n$: refractive index anisotropy of liquid crystal
  $\lambda$: incident light wavelength
and to determine the conditions such as the refractive index anisotropy $\Delta n$ of the liquid crystal and layer thickness d so as to satisfy:

$$\mu = \sqrt{(2m)^2 - 1} \qquad \text{[Formula 5]}$$

where m: integer $$\mu = 2\Delta nd/\lambda \qquad \text{[formula 6]}$$

where d: layer thickness of liquid crystal.

Furthermore, as the installation conditions of the polarizers 203a to 203c and the liquid crystal panels P1 to P3, the light polarization directions by the polarizers 203a to 203c must be set parallel or vertical to the incident side orientation direction Aia of the liquid crystal panel Pi, and the light exit side orientation direction Aib of the liquid crystal panel Pi must be set parallel or vertical to the light absorption directions 214a, 214b, 214c of the color polarizers in the later stakes.

Figure 34:
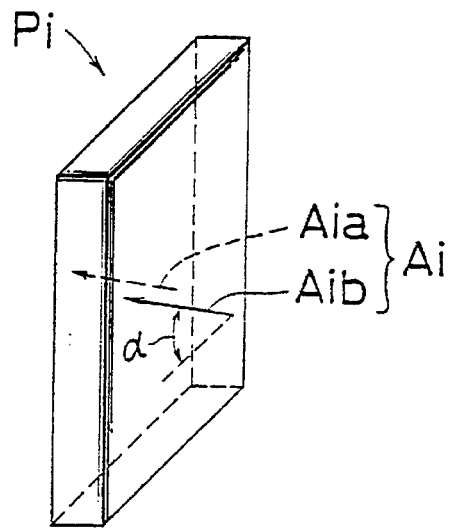
FIG. 34 is a diagram explaining the state of orientation of the liquid crystal panel Pi.
Figure 35:
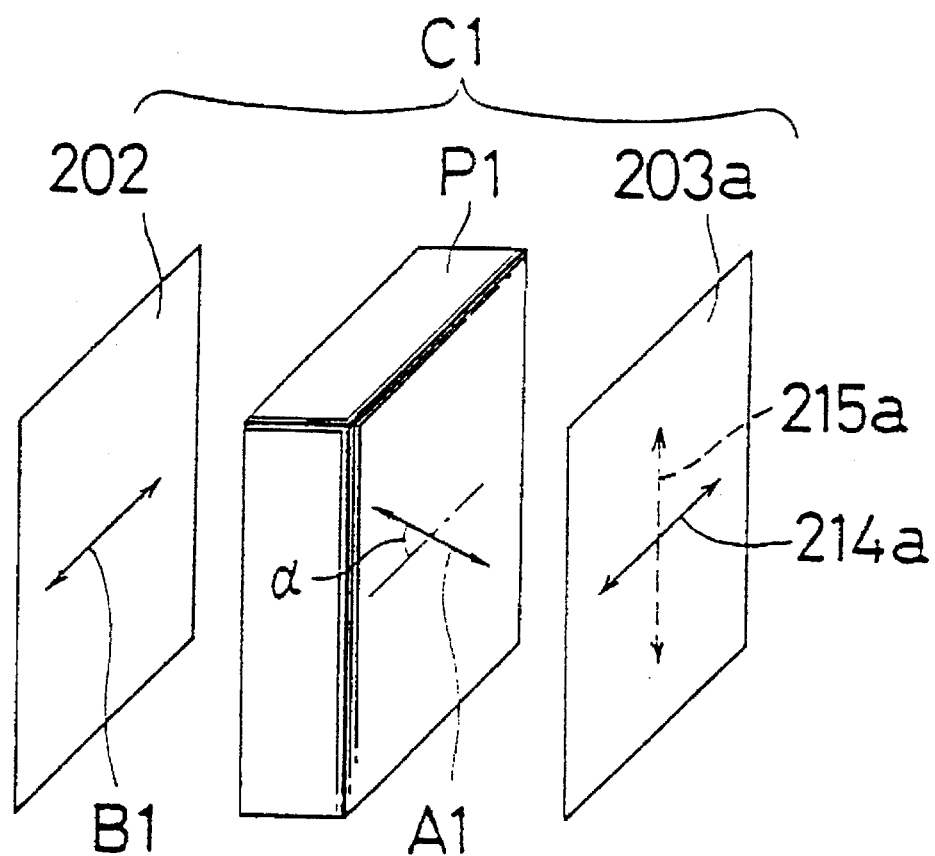
FIG. 35 is a decomposed perspective view of the liquid crystal element C1 of another example of the invention, FIG. 36(1)–36(2) is a graph explaining the optical characteristics of the example, FIG. 37(1)–37(2) is a diagram explaining the optical characteristics of the ferroelectric liquid crystal.

On the other hand, when each liquid crystal panel Pi is parallel between the incident side orientation direction Aia and exit side orientation direction Aib as shown in FIG. 34 (the both orientation directions collectively called Ai), this orientation direction Ai is set at an inclination of angle α (45 degrees in this embodiment) from the polarization direction B1 of the neutral gray polarizer 202 as in the liquid crystal element C1 shown in FIG. 35. This setting angle α is same for the remaining liquid crystal panels P2, P3.

Here, when the relation of the retardation Δnd (Δn: refractive index anisotropy of liquid crystal, d: layer thickness of liquid crystal 12) of the liquid crystal panel 12 and the incident light wavelength λ is as follows, $$\frac{\Delta nd}{\lambda} = \frac{(2m'-1)}{2} \qquad \text{[Formula 7]}$$

where m': integer
the light of the wavelength λ passing through the liquid crystal panel P1 becomes a linear polarized light rotating by angle 2α from the polarization direction B1, due to the double refractive characteristic of the liquid crystal 12. The optical axis direction of the exit side of the light of the wavelength λ satisfying Formula (7) in the liquid crystal panel P1 is indicated by arrow D1 in FIG. 35. Hereinafter, of the light leaving the liquid crystal panel Pi, the optical axis direction of the light leaving as linear polarized light satisfying Formula (4) is indicated by arrow Ci.

This phenomenon is explained as follows. That is, as shown in FIG. 36 (1), the light of linear polarization entering the liquid crystal panel P1 is a linear polarized light near the incident side end of the liquid crystal panel P1 as shown in FIG. 36 (2), but as passing through the liquid crystal panel P1, it is sequentially converted into elliptical polarization, circular polarization and elliptical polarization, and near the exit side end it becomes linear polarized light again. The optical axis direction of the linear polarized light of the exit side is deviated by angle 2α from the polarization direction B1 of the polarizer 202.

When an operating voltage properly determined by the voltage regulating circuit 5 shown in FIG. 31 is applied to such liquid crystal panel Pi, the liquid crystal molecules are oriented vertically to the glass substrates 6, 7. As a result, apparently, the double refractive characteristic of the liquid crystal 12 is eliminated, and the optical rotary property is lost. That is, supposing the angle α=45 degrees, the operation for rotating 90 degrees the light entering in the linear polarization, and the action of leaving in the linear polarization in the same direction as the incident linear polarization without rotating may be changed over by using the liquid crystal panel Pi. It is therefore possible to achieve the multi-color display as explained in relation to the photomodulation element in FIG. 31.

On the other hand, according to the principle for realizing multicolor display by using nematic liquid crystal, in the state of no electric field, the liquid crystal panel Pi is assumed in the 90-degree deflection orientation or horizontal orientation, and the operating state of vertical orientation is supposed when electric field is applied. For this purpose it is necessary to use the liquid crystal with dielectric anisotropy Δε>0 by sealing in the liquid crystal panel Pi treated by horizontal orientation, but by using the liquid crystal of dielectric anisotropy Δε≦0 and the liquid crystal panel Pi treated by vertical orientation, it is possible to realize the composition of 90-degree deflection orientation or horizontal orientation when electric field is applied. In such constitution, too, the same action as mentioned in the preceding embodiments may be achieved.

When such photomodulation element 201 is combined with, for example, active matrix liquid crystal display device of monochromatic display for use in multi-color or full-color display, in its application, a high speed is required in the color changes. To operate the photomodulation element 201 at high speed, it is necessary to dislocate the liquid crystal molecules corresponding to the specified change of the applied voltage at high speed. Accordingly, the layer thickness d of the liquid crystal 12 should be as small as possible. Hence, in formula (7), supposing m=1, when modified, we obtain $$\Delta nd = \lambda/2 \qquad \text{[formula 19]}$$

Here, by setting λ=650 nm, from formula (19) we obtain $$\Delta nd = 0.32 \mu m \qquad \text{[formula 20]}$$

Assuming the refractive index anisotropy Δn=0.13 of the ordinary twisted nematic liquid crystal, the layer thickness is d=2.5 μm. Seeing that the layer thickness of the liquid crystal in an ordinary TN type liquid crystal display device is 5 to 12 μm, in this example, the layer thickness of the liquid crystal 12 is about ⅕ to ½ smaller as compared with the existing liquid crystal display device. It is known generally that the response speed corresponding to the changes of applied voltage of liquid crystal is inversely proportional to $d^2$, concerning the layer thickness d of liquid crystal. That is, the response time is faster when the cell thickness is thinner. In the actual numerical condition as mentioned above, the obtained response speed is 4 to 25 times faster than the response speed of the ordinary TN type or other liquid crystal display device.

On the other hand, in the liquid crystal display devices presently available, the minimum value of the layer thickness of the liquid crystal 12 is about 5 μm, and in order to design the layer thickness thinner than this, it is known that the refractive index anisotropy of the liquid crystal in formula (20) must be Δn=0.07 or more. This numerical value is the figure satisfied by the refractive index anisotropy of the ordinary TN type liquid crystal, and hence the photomodulation element 201 of the embodiment may be composed by using the ordinary TN type liquid crystal.

To obtain a high response speed, meanwhile, it is also necessary to consider the viscosity of the liquid crystal material. The viscosity of the liquid crystal is desired to be as low as possible, and generally the effects of the invention are realized at 35 centipoise (cp) or less, but more preferably it is desired to be 25 centipoise or less, as provided by the experience of the present inventors. Liquid crystal materials showing such characteristic include biphenyl compound., phenylester compound, cyclohexane compound, phenyl pyrimidine compound, dioxane compound, tolan compound, alkenyl compound, and fluorine compound, or their mixtures.

Using a liquid crystal composition made of such materials, a photomodulation element as shown in FIG. 31 was composed, and the applied voltage was changed over and the response speed was measured. As a result, a high response speed of several milliseconds was obtained. Meanwhile, the one field period of ⅙₀ sec of television video signal of NTSC system is about 17 msec. For example, therefore, it is possible to realize a constitution in which the red image, green image and blue image are displayed for 5 msec each in one field period, and the photomodulation element 201 changes over in synchronism to transmit the red, green and blue light. It is hence possible to realize the multicolor display using the photomodulation element 201. That is, a color filter of small size, light weight and simple structure is realized.

Furthermore, in the technology employing the nematic liquid crystal, it is possible to use a two-frequency driving liquid crystal of which dielectric constant anisotropy is $\Delta\epsilon>0$ at low frequency voltage, and $\Delta\epsilon<0$ at high frequency voltage, and it is advantageous in this case that the operating speed of the liquid crystal can be raised. That is, when the driving voltage from the low frequency power source is adjusted in the voltage regulating circuit and supplied to the liquid crystal panels, as the applied voltage increases, the liquid crystal of each liquid crystal panel gradually changes from homogeneous array homeotropic array, and the refractive index anisotropy $\Delta n$ is changed corresponding to this change. To return initial homogeneous array from this state, the driving voltage from the high frequency power source is used. Hence, the return is at high speed, and the operation of the photomodulation element may be done at high speed.

The two-frequency driving liquid crystal is, in order to widely determine the effective operating temperature range of the liquid crystal and realize low viscosity, composed of a mixed liquid crystal using a base material of relatively weak polarity, such as alkoxyphenyl cycloehexylcarboxylate, alkylphenyl cycloxycarboxylate and alkoxyphenyl cyclohexane, and combined with materials with low dielectric diffusion frequency, for example: chemical formula (1)–(4)

Furthermore, using a material having a large negative value of dielectric constant anisotropy $\Delta\epsilon$ such as 2,3-dicyano-1,4-hydroquinoline derivatives as given chemical formula (5)–(7), the overall dielectric constant anisotropy and cut-off frequency (the frequency for changing over the dielectric constant anisotropy $\Delta\epsilon$ between positive and negative polarity) are adjusted.

(2) Using ferrodielectric liquid crystal

A ferrodielectric liquid crystal has an asymmetric carbon atom in the molecular skeleton, and a ferrodielectric phase is shown in the most typical liquid crystal phase of chiral smectic C phase (SmC* phase). The ferrodielectric liquid crystal of such smectic C phase has a spiral structure along each smectic layer as shown in FIG. 37 (1), and the spontaneous polarization direction 217 of each liquid crystal molecule 216 rotates counterclockwise, in this example, as shown in FIG. 37 (2).

When such ferrodielectric liquid crystal is placed between glass substrates 6, 7 shown in FIG. 32 in a smaller layer thickness than the intrinsic spiral pitch P, for example, in a layer thickness d of several microns, the spiral structure of the liquid crystal molecule of the smectic C phase is disintegrated. At this time, the array direction of the liquid crystal molecule 216, that is, the major axis direction of the liquid crystal molecule 216 of each smectic layer 218 shown in FIG. 38 is stable in two types of array state in which the spontaneous polarization direction 217 of each liquid crystal molecule 216 possesses the spontaneous polarization directions 217a, 217b parallel to the normal direction of the glass substrates 6,7 and in reverse directions mutually as shown in FIG. 38.

When a voltage is applied to the liquid crystal 12 in such state, by the mutual action of the electric field by this voltage and the spontaneous polarization, the direction of the spontaneous polarization is defined by the polarity of the electric field, and the orientation of the liquid crystal molecule 216 may be either one direction corresponding to the polarity of the electric field, of the two types of stable state above. For example, as shown in FIG. 38, when an electric field is applied so that the glass substrate 7 side may be at the (+) pole while the glass substrate 6 side may be at the (−) pole, the liquid crystal molecule 216 is arranged in the orientation in the downward spontaneous polarization 217a. If the polarity is reverse, the molecule is arranged in the state of the spontaneous polarization 217b. Therefore, corresponding to the polarity of the electric field applied to the liquid crystal 12, two states are changed over with respect to the normal direction 219 of the smectic layer 218, that is, the liquid crystal molecule 216a in a direction corresponding to the spontaneous polarization 217a at an inclination of angle $+\phi\theta$, and the liquid crystal molecule 216b corresponding to the spontaneous polarization direction 217b at an inclination of angle $-\theta$ relating to the normal direction 219.

Since the orientation of the liquid crystal molecules 216a, 216b in the two states of the liquid crystal molecule 216 differ in the azimuth angle by the solid angle $2\theta$ shown in FIGS. 37, 38 within a virtual plane parallel to the glass substrates 6, 7, display is realized by incorporating polarizers in such liquid crystal panel P.

FIG. 39 explains the principle for realizing display according to the operating principle of the ferrodielectric liquid crystal, which is a plan view of observing the liquid crystal panel P in FIG. 38 from the normal direction of the glass substrates 6, 7. In this liquid crystal panel P, after treatment by parallel orientation, it is supposed as shown in FIG. 39 (2) that the liquid crystal molecule 216 of each smectic layer 218 is inclined, in the state without electric field, at an angle $+\theta$ to the normal direction 219 of the smectic layer 218, and that the spontaneous1 polarization is arrayed in the stable state in the spontaneous polarization direction 217b from the back side to the front side of the sheet of paper in FIG. 39.

At this time, polarizers are placed at both sides of the glass substrates 6, 7 of the liquid crystal panel P in FIG. 38, and their polarization directions B1, B2 are determined in the orthogonal cross Nicol's state as shown in FIG. 39 (1), and one polarization direction B1 is assumed to be defined parallel to the major axis direction of the liquid crystal molecule 216b. In this case, the polarization direction of the polarizer of the glass substrate 6 side is the direction B1, and when the light enters from the glass substrate 6 side, the linear polarized light entering the liquid crystal panel P by passing through the polarizer is parallel in its polarization direction to the major axis direction of the liquid crystal molecule 216, and it is transmitted without being rotated, and is cut off by the polarizer 3 at the glass substrate 7 side.

To the liquid crystal panel P in this state, when a voltage is applied from the front side to the back side of the sheet of paper in FIG. 39, that is, in the (+) pole at the glass substrate 7 side and (−) pole at the glass substrate 6 side in FIG. 38, the spontaneous polarization of the liquid crystal molecule 216 becomes the spontaneous polarization direction 217a as mentioned above, and the liquid crystal molecule 216 is converted in the orientation to the other stable state inclined at an angle $-\theta$ from the normal direction 219 as shown in FIG. 39 (3). The spontaneous polarization of the liquid crystal molecule 216a at this time is the spontaneous polarization direction 217a. The orientation state of the liquid crystal molecule 216a at this time is oriented at an inclination of angle 2θ from the orientation state in FIG. 39 (2), and therefore according to the principle explained by referring to FIG. 35 and FIG. 36 on the basis of the effect of double refraction of the liquid crystal 12, the linear polarized light entering the liquid crystal panel P through the polarizer 202 undergoes modulation while passing through the liquid crystal 12, thereby producing the light component passing through the other polarizer 203. At this time, the condition for having the highest efficiency and receiving the bright display is to satisfy both $$2\theta = 45°$$ [formula 21]

and $$\frac{\Delta nd}{\lambda} = \frac{1}{2}$$ [Formula 22]

Here, Formula (22) is equivalent to Formula (7), supposing the integer $m^+ = 1$, and in this condition the linear polariza-

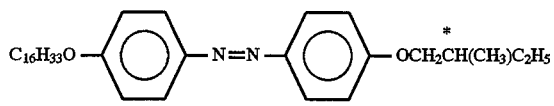

and

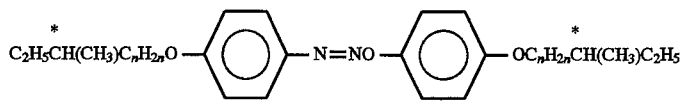

tion is determined in the state of rotating 90 degrees when passing through the liquid crystal 12.

To the liquid crystal panel P in the orientation state in FIG. 39 (3), a voltage is applied in the direction from the back side to the front side of the sheet of paper in FIG. 39. That is, the glass substrate 6 side in FIG. 38 is the (+) pole, and the glass substrate 7 side is the (−) pole. In this case, according to the above principle, the liquid crystal molecule 216 is in the spontaneous polarization direction 217b as shown in FIG. 39 (4), thereby returning to the initial state shown in FIG. 39 (2). In this way, the liquid crystal panel P in such constitution, when combined with the polarizers 202, 203 in the cross Nicol's state, achieves the operating state of rotating 90 degrees the light entering in the linear polarization, and the operating state of directly passing without rotating in the linear polarization direction. Therefore, the same operating state as the liquid crystal panels P1 to P3 in FIG. 31 is achieved, and multicolor display is realized.

As a modified example of this embodiment, for example, it is also possible to employ the so-called G/H (guest/host) mode, for example, by adding a dichroic white/black pigment to the ferrodielectric liquid crystal. In this case, only one polarizer is used, and the best display efficiency is obtained in the condition of the solid angle θ=90 degrees.

The greatest feature of such ferrodielectric liquid crystal is the response speed is extremely high, as compared with the ordinary TN type nematic liquid crystal, because of the strong mutual action of the spontaneous polarization and electric field. According to the experiment of the present inventor, when using the ordinary nematic liquid crystal, the response time is several to scores of milliseconds, while the response time was confirmed to be scores to hundreds of microseconds by using the ferrodielectric liquid crystal.

Other feature of the ferrodielectric liquid crystal is the possession of the memory action for self-holding the specified orientation even after removing the applied electric field. Hence, the circuit composition for driving the liquid crystal panel is outstandingly simplified.

Examples of materials showing such ferrodielectric liquid crystal phase include a Schiff base material such as

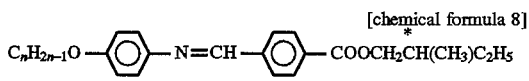 [chemical formula 8]

azo material or azoxy material such as

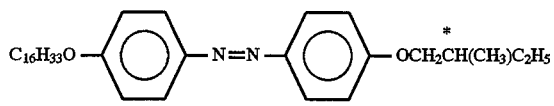 [chemical formula 9]

and

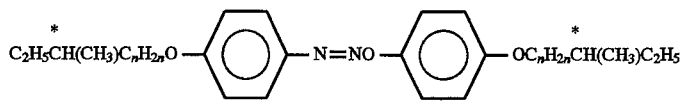 [chemical formula 10]

biphenyl material such as

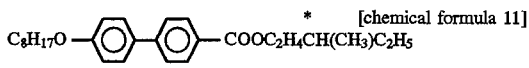 [chemical formula 11]

ester material such as

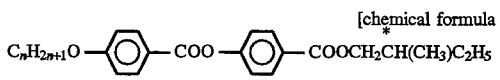 [chemical formula 12]

material containing cyclohexane ring such as

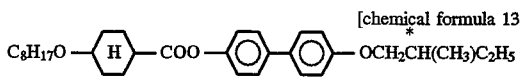 [chemical formula 13]

material possessing complex ring such as

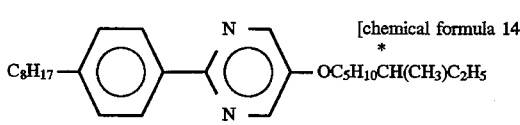 [chemical formula 14]

material introducing fluorine group or other substituent such as

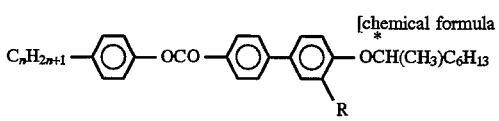 [chemical formula 15]

CR = F or Cl or Br or (N)

and the material introducing cyclic chiral substituent such as

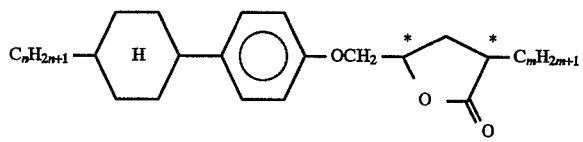

[chemical formula 16]

or their mixtures.

When the ferrodielectric liquid crystal composed of such material is used as the photomodulation elements 201a in FIG. 31 and FIG. 33, the liquid crystal element C notably faster in response as compared with the case of using the ordinary nematic liquid crystal is realized.

Recently, moreover, liquid crystal materials possessing electroclinic effect, and liquid crystal materials possessing anti-ferrodielectric phase have been discovered, they are also usable. That is, the former electroclinic effect is to continuously change the inclination angle of the liquid crystal molecule depending on the intensity of the electric field by applying an electric field in the smectic A phase, possessing the composition of connected, so as to be used by changing over, by switches SW1, SW2, SW3, between the high frequency power source 23 for generating, for example, driving frequency fH of 10 kW, and the low frequency power source 24 for generating frequency fL of 100 Hz.

In the liquid crystal panels P1 to P3, the OFF state of rotating the incident linear polarized light by 90 degrees is the case of connection of the switches SW1 to SW3 to the high frequency power source 23, and the ON state of passing the incident linear polarized light without rotating is the case of connection of the switches SW1 to SW3 to the low frequency power source 24. In such condition, when the color of the light obtained from the photomodulation element 201b was measured, the six-color display was obtained

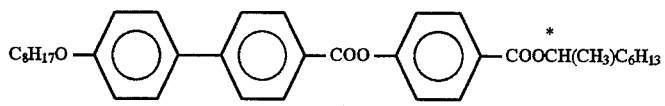

[chemical formula 17]

and its characteristic is specifically discussed by S. Nisiyama et al.: Jpn. J. Appl. Phys., 26 (1987), L1787.

Besides, the liquid crystal material possessing the anti-ferrodielectric phase is confirmed to have three stable states in the chiral smectic C phase (Sm*C phase) in the material of Formula 17, and the characteristic is specifically discussed by A. D. L. Chandani et al.: Jap. J. Appl. 27 (1988), L276. Using either liquid crystal material, when the liquid crystal panel is composed in the same principle as in the case of using the ferrodielectric liquid crystal material above, a similar fast switching operation is realized.

Figure 40:
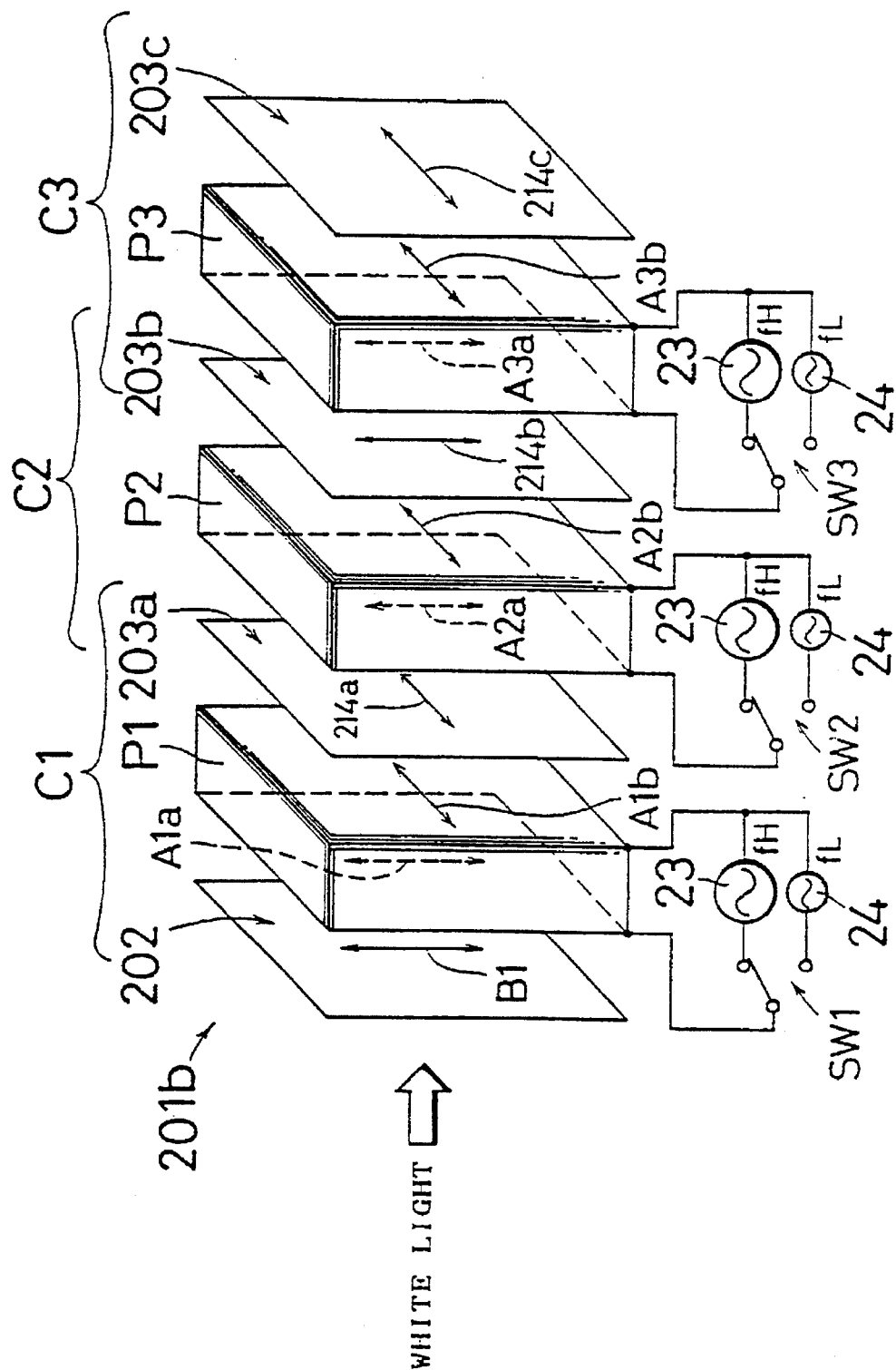
FIG. 40 is a systematic diagram of the optical modulating element 201b of another example of the invention.
Figure 39A:
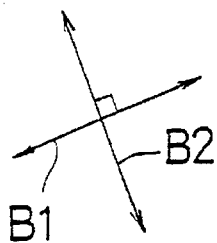
Figure 39B:
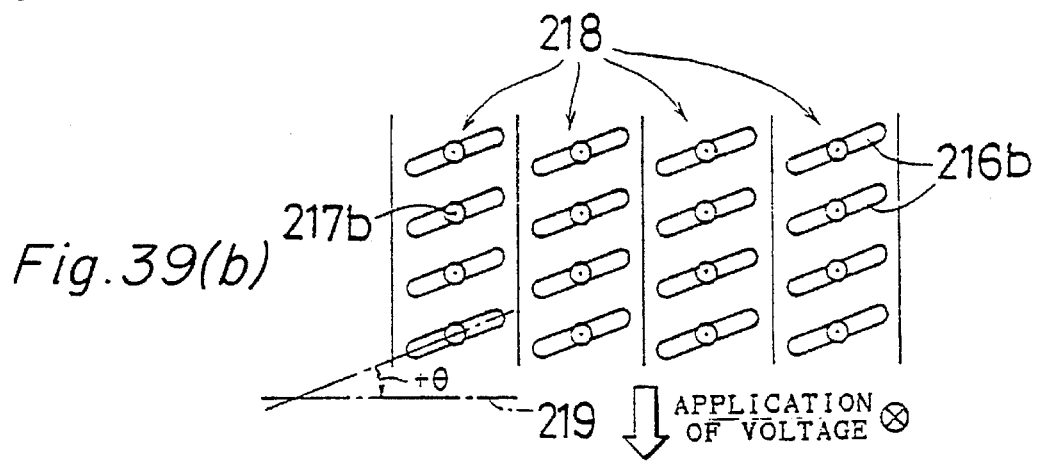
Figure 39C:
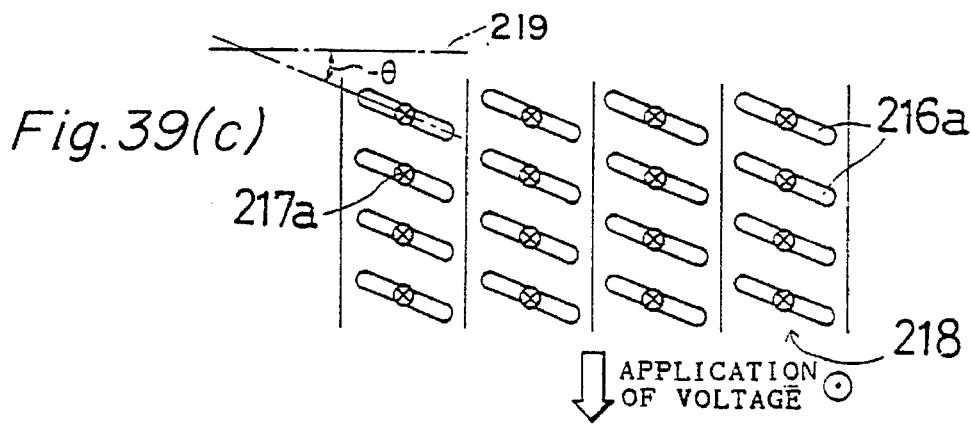
Figure 39D:
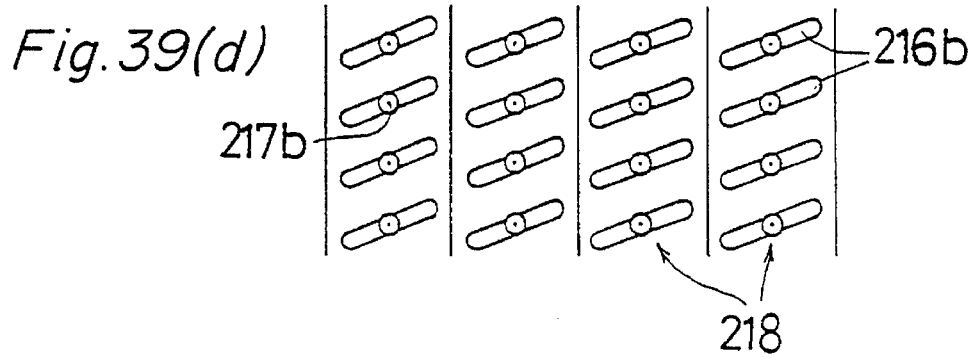

FIG. 40 is a schematic diagram showing a structural example of photomodulation element 201b in other embodiment of the invention. In this embodiment, as the liquid crystal panels P1 to P3, the two-frequency driving liquid crystals are used, and the incident side orientation direction Aia and exit side orientation direction Aib of each liquid crystal panel Pi is determined in an orthogonal state common to the liquid crystal panels P1 to P3. The polarization direction B1 of the neutral polarizer 202 is parallel to the incident side orientation direction A1a of the liquid crystal panel P1, and the absorption axis direction 214a of the color polarizer 203a is selected parallel to the exit side orientation direction Aib of the liquid crystal panel P1. The light absorption axis direction 214b of the color polarizer 203b is selected vertical to the exit side orientation direction A2b of the liquid Crystal panel P2, and the light absorption axis direction 214c of the color polarizer 203c is selected parallel to the exit side orientation direction A3b of the liquid crystal panel P3.

The color polarizers 203a to 203c are $LLC_2$-9518 (neutral polarizer), $SCC_2R$-18 (red color polarizer 3a). $SSC_2G$-18 (green color polarizer 3b, and $SCC_2B$-18 (blue color polarizer 3c) manufactured by Sanritsu Electric Co. The liquid crystal material is TX2A (manufactured by BDH), and the layer thickness is optimized by using silica spacers of liquid crystal in the layer thickness of d=5.5 μm, 4.5 μm, and 4.0 μm, in the liquid crystal panels P1, P2, P3. In the liquid crystal panels P1 to P3, either one of the high frequency power source 23 and low frequency power source 24 is as shown in Table 3.

TABLE 3

| SW1 | SW2 | SW3 | Color |
|-----|-----|-----|-------|
| OFF | ON  | OFF | Red   |
| ON  | ON  | ON  | Green |
| ON  | OFF | ON  | Blue  |
| ON  | OFF | OFF | White |
| OFF | OFF | ON  | Black |
| OFF | OFF | OFF | Black |

Figure 41:
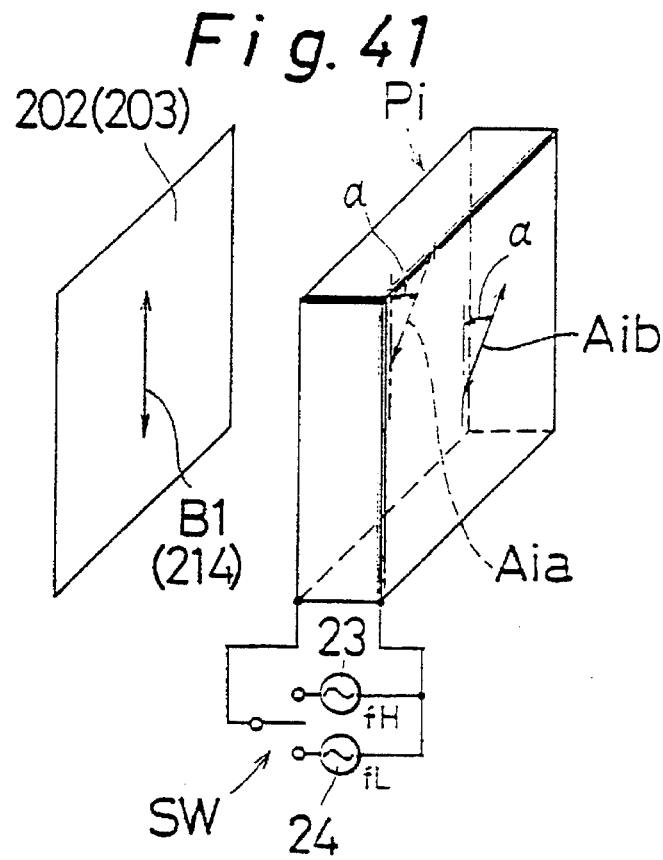
FIG. 41 is a perspective view of the optical liquid crystal panel Pi of another example of construction of the invention.

That is, the multi-color display is possible also by such constitution. Incidentally, the speed of the behavior of the liquid crystal of the liquid crystal panels P1 to P3 due to changeover of the switches SW1 to SW3 has been confirmed to be high speed response of 2 msec to 5 msec. FIG. 41 is a perspective view of liquid crystal panel Pi in other embodiment of the invention. The liquid crystal panel Pi of the embodiment is a practical example of the embodiment explained by reference to FIGS. 34 through 36, and is identical in structure with the liquid crystal panel Pi shown in FIG. 32 (1), in which polyimide films for horizontal orientation are applied and baked to be used as orientation films 10, 11, and glass substrates 6, 7 forming transparent electrodes 8, 9 made of ITO are rubbed in same direction, and are mutually glued to be parallel in the rubbing direction. That is, the incident side orientation direction Aia and exit side orientation direction Aib shown in FIG. 41 are parallel to each other, and are set at an angle α (45 degrees) to the polarization direction B1 of the neutral gray polarizer 202 or the light absorption direction 214 of the color polarizer 203.

The type of the liquid crystal sealed inside and the type of polarizers 202, 203 are same as the materials of the embodiment explained by reference to FIG. 40, and the layer thickness of liquid crystal of liquid crystal panels P1 to P3 is set to 3 μm, 2.5 μm, and 2.0 μm by using silica spacers, and the layer thickness is optimized. In such structural example, when the ON state and OFF state were changed over, the color phase changes same as the color phase changes shown in Table 3 were achieved by high speed response of about 1 msec.

Figure 42:
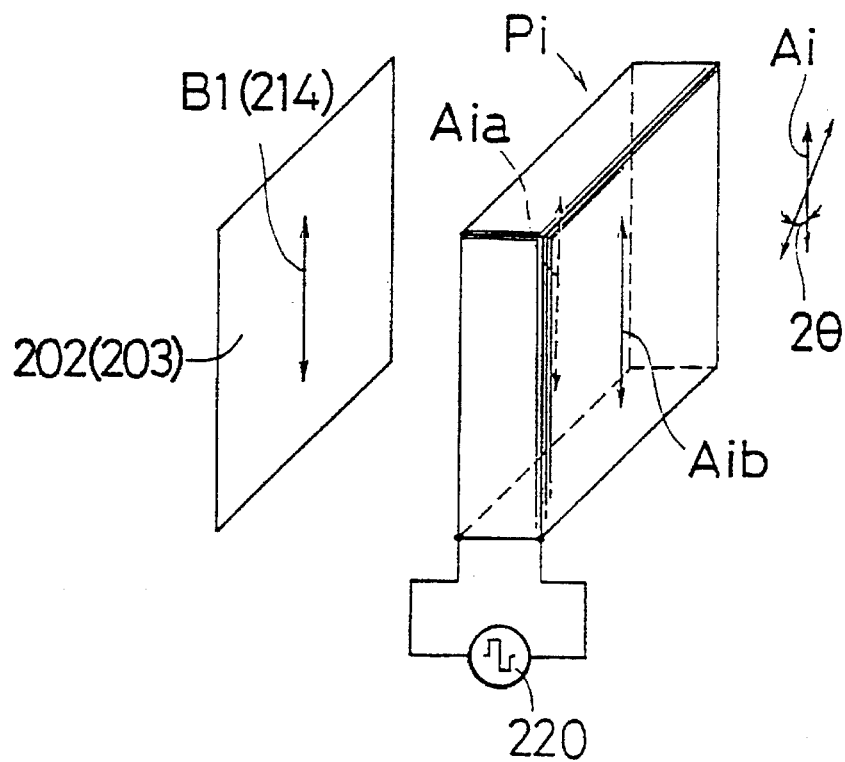
FIG. 42 is a perspective view indicating the construction of the optical liquid crystal panel Pi of another example of construction of the invention.

FIG. 42 is a perspective view showing the constitution of the liquid crystal panel P in a different embodiment of the invention. In the liquid crystal panel P of this embodiment, Nylon 66 (tradename) was applied and baked on glass substrates 6, 7 mounting transparent electrodes 8, 9 by sputtering method shown in FIG. 32 (1), parallel orientation was treated by rubbing or the like, and the incident side orientation direction Aia and exit side orientation direction Aib were set parallel to each other. Afterwards, ferrodielectric liquid crystal C-S-1014 (Chisso) was adjusted to layer thickness of d=1.5 to 2.0 μm, and injected and sealed between the glass electrodes 6, 7.

The orientation of such ferrodielectric liquid crystal molecule is parallel or vertical to the light absorption directions B1, 214 of the polarizers 202, 203 when a positive polarity voltage having a positive potential at the glass substrate 6 side rather than the glass substrate 7 side is applied, for example, and when a negative polarity voltage is applied, the orientation of the liquid crystal molecule is selected in a state of inclining by angle 2θ of 40 to 45 degrees, for example, to the above orientation. Such liquid crystal panel Pi is connected to a polarity changeover circuit 220 for changing over the polarity of the voltage applied in this way. According to the experiment by the present inventor, it has been confirmed that the color change in Table 3 is achieved in 100 to 200 μm owing to the high speed response of the embodiment. In Table 3, however, the OFF state is when a negative polarity voltage is applied to the liquid crystal panel P by the polarity changeover circuit 220, and the ON state is when a positive polarity voltage is applied.

Figure 43:
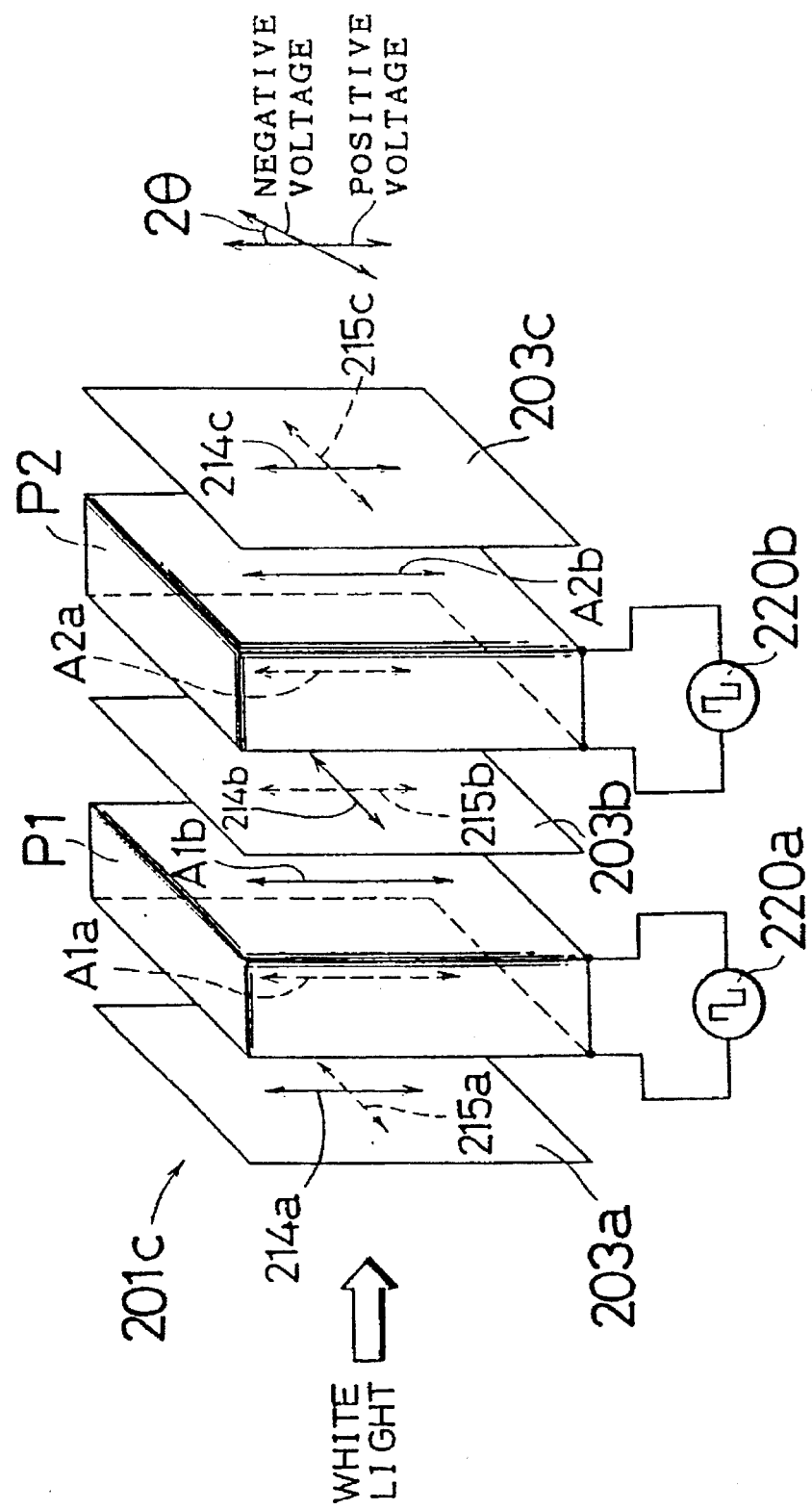
FIG. 43 is a systematic diagram of the optical modulating element 201c of still another example of the invention.

FIG. 43 is a schematic diagram of photomodulation element 201c in a further different embodiment of the invention. It is a feature of the embodiment that color polarizers 203a, 203b, 203c are disposed between and at both sides of two liquid crystal panels P1, P2, in which the liquid crystal panels P1, P2 are in the same composition as the liquid crystal panel Pi explained by reference to FIG. 42, and the liquid crystal to be sealed is selected in one type. That is, the polarity inverting power sources 220a, 220b are connected to the liquid crystal panels P1, P2, respectively, and the polarity is set in the positive polarity state or negative polarity state, corresponding to the light of the selected color as mentioned above. The relation between the polarity of the voltage applied to the liquid crystal panels P1, P2 and the realized color is shown in Table 4.

TABLE 4

| P1 | P2 | Color |
|----|----|-------|
| ON | ON | Green |
| ON | OFF | Red |
| OFF | ON | Blue |
| OFF | OFF | White |

Besides, according to the experiment by the present inventor, the color changing action in this way has been confirmed to be done in 100 to 200 μsec.

In the foregoing embodiments, meanwhile, by using the ferrodielectric liquid crystal, as compared with the case of using nematic liquid crystal, it has been confirmed to be small in undesired effects on the color reproduction on the basis of the double refractive property possessed by the liquid crystal, concerning the linear polarization of the incident light. In such embodiments, concerning the colors reproduced in the light of plural colors obtained from the photomodulation elements 201a to 201c, it has been also known to suppress the dependence of color reproduction on visual sense of fluctuations of the reproduced color depending on the angle of observing the photomodulation element.

In the foregoing embodiments, glass substrates are used as the substrates for the photomodulation elements 201, 201a, 201b, 201c, but the weight may be reduced by replacing them, as a modified example, with plastic substrates of synthetic resins. Furthermore, in order to correct the wavelength characteristics of the transmission light, phase difference plates made of high molecular film such as polycarbonate and polyvinyl alcohol may be added among the liquid crystal elements C1 to C3, or specific dichroic pigments may be added to the liquid crystal materials.

Hereinafter are explained application examples of the photomodulation elements 201, 201a, 201b, 201c in various electronic appliances.

The photomodulation elements 201, 201a, 201b, 201c in the embodiment may be applied as liquid crystal color filter 29 used in various electronic appliances shown in FIGS. 11 to 20 and FIG. 29. In such cases, too, the same effects as stated above are obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical modulating element comprising:

a pair of neutral polarizers, said neutral polarizers being the only polarizers in said optical modulating element;

a plurality of adjacent crystal panels, in each of which a nematic liquid crystal having birefringence and a twisting angle of 0° is sealed, arranged from an inlet side to an outlet side of said modulating element, all of said panels being positioned between the pair of neutral polarizers; and means for changing the retardation Δnd of each liquid crystal panel, wherein the axis of polarization of the neutral polarizer on the outlet side is parallel to the direction of polarization of the straight polarizing component or to the direction of the major axis of the elliptical polarizing component of the output light of the last liquid crystal panel toward the outlet side, and when transmitting light of a wavelength $\lambda_o$ through the liquid crystal panels, the retardation Δnd of each liquid crystal panel is adjusted to satisfy the following equation:

$$\Delta nd/\lambda_o = (2m-1)/2$$

where Δn is the anisotropy of refractive index of the nematic liquid crystal, d is the thickness of a liquid crystal layer contained in the liquid crystal panel, and m is an integer, wherein the optical axis direction at an exit side of a first liquid crystal panel toward the inlet side of said optical modulating element is at an angle of 2α with the plane of polarization of the neutral polarizer at the inlet side of said optical modulating element, the optical axis direction of a second and successive liquid crystal panels is in the direction intersecting diagonally with the orientation of a liquid crystal panel preceding the liquid crystal panel, at an angle of 2α, and the plane of polarization of the neutral polarizer at the outlet side of said optical modulating element is parallel to the optical axis direction at an exit side of a last liquid crystal panel towards the outlet side of said modulating element.

2. An optical modulating element as claimed in claim 1, wherein each liquid crystal panel is constituted by a pair of transparent electrodes between which a liquid crystal is sealed, and the means for changing the retardation Δnd of each liquid crystal panel is a voltage application means for applying either an AC voltage or a DC voltage to the liquid crystal.

3. An optical modulating element as claimed in claim 1, wherein when transmitting the light of a wavelength of $\lambda_0$ through the modulating element, the retardation Δnd of each liquid crystal panel and the number of layers of the respective liquid crystal panels are selected in such a way that the width at half the maximum in the distribution of intensity of the transmitted light centering on the wavelength $\lambda_0$ the transmitted light and the intensity of light of wavelengths other than $\lambda_0$ may be predetermined values.

4. A display apparatus which makes an indication by irradiating the light of one light source containing the wavelengths of a plurality of colors on a transmission or reflection type display means, said apparatus including an optical modulating element, said apparatus displays images corresponding to the time period for an afterimage effect, the optical modulating element switching the color of the light that passes within a time period for display of the image for each color;

the optical modulating element comprising:

a pair of neutral polarizers, said neutral polarizers being the only polarizers in said optical modulating element;

a plurality of adjacent crystal panels, in each of which a nematic liquid crystal having birefringence and a twisting angle of 0° is sealed, arranged from an inlet side to an outlet side of said modulating element, all of said panels being positioned between the pair of neutral polarizers; and means for changing the retardation Δnd of each liquid crystal panel, wherein the axis of polarization of the neutral polarizer on the outlet side is parallel to the direction of polarization of the straight polarizing component or to the direction of the major axis of the elliptical polarizing component of the output light of the last liquid crystal panel toward the outlet side, and when transmitting light of a wavelength $\lambda_o$ through the liquid crystal panels, the retardation Δnd of each liquid crystal panel is adjusted to satisfy the following equation:

$$\Delta nd/\lambda_o = (2m-1)/2$$

where Δn is the anisotropy of refractive index of the nematic liquid crystal, d is the thickness of a liquid crystal layer contained in the liquid crystal panel, and m is an integer, wherein the optical axis direction at an exit side of a first liquid crystal panel toward the inlet side of said optical modulating element is at an angle of 2α with the plane of polarization of the neutral polarizer at the inlet side of said optical modulating element, the optical axis direction of a second and successive liquid crystal panels is in the direction intersecting diagonally with the orientation of a liquid crystal panel preceding the liquid crystal panel, at an angle of 2α, and the plane of polarization of the neutral polarizer at the outlet side of said optical modulating element is parallel to the optical axis direction at an exit side of a last liquid crystal panel towards the outlet side of said modulating element.

* * * * *